US012707124B2

(12) United States Patent
Robbin et al.

(10) Patent No.: US 12,707,124 B2
(45) Date of Patent: Aug. 11, 2026

(54) HEALTH AWARE MEDIA NAVIGATION AND CONSUMPTION

(71) Applicant: Apple Inc., Cupertino, CA (US)

(72) Inventors: Gregory S. Robbin, Mountain View, CA (US); Daniel E. Marusich, San Carlos, CA (US); Eliza J. Von Hagen, Campbell, CA (US); Emily A. Stone, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/329,211

(22) Filed: Jun. 5, 2023

(65) Prior Publication Data

US 2024/0015367 A1 Jan. 11, 2024

Related U.S. Application Data

(60) Provisional application No. 63/365,878, filed on Jun. 5, 2022.

(51) Int. Cl.
*H04N 21/482* (2011.01)
*H04N 21/2343* (2011.01)
*H04N 21/475* (2011.01)

(52) U.S. Cl.
CPC ....... *H04N 21/482* (2013.01); *H04N 21/2343* (2013.01); *H04N 21/4755* (2013.01); *H04N 21/4828* (2013.01)

(58) Field of Classification Search
CPC ............. H04N 21/482; H04N 21/2343; H04N 21/4755; H04N 21/4828
See application file for complete search history.

(56) References Cited

U.S. PATENT DOCUMENTS 6,323,846 B1 11/2001 Westerman et al.
6,570,557 B1 5/2003 Westerman et al.
6,677,932 B1 1/2004 Westerman
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
(Continued)

FOREIGN PATENT DOCUMENTS

WO 2013169849 A2 11/2013
WO 2014105276 A1 7/2014

OTHER PUBLICATIONS

International Search Report received for PCT Patent Application No. PCT/US2023/024453, mailed on Oct. 30, 2023, 6 pages.

*Primary Examiner* — Joshua D Taylor
(74) *Attorney, Agent, or Firm* — Kubota & Basol LLP

(57) ABSTRACT

In some embodiments, a user interface displayed by an electronic device is used for playback of media associated with health-based metadata, wherein the electronic device is configured to initiate processes to forgo display of sensitive content and/or display an interactive timeline indicating such sensitive content based on the health-based metadata.

39 Claims, 27 Drawing Sheets

(56) References Cited

U.S. PATENT DOCUMENTS

| | | | | |
|---|---|---|---|---|
| 9,348,458 | B2 | 5/2016 | Hotelling et al. | |
| 9,607,656 | B1 | 3/2017 | Serce | |
| 9,933,937 | B2 | 4/2018 | Lemay et al. | |
| 2002/0015024 | A1 | 2/2002 | Westerman et al. | |
| 2003/0131357 | A1* | 7/2003 | Kim | H04N 21/435 725/112 |
| 2005/0190059 | A1 | 9/2005 | Wehrenberg | |
| 2006/0017692 | A1 | 1/2006 | Wehrenberg et al. | |
| 2006/0033724 | A1 | 2/2006 | Chaudhri et al. | |
| 2006/0197753 | A1 | 9/2006 | Hotelling | |
| 2014/0101550 | A1 | 4/2014 | Zises | |
| 2020/0304863 | A1* | 9/2020 | Domm | H04L 67/025 |
| 2021/0392407 | A1 | 12/2021 | Aher et al. | |
| 2022/0053042 | A1* | 2/2022 | Kanza | H04N 21/25841 |
| 2023/0007347 | A1* | 1/2023 | Deora | G11B 27/036 |

* cited by examiner

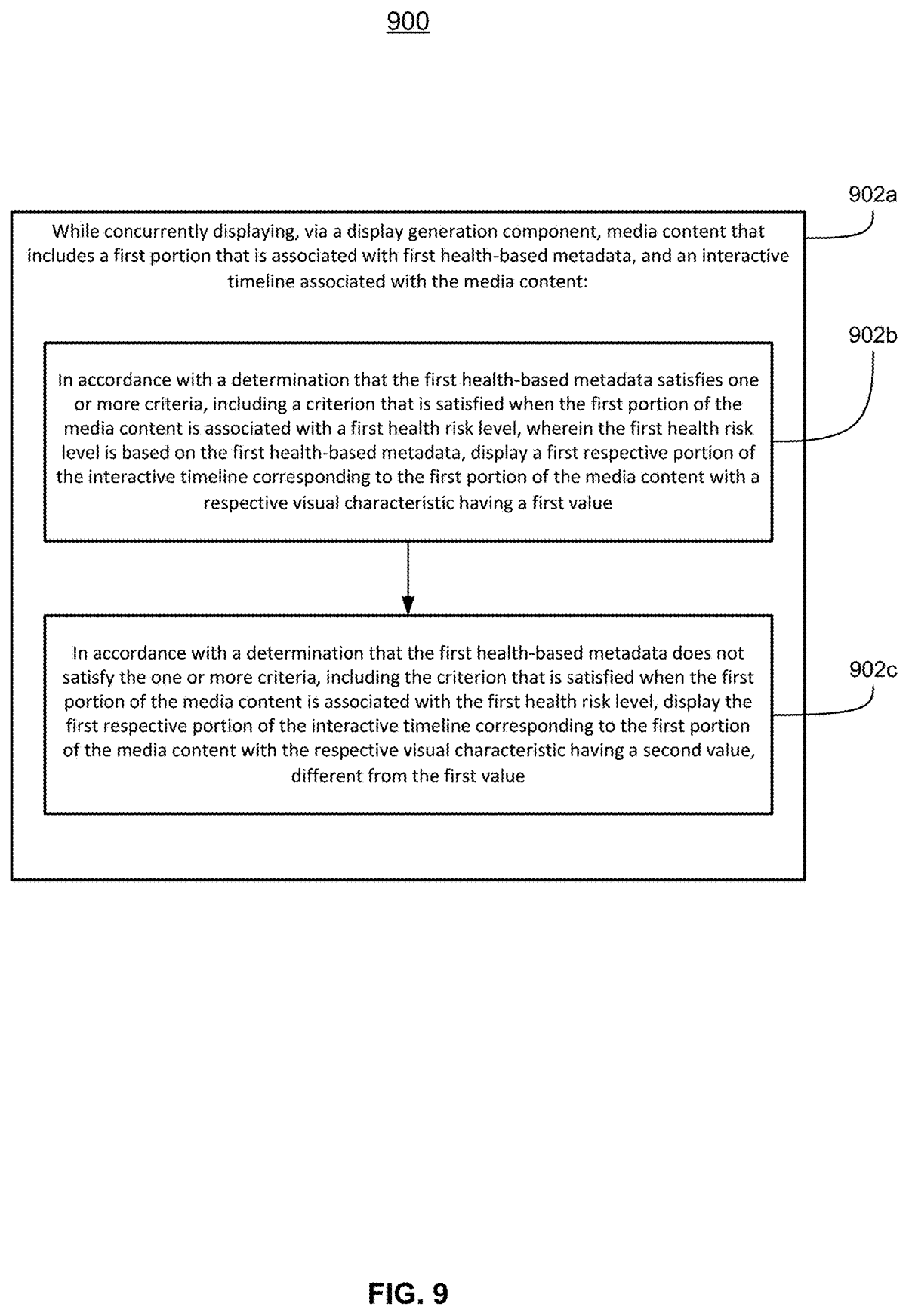

900

902a

While concurrently displaying, via a display generation component, media content that includes a first portion that is associated with first health-based metadata, and an interactive timeline associated with the media content:

902b

In accordance with a determination that the first health-based metadata satisfies one or more criteria, including a criterion that is satisfied when the first portion of the media content is associated with a first health risk level, wherein the first health risk level is based on the first health-based metadata, display a first respective portion of the interactive timeline corresponding to the first portion of the media content with a respective visual characteristic having a first value 902c In accordance with a determination that the first health-based metadata does not satisfy the one or more criteria, including the criterion that is satisfied when the first portion of the media content is associated with the first health risk level, display the first respective portion of the interactive timeline corresponding to the first portion of the media content with the respective visual characteristic having a second value, different from the first value

FIG. 9

HEALTH AWARE MEDIA NAVIGATION AND CONSUMPTION

CROSS-REFERENCE TO RELATED APPLICATIONS

This application claims the benefit of U.S. Provisional Application No. 63/365,878, filed Jun. 5, 2022, the content of which is incorporated herein by reference in its entirety for all purposes.

FIELD OF THE DISCLOSURE

This disclosure relates generally to playback and navigation of media content.

BACKGROUND OF THE DISCLOSURE

User interaction with electronic devices has increased significantly in recent years. These devices can be devices such as computers, tablet computers, televisions, multimedia devices, or mobile devices. At times, a user may wish to consume media content that may present a risk to their health and wellbeing. The user may therefore desire efficient ways for mitigating such a risk while consuming the media content.

SUMMARY OF THE DISCLOSURE

In some circumstances, a first electronic device (e.g., a set top box) can display one or more user interfaces that are configured display and playback media content associated with health-based data and/or metadata. Providing efficient ways of accessing, viewing, and navigating throughout such media content may improve a user's experience with the first electronic and decrease user interaction time, which is particularly important where the input devices are battery-operated.

Some embodiments described in this disclosure are directed to operations to avoid consumption of portions of media content and/or modifying portions of the media content implicating a health risk to the user. Some embodiments described in this disclosure are directed to ways of identifying and navigating throughout such media content during playback. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 9 is a flow diagram illustrating a method of displaying an interactive timeline corresponding to media content associated with health-based metadata in accordance with some embodiments of the disclosure.

DETAILED DESCRIPTION

Figure 1A:
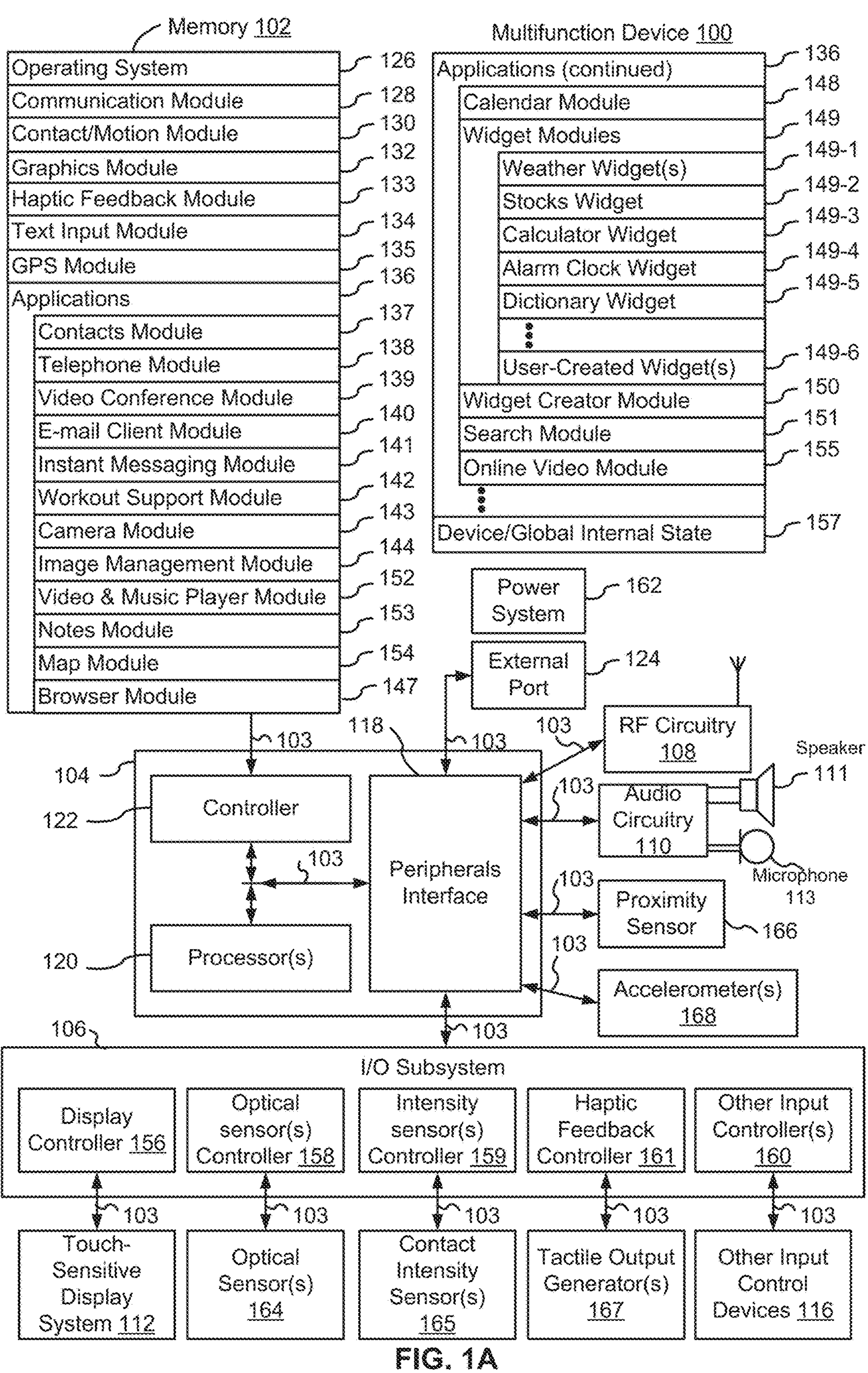
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for mitigating potential health risks when consuming media content. In some implementations, an electronic device performs operations to prevent the user from consuming portions of the media content and/or modifies portions of the media content implicating a health risk to the user. In some implementations the electronic device displays indications associated with such portions of the media content, and allows the user to navigate throughout such media content during playback. Such operations provide efficient ways of informing the user of health risks and navigating through the media content. Further, such operations and techniques can reduce processor and battery power otherwise used to process redundant and erroneous inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
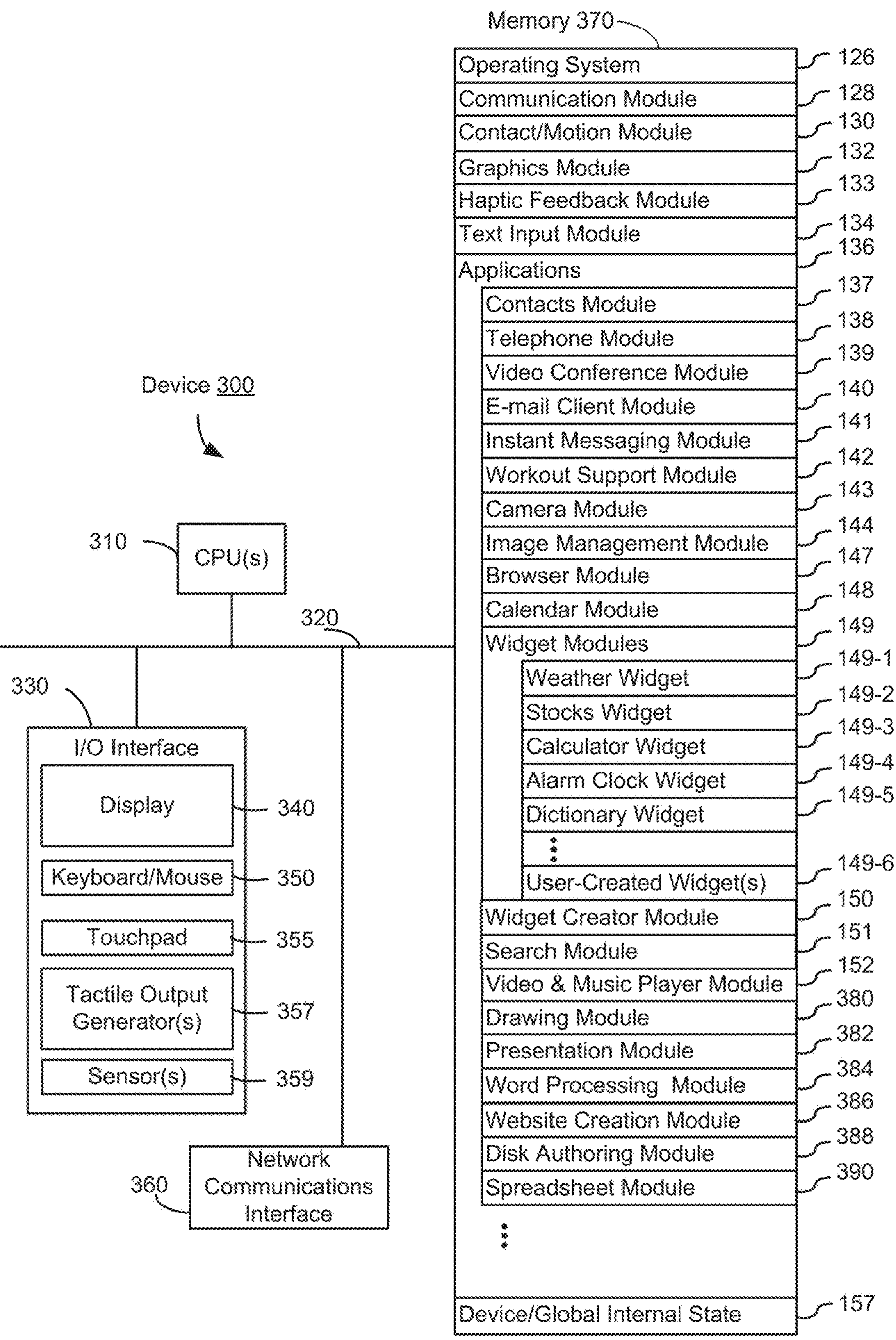
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
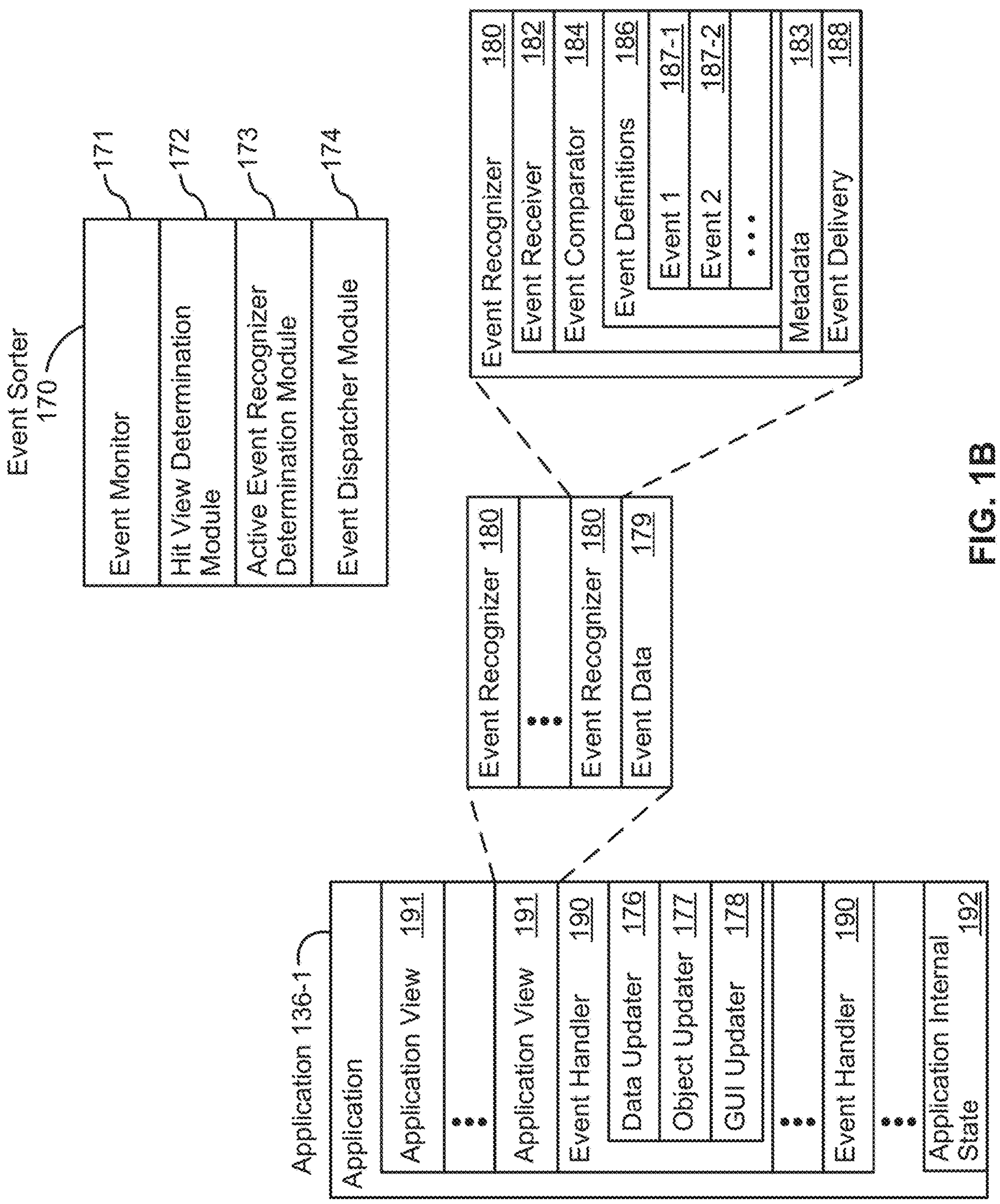
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
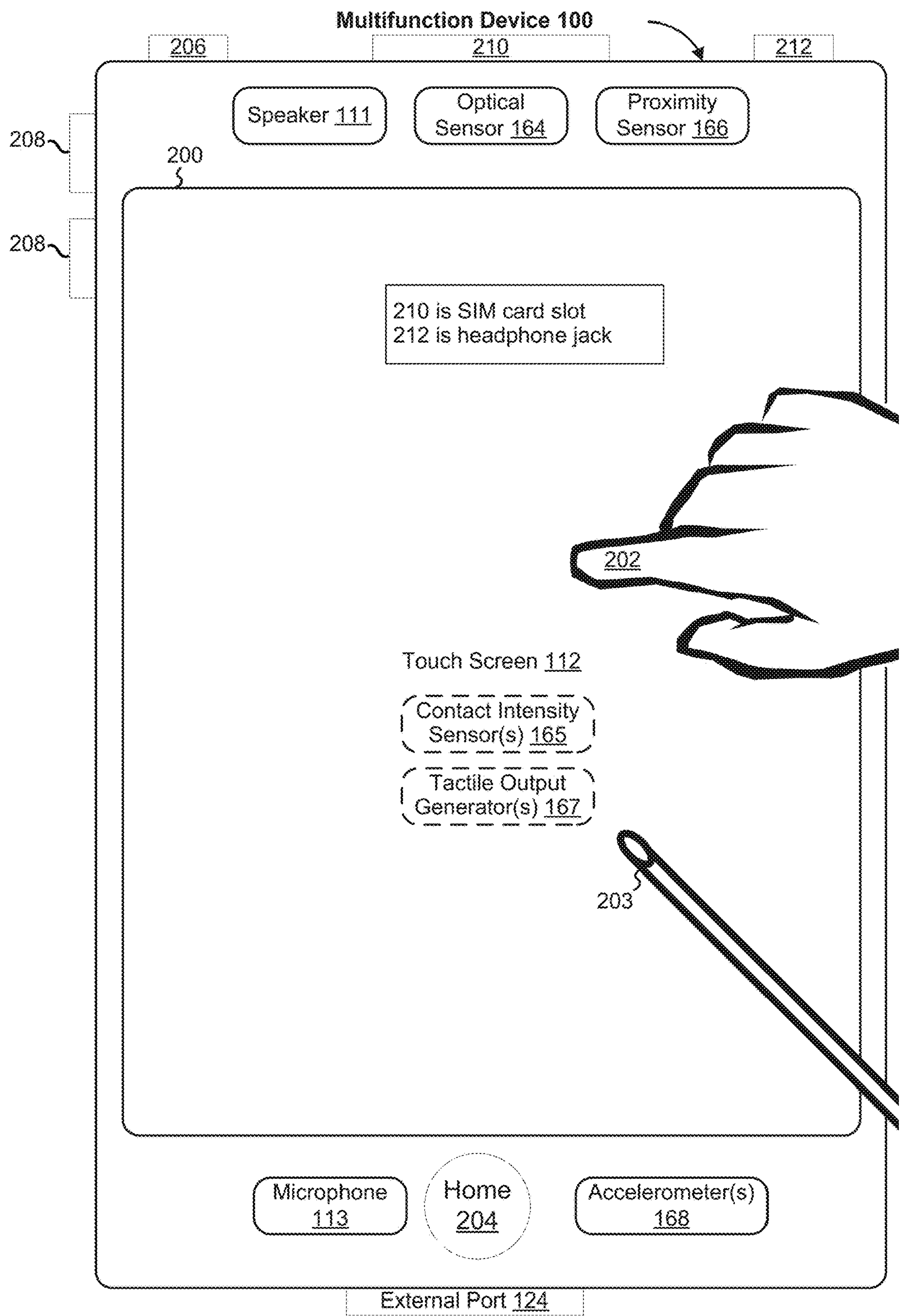
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
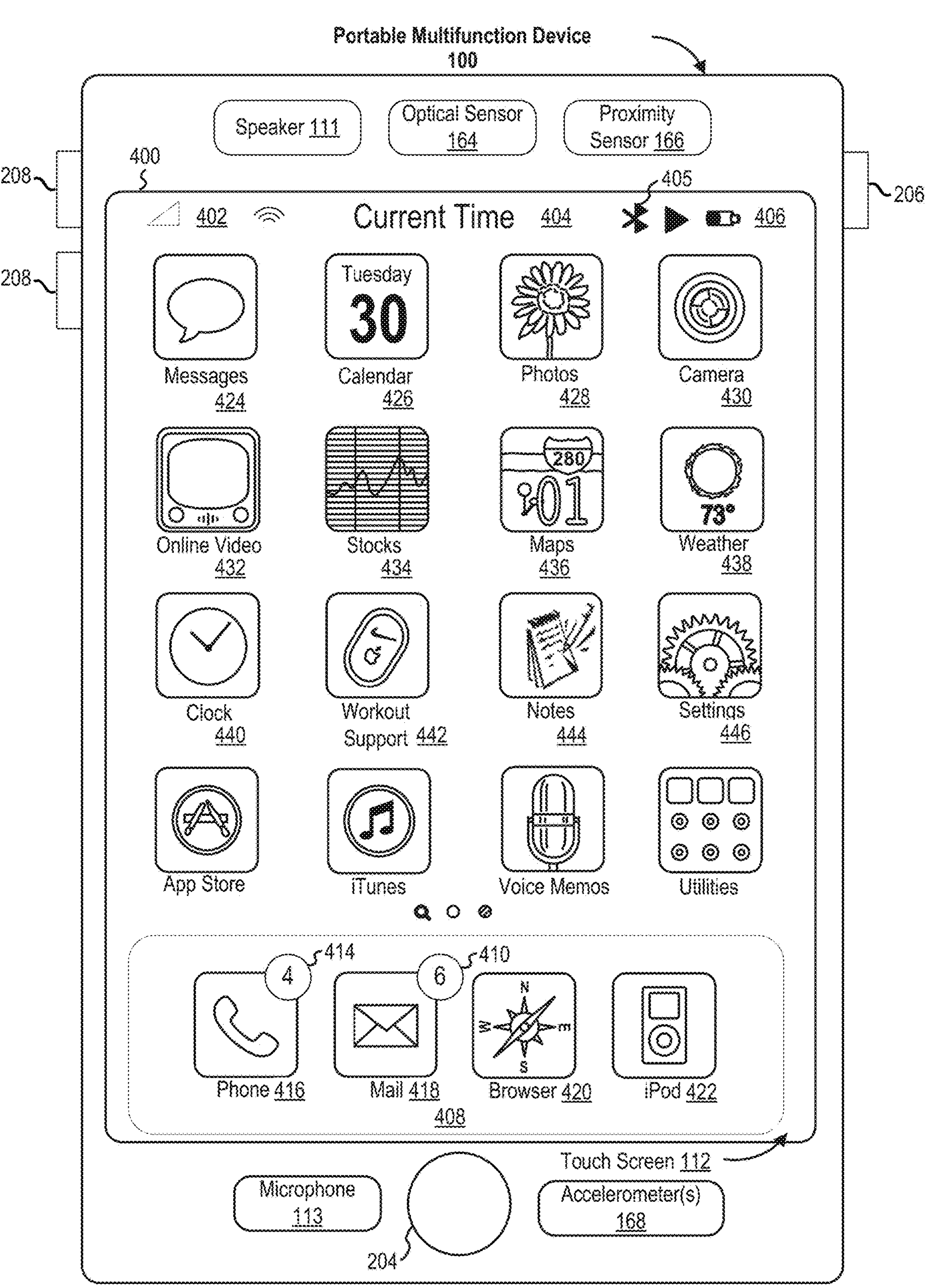
FIG. 4A illustrates an exemplary user interface for a content notice of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
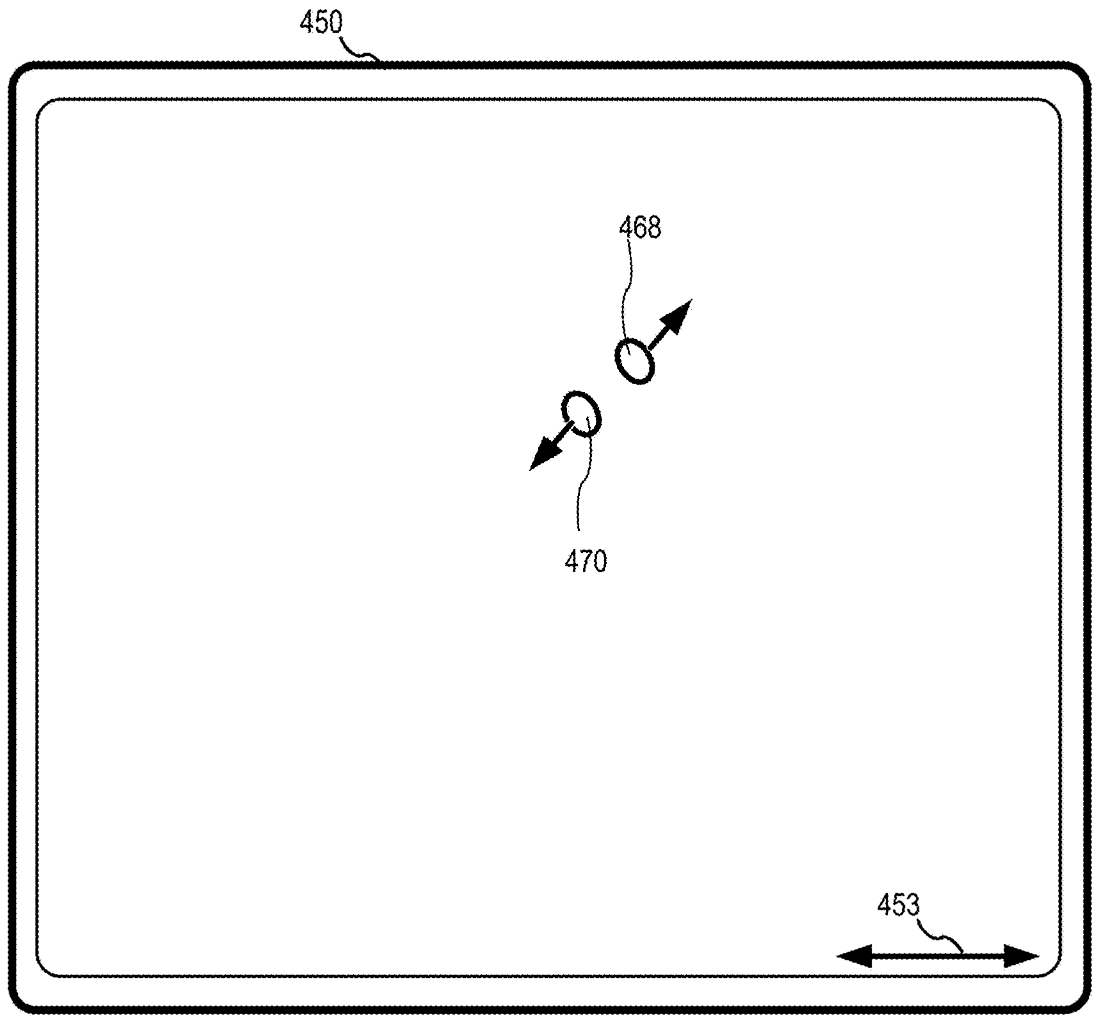
FIG. 4B illustrates an exemplary user interface for a multifunction device with a touch-sensitive surface that is separate from the display in accordance with some embodiments.
Figure 4B:
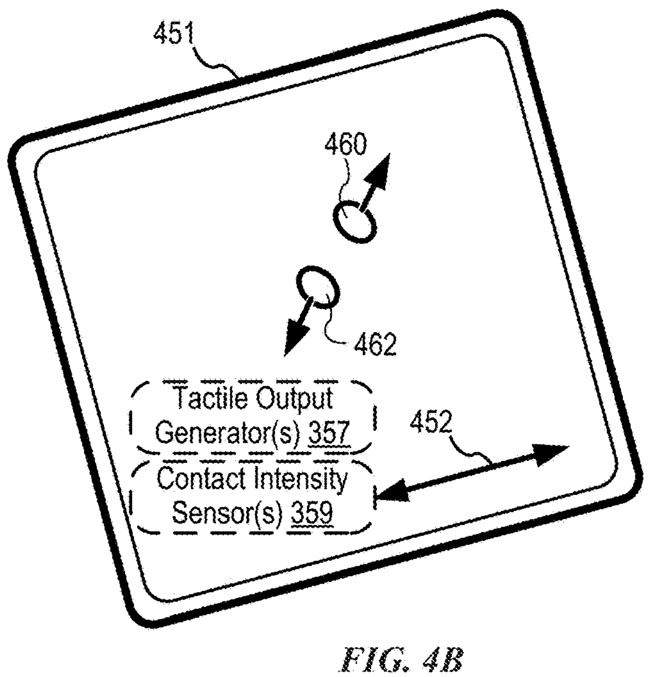

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
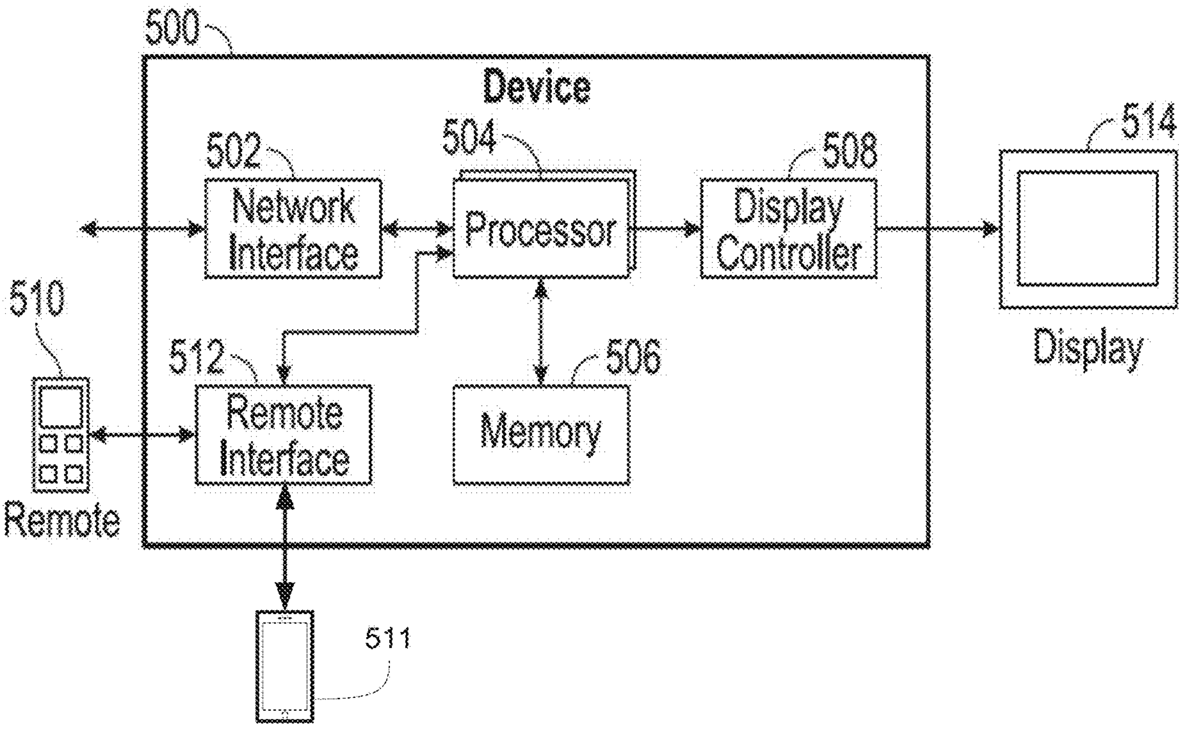
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700 and method 900).

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote interface 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
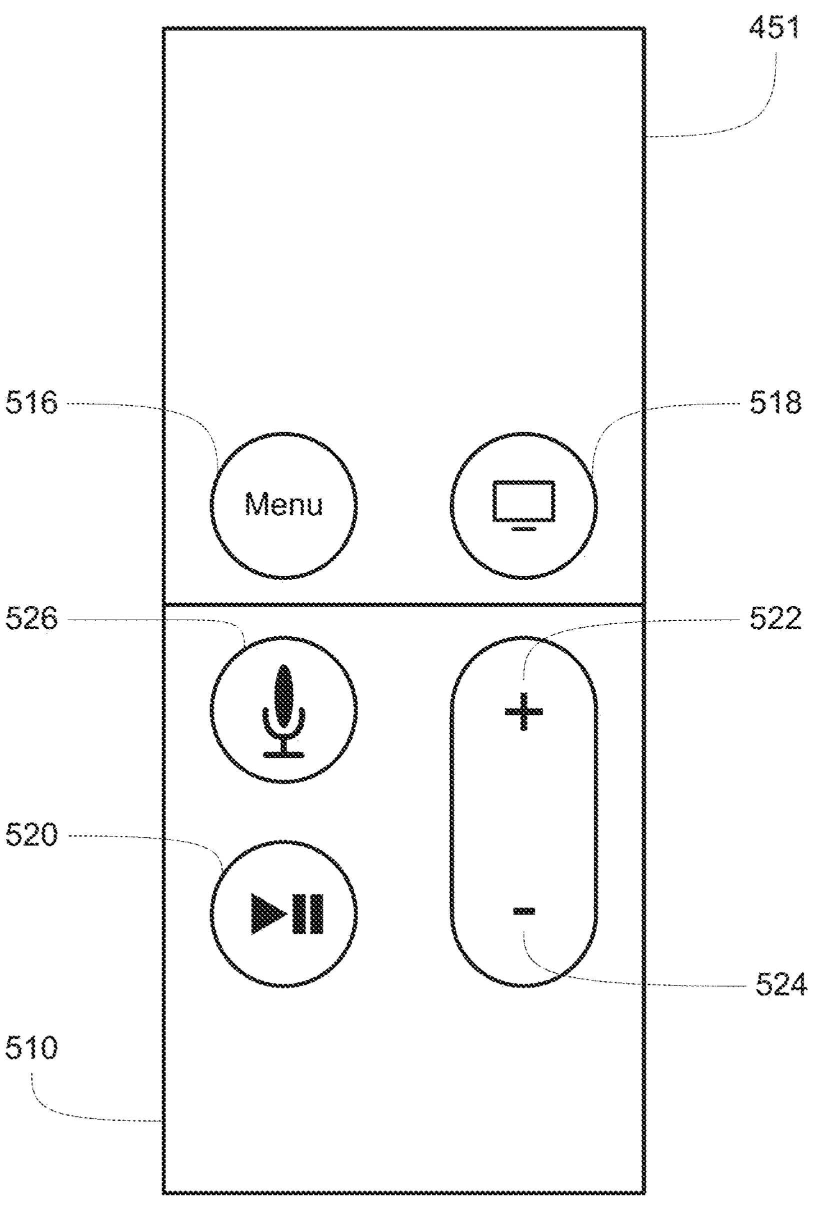

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
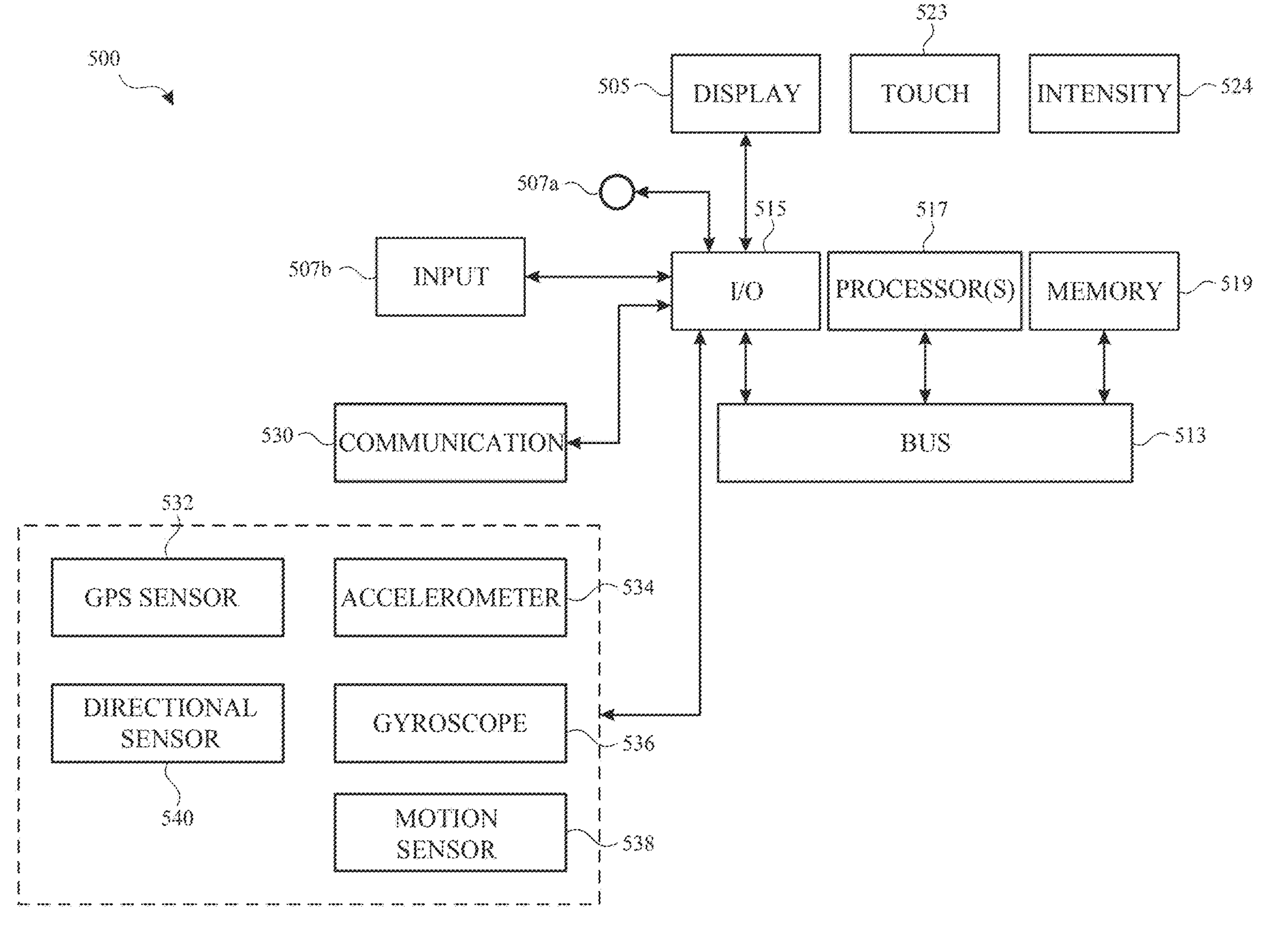

FIG. 5C depicts exemplary personal electronic device 500. In some embodiments, device 500 can include some or all of the components described with respect to FIGS. 1A, 1B, and 3. Device 500 has bus 513 that operatively couples I/O section 515 with one or more computer processors 517 and memory 519. I/O section 515 can be connected to display 505, which can have touch-sensitive component 523 and, optionally, intensity sensor 525 (e.g., contact intensity sensor). In addition, I/O section 515 can be connected with communication unit 530 for receiving application and operating system data, using Wi-Fi, Bluetooth, near field communication (NFC), cellular, and/or other wireless communication techniques. Device 500 can include input mechanisms 507*a* and/or 507*b*. Input mechanism 507*b* is, optionally, a rotatable input device or a depressible and rotatable input device, for example. Input mechanism 507*b* is, optionally, a button, in some examples.

Input mechanism 507*b* is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 515.

Memory 519 of personal electronic device 500 can include one or more non-transitory computer-readable storage mediums, for storing computer-executable instructions, which, when executed by one or more computer processors 517, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" U.S. Application No. 62/822,952, filed Mar. 24, 2019), "User Interfaces For a Media Browsing Application" U.S. Application No. 62/822,948, filed Mar. 24, 2019), and "User Interfaces Specific to Respective Content Items" U.S. Application No. 62/822,966, filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

Sensitivity-Based Content Skipping

Users interact with electronic devices in many different manners, including browsing and consuming media content. In some embodiments, an electronic device determines one or more users actively consuming the media content and presents information based on sensitivity data (e.g., health data) associated with the one or more users. The embodiments described herein provide ways in which the electronic device responds in light of such sensitivity data and, for example, mitigates consumption of media potentially detrimental to a user, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6M illustrate exemplary ways in which an electronic device displays media content associated with health-based metadata in accordance with some embodiments of the disclosure. The embodiments in these figures are used to illustrate the processes described below, including the processes described with reference to FIG. 7. Although FIGS. 6A-6M illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6M.

FIGS. 6A-6M illustrate exemplary ways in which an electronic device displays media content associated with health-based metadata in accordance with some embodiments of the disclosure, as will be described below.

Figure 6B:
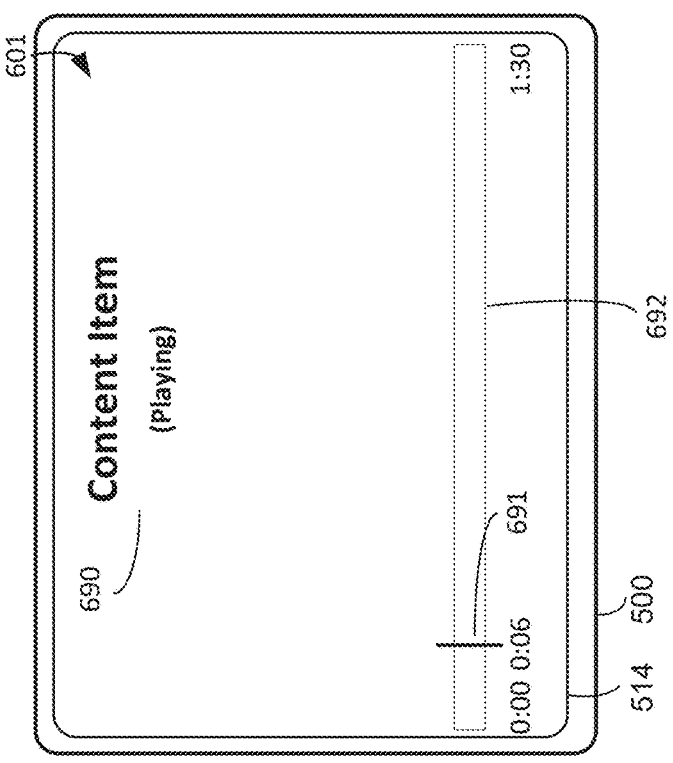
FIGS. 6A-6M illustrate exemplary ways in which an electronic device displays media content associated with health-based metadata in accordance with some embodiments of the disclosure.
Figure 6A:
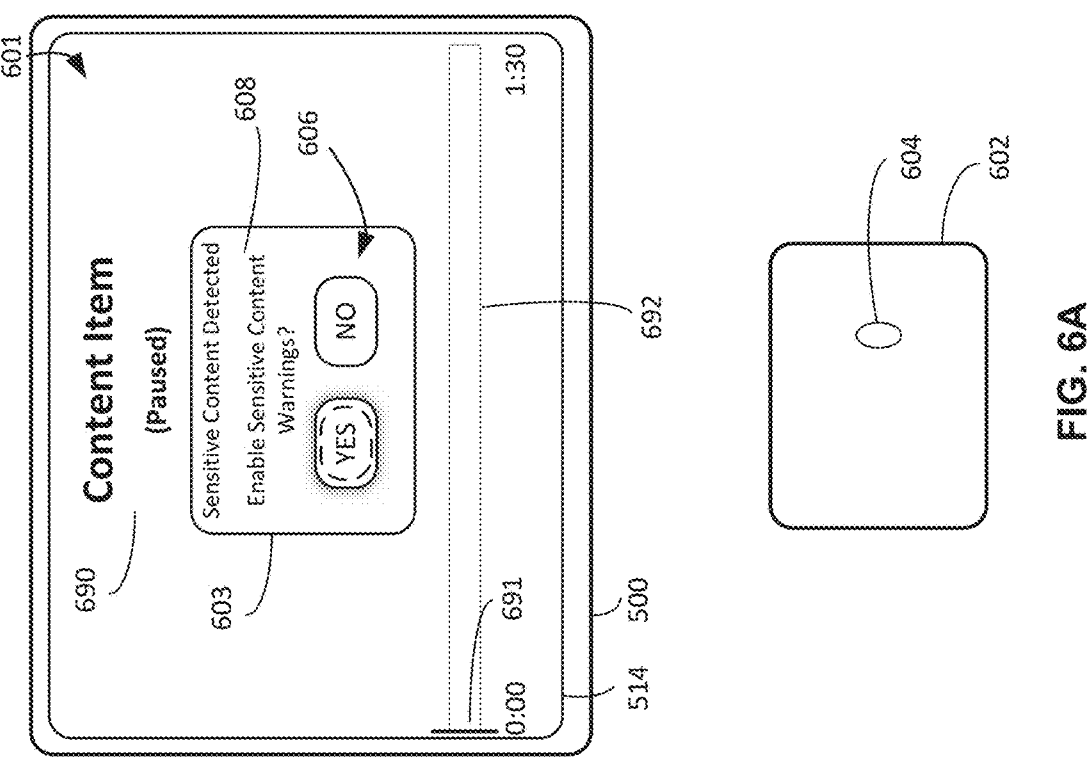

FIG. 6A illustrates a device (e.g., device 500) displaying user interface 601 (e.g., via a display device and/or via a display generation component). In some embodiments, user interface 609 is displayed via a display generation component 514. In some embodiments, the display generation component is a hardware component (e.g., including electrical components) capable of receiving display data and displaying a user interface. In some embodiments, examples of a display generation component include a touch screen display (such as touch screen), a monitor, a television, a projector, an integrated, discrete, or external display device, or any other suitable display device that is in communication with the device. In some examples, a surface (e.g., a touch-sensitive surface) is in communication with the device. For example, in FIG. 6A, the device is in communication with trackpad 602, which is configured to provide touch inputs and indications of such inputs to the device. Trackpad 602 optionally corresponds to touch-sensitive surface 451. In some embodiments, trackpad 602 is representative of a touch-sensitive component of a touch screen (e.g., display 514 is a touch screen). In some embodiments, trackpad 602 is an entirely separate device configured to receive touch input from a user of the electronic device.

In some embodiments, user interface 601 is a user interface of an application or a user interface in which media browsing, input, and interaction are able to be performed (e.g., to obtain, browse, and/or consume media such as video and/or audio). In some embodiments, the application is an application installed on the device.

In FIG. 6A, user interface 601 includes elements for media browsing, consumption, and interaction. In some embodiments, the device is in communication with an input device, such as trackpad 602. As described with respect to FIGS. 8A-8B, in some embodiments, a user of the device selects media content for playback, and in accordance with one or more user health related settings—as described with respect to method 700—the device initiates playback of media 690 and presents a sensitive content prompt for display, such as menu 603 in FIG. 6A. Content notice 603—further referred to as "first information" with respect to method 700—includes textual description 608 indicating that the media content includes content that a user may not want to watch. Content notice 603 includes one or more buttons 606, optionally including respective textual labels indicating what selection inputs directed to respective buttons can do. Media 690 optionally is paused while content notice 603 is displayed such that the user can interact with buttons 606 without missing an opportunity to consume media 690 without visual obstruction.

Content notice 603 optionally is directed to informing a user of the device about sensitive content or content that may cause a negative reaction for the user. As described with respect to method 700, the determination of sensitive or content that may cause a negative reaction optionally is based on aspects of the user profile, such as a stored health condition. As further described with respect to method 700, the device optionally determines that a user corresponding to a user profile known to the device is active (e.g., the user is actively consuming media 690 and/or about to consume media 690). As such, buttons 606 shown in FIG. 6A correspond to selectable options to enable or disable sensitive content warnings or notices while consuming media 690. In some embodiments, a respective button of buttons 606 is displayed with visual emphasis corresponding to a current focus; navigational inputs (e.g., entered at trackpad 602) optionally modify the current focus, and selection input(s) (e.g., a determination of user attention, a tap or double-tap gesture, and/or a pinching gesture by a hand of the user detected by the device) selects the respective button of buttons 606. In some embodiments, user interface 601 shown in FIG. 6A is shown in response to selection of media for playback as described with respect to FIG. 8A and FIG. 8B.

In some embodiments, in response to user input and/or initiating playback of media 690, scrubber bar 692 is displayed. Scrubber bar 692 optionally is an interactive timeline of media 690, and includes playhead 691 that indicates a current playback position of the media 690. Scrubber bar 692 also optionally includes one or more concurrently displayed timestamps that indicate a current playback position, duration of the media content, a starting timestamp of the media, and/or relative times between the current playback position and the start and/or end of media 690. Optionally while the scrubber bar 692 is displayed, gesture 604—corresponding to a selection of a selectable option to enable sensitive content warnings—enables sensitive content warnings during media playback. In some embodiments, after selecting a button included in buttons 606, display of content notice 603 is ceased.

In FIG. 6B, the user has enabled or disabled sensitive warnings as described with respect to FIG. 6A, and playback of media 690 is initiated. Playhead 691 thus indicates the current progress of media consumption (e.g., 6 minutes into the media content). In some embodiments, scrubber bar 692 is displayed in response to an input (e.g., a tap or swipe on a trackpad), and is no longer displayed after a timeout period (e.g., 1, 3, 5, 10, or 15 seconds). Scrubber bar 692 also optionally is displayed for audio and/or video content. It is therefore understood that further description and/or illustration of scrubber bar 692 is used to convey progression of media consumption, but is not necessarily displayed while performing the operations and functions described herein.

Figure 6D:
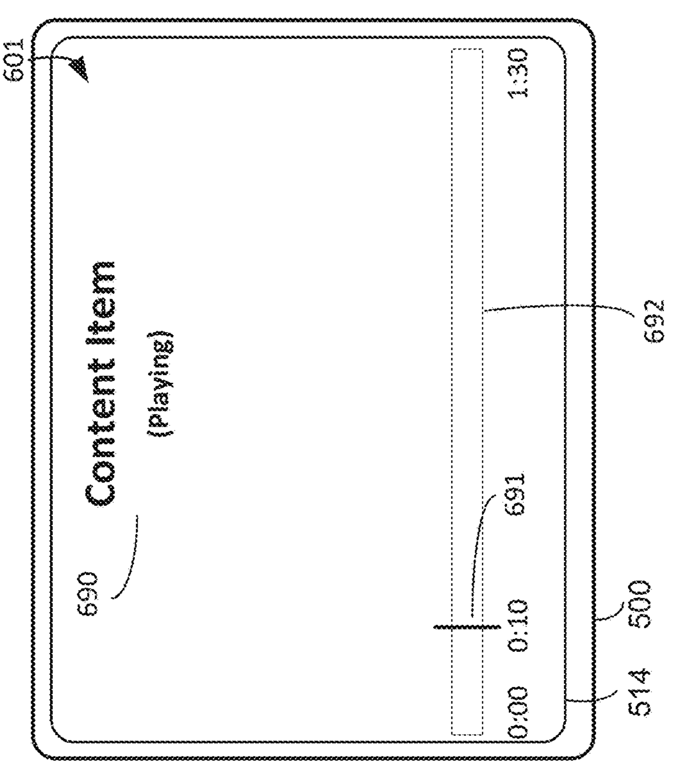
Figure 6C:
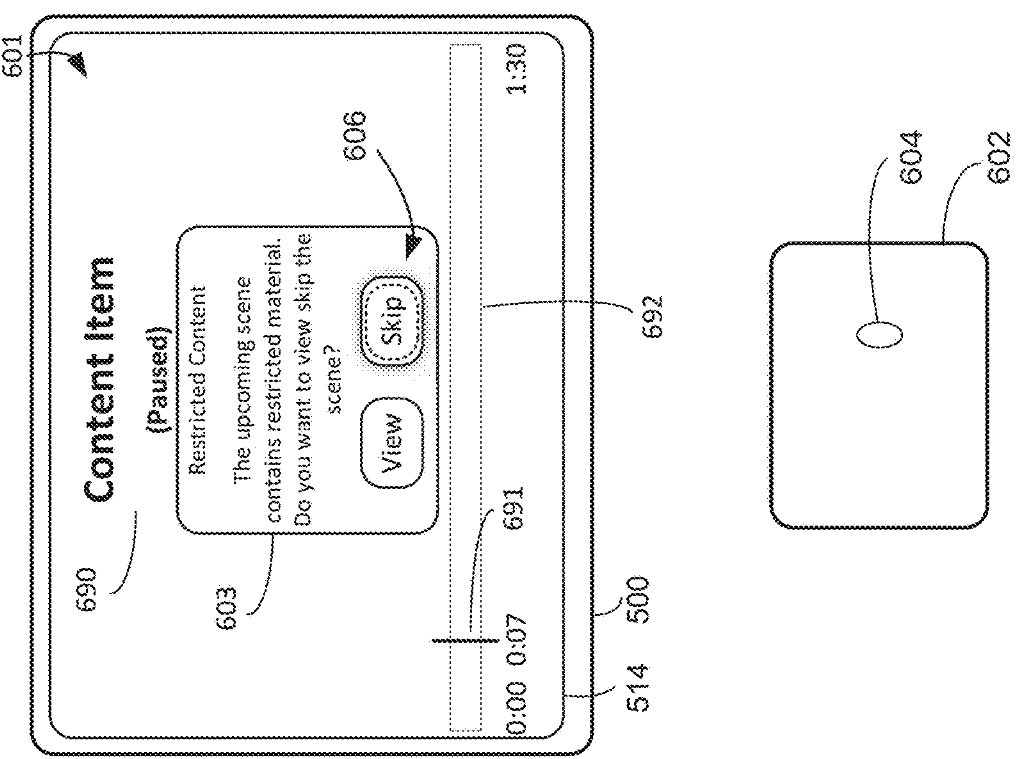

In FIG. 6C, the device determines that an upcoming portion of the media content implicates a user's sensitivity, optionally based on an active user profile (e.g., corresponding to the user that is actively consuming media 690). As described with respect to method 700, the device optionally determines that the user corresponds to an active user profile, and that a portion of the media content presents a potential risk (e.g., a health risk) based on sensitivity data of the user and/or sensitivity metadata associated with the portion of the media content. Description of relevant sensitivity data, metadata, and associated health conditions are further described with respect to method 700. In response to such a determination, content notice 603 is presented to the user. Content notice 603 includes a disclaimer (e.g., "restricted content") based on the sensitivity data of the user corresponding to the sensitivity metadata of the upcoming portion of the media content, and buttons 606 that are selectable to perform one or more functions associated with the portion of media 690. For example, buttons 606 include a selectable option to resume playback, thus allowing the user to consume the portion of media 690, and a selectable option to skip playback of the portion of media 690, such that the user optionally avoids consuming the portion of media 690. Thus, the user optionally is presented the choice to consume or avoid the sensitive portion of media 690 based on their personal risk tolerance and subsequent selection. In FIG. 6C, the user selects the "Skip" option using gesture 604 entered at trackpad 602. Such selection optionally is communicated to the device. In FIG. 6D, after selection of "Skip" described with respect to FIG. 6C, playback of sensitive portion of the content is foregone, and playhead 691 is updated to reflect the skipping of the portion of media 690. As described previously, it is understood that display of scrubber bar 692 is merely for purposes of illustrations, and not necessarily required.

Figure 6F:
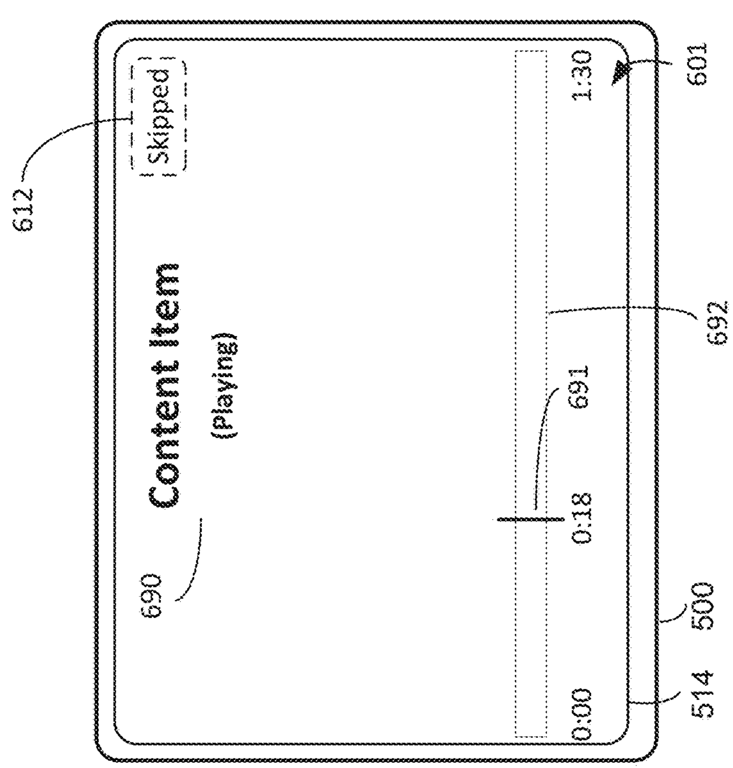

In some embodiments, based on sensitivity information data of an active user profile, sensitivity metadata of portions of media (e.g., media 690), and/or user preferences, sensitive portions of content automatically are skipped. For example, in FIG. 6E, the device optionally displays a disclaimer indicating that sensitive content will soon be presented for consumption and/or is currently being consumed. It is understood that the disclaimer 610 is not necessarily displayed or is displayed only while the user is going to consume or is currently consuming a respective sensitive portion of media 690. In FIG. 6F, in accordance with a determination that the user has specified a setting to skip the content (e.g., in response to a prompt as described with respect to FIG. 6A, and/or in accordance with a user preference in a settings application), playhead 691 is accordingly updated to reflect the new current playback position, and playback of media 690 is resumed at the updated playback position, while disclaimer 612 indicates that the device has skipped a portion of media 690. Thus, without user input, a respective sensitive portion of media 690 optionally is skipped (e.g., not displayed or played for user consumption), proactively protecting the user from content that implicates a user's sensitivity.

In some embodiments, while consuming sensitive content implicating a potential user's sensitivity, a selectable option is displayed to skip consumption of the remaining portion of the sensitive content. As described with respect to FIG. 6C, content notice 603 optionally includes a selectable option to consume a sensitive portion of the media content. For example, in FIG. 6G, "View" button 606-1 is currently selected in content notice 603, and gesture 604—corresponding to a selection gesture—is received at trackpad 602, thus communicating the user's interest in consuming a portion of media 690 implicating a sensitivity. In FIG. 6H, in response to the selection, display of content notice 603 is ceased, playback of the portion of the media content begins and/or resumes, and skip button 695 is displayed in user interface 601 during the playback, optionally with an indication of focus (e.g., a visual emphasis such as a shadow, border, lighting effect, and/or level of opacity). In some embodiments, skip button 695 is displayed while the sensitive portion of media 690 is being consumed and is not displayed when the sensitive portion of media 690 is complete. For example, a scene in a movie displaying bright flashing lights optionally implicates sensitivity (e.g., a risk) to an active user (e.g., consuming media 690), and while the active user is consuming the scene, skip button 695 is displayed. As shown by the lack of interaction with trackpad 602, the skip button 695 persists in user interface 601, regardless of whether or not user input is received while displaying the portion of media content. In FIG. 6I, scrubber bar 692 is no longer displayed (in response to an input dismissing the scrubber bar and/or a timeout period) but skip button 695 is maintained in user interface 601, and user input selecting skip button 695—corresponding to gesture 604 entered at trackpad 602—is received. Accordingly, in FIG. 6J, playhead 691 is updated to reflect the updated current playback position corresponding to the end of the sensitive portion of media 690.

In some embodiments, an active user of the device is presented a prompt to view a summary of a scene implicating a sensitivity of the user. For example, in FIG. 6K, content notice 603 is shown including button 606-2 to view a summary of a portion of the media content that may implicate the user's sensitivity (e.g., based on data corresponding to the user's profile, metadata associated with the portion of the media 690, and/or based on preferences in a settings application stored on the device), and button 606-4 is selectable to resume playback of the media 690. Furthermore, content notice 603 optionally includes a description associated with the metadata of the scene. For example, content notice 603 optionally describes a reason why the upcoming portion of media 690 is determined to be sensitive. Such a description optionally is generic (e.g., generally describing that an upcoming scene in a movie includes sensitive content) or more specific to the user's sensitivity data and/or the metadata (e.g., linking content in the scene to a sensitivity indicated by the user's data in an application stored on the device). In some embodiments, in response to selecting button 606-2, the current playback position is updated to the end of the portion of the media content. In some embodiments, selectable option 606-2 is optionally displayed additionally or alternatively to the buttons described with respect to FIG. 6C and FIG. 6G. In FIG. 6K, user input corresponding to a selection of selectable option 606-2 is received—corresponding to gesture 604 received at trackpad 602—and in FIG. 6L, content notice 603 is updated in response to the selection. In FIG. 6L, content notice 603 optionally includes a description of the portion of media 690 (e.g., a description of a portion of audio and/or video) such that the user understands the substance of the skipped portion of media 690 without consuming the skipped portion. Moreover, content notice 603 includes button 606-3 that is a selectable option to resume playback of media 690 and the newly updated playback position. In some embodiments, while displaying content notice 603 as described in the foregoing embodiments (e.g., FIGS. 6C, 6G, and 6K), the media content is blurred and/or obscured, such as shown in FIG. 6M. For example, media 690 optionally is subject to a blurring effect, an opaque overlay, or other visual effect. Such effects can obscure portions of the media that are immediately sensitive to the user and/or enhance the visual emphasis in user interface 601 of content notice 603. For example, an active user profile implicating sensitivity to substance abuse may not wish to see any image(s) or depictions of problematic substances, and as such, the applied visual effect optionally prevents the active user corresponding to the active user profile from viewing the image(s).

Figure 7:
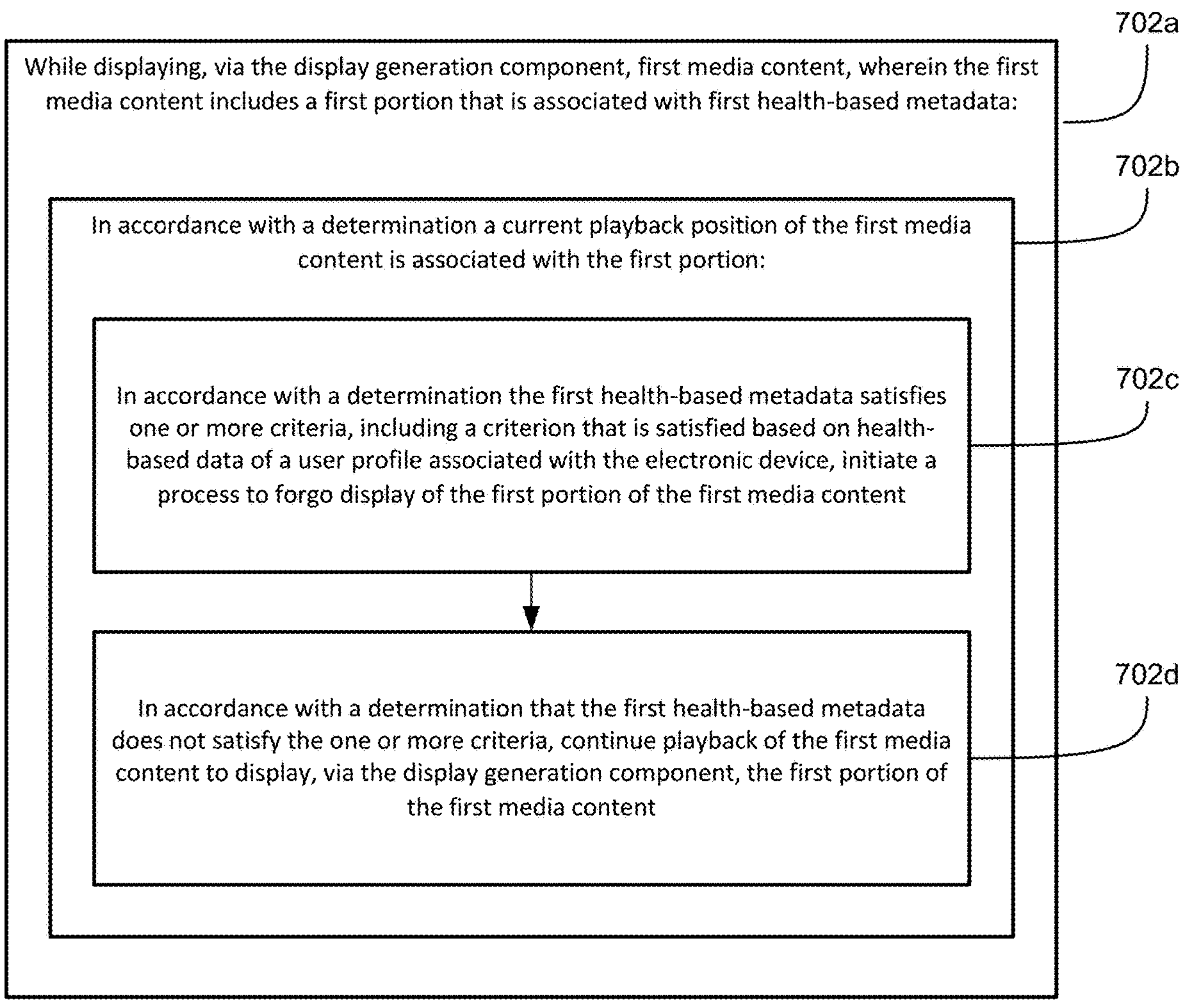
FIG. 7 is a flow diagram illustrating a method of displaying media content associated with health-based metadata in accordance with some embodiments of the disclosure.

FIG. 7 is a flow diagram illustrating a method of navigating media content implicating user's sensitivity (e.g., health risk) in accordance with some embodiments of the disclosure. The method 700 is optionally performed at electronic devices such as device 100, device 300, or device 500 as described above with reference to FIGS. 1A-1B, 2-3, 4A-4B and 5A-5C. In some embodiments, method 700 is performed at or by an automobile (e.g., at an infotainment system of an automobile having or in communication with one or more display generation components and/or input devices). Some operations in method 700 are, optionally combined and/or order of some operations is, optionally, changed.

As described below, the method 700 provides ways in which an electronic device facilitates navigating media consumption and user sensitivity mitigation. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices. For example, a mobile device (e.g., a tablet, a smartphone, a media player, or a wearable device), a set-top box or computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external). In some embodiments the display generation component is a display integrated with the electronic device (optionally a touch screen display in which the display generation component includes an input device), external display such as a monitor, projector, television, and/or a hardware component (optionally integrated or external) for projecting a user interface or causing a user interface to be visible to one or more users.

In some embodiments, the electronic device displays, via the display generation component, first media content, such as media 690, wherein the first media content includes a first portion that is associated with sensitivity metadata (e.g., health-based metadata). In some embodiments, displaying the first media content includes playing back the first media content. In some embodiments, the first media content includes audio and/or video stored locally on electronic device 500 and/or communicated to the electronic device 500 over a network interface. In some embodiments, the first media content includes auditory and/or visual content that to some audiences is offensive, or may pose a sensitivity risk to the user. For example, the first media content is a movie having one or more sequences including violent, visceral, or offensive visual and/or auditory content that may be offensive, overwhelming, and/or detrimental for a consumer of the movie. Accordingly, in some embodiments, a party associated with the creation, distribution, and/or viewing of the first media content identifies and tags portions (e.g., including a first portion) of the first media content with sensitivity metadata (e.g., health-based). In some implementations, at least one machine learning model is used to identify and tag portions of the media content with sensitivity metadata tags. In some embodiments, the sensitivity metadata is provided separately (e.g., via a separate communication process, channel, and/or a served at a different time) than the first media content. In some embodiments, the first media content is provided with the sensitivity metadata (e.g., via the same or a similar communication process, channel, and/or at the same time as the first media content). In some embodiments, the sensitivity metadata is determined by electronic device 500 during consumption of and/or immediately prior to consuming the first media content (e.g., the device analyzes the first media content to identify, such as through image or other content recognition algorithms, sections of the first media content that may implicate a sensitivity to the consumer of the first media content; for example, the user of the electronic device). Such sensitivity metadata is not limited in any way, and optionally includes descriptive information, structural information, and/or time-related information to enable devices displaying the first media content to have a contextual tag to identify the portions associated with potentially sensitive content. For example, the sensitivity metadata optionally includes descriptive tagging (e.g., the corresponding portion of media content includes photosensitive content) and/or time-based tagging (e.g., the corresponding portion of media content spans from the 10 to 30 second mark of the media content). It is understood that description of "health metadata," "health data", "health risk," and "health risk level" should not be construed as implicating [that] that the metadata, data, risk, and risk level is restricted to "health" specifically, but broadly refers to user sensitivity, including health-related data and risks (e.g., sensitivity metadata, sensitivity data, sensitivity risk, and sensitivity risk level, respectively). Moreover, description of health risks of portions of media does not implicate that the media inherently presents a risk to the user.

In some embodiments, the sensitivity metadata includes a description or label corresponding to a health condition or sensitivity category. For example, the first portion optionally is tagged with a descriptor corresponding to a photosensitive condition (e.g., epilepsy) and/or tagged with a descriptor associated with explicit content (e.g., violence or nudity). In some embodiments, the descriptor tag is accompanied by a tagged level of risk (e.g., a numeric representation of risk and/or a qualitative description of risk). In some embodiments, the portion is tagged with a plurality of descriptors, and in some embodiments, each respective descriptor is tagged with or accompanied by a corresponding tag quantifying and/or qualifying the level of risk. In some embodiments, respective portions of content are tagged independently of each other with sensitivity metadata (e.g., corresponding to a health condition risk or sensitivity risk) based on the contents of the respective portions. In some embodiments, respective portions of content are tagged with a similar, overlapping, or the same set of sensitivity metadata (e.g., describing the associated health condition or sensitivity risk) and a corresponding quantifier or qualifier of the risk. For example, a first portion of a video devoid of sensitive content optionally is tagged with an epileptic risk level described as "very low" or 0% risk, and a second portion of the video including a sequence of rapidly flashing lights (e.g., in excess of 30 Hz) is optionally tagged with an epileptic risk level described as "very high" or 90% risk.

In some embodiments, a respective portion of a movie including rapidly flashing lights optionally is tagged with sensitivity metadata such that a device or component displaying the movie proactively and/or in real time notifies a consumer of the movie that the movie includes photosensitive content. In some embodiments, the respective portion of the movie includes static or slow-moving lights arranged on a display in a way that is potentially photosensitive to a photosensitive user and warrants a notification. Such notifications (e.g., a notification that a movie or a portion of the movie includes photosensitive content) optionally protects consumers from inadvertently viewing content that implicates a sensitivity (e.g., to a user that has photosensitive health conditions such as epilepsy). In some embodiments, a respective portion of the first media content is tagged with a plurality of different sensitivity metadata, thus linking the portion of the media content to multiple user conditions (e.g., epilepsy, post-traumatic stress disorder, sensitivity to violence, and/or age inappropriate). In some embodiments, the sensitive content is associated with psychological conditions and experiences, such as metadata associated with depictions of violent or traumatic content. In some embodiments, the sensitive content is associated with nudity, and/or sexuality. In some embodiments, the media is auditory, and the metadata is associated with the audible content (e.g., profanity, loud or harsh noise(s), and/or traumatic and violent audio). In some embodiments, the sensitivity metadata is tagged by one or more algorithms as part of the content delivery network associated with the electronic device. In some embodiments, the health-based metadata is served by the media provider.

In some embodiments, while the electronic device displays the first media content (702_a_), in accordance with a determination a current playback position, such as playhead 691, of the first media content is associated with the first portion (702_b_) and in accordance with a determination the first sensitivity metadata satisfies one or more criteria, including a criterion that is satisfied based on sensitivity data of a user profile associated with the electronic device, the electronic device initiates (702_c_) a process to forgo display of the first portion of the first media content, such as shown in FIGS. 6A, 6C, 6H and 6K. For example, before or while playing the first media content, a device playing the first media content optionally determines a current playback position (e.g., the start of the first media or the currently playing portion of the media) of the first media content is within a threshold amount of time (e.g., 0.5, 1, 2, 5, 10, 15, 20, or 30 seconds) of a portion of the first media linked to and/or associated with the sensitivity metadata. In some embodiments, the current playback position is the start of the media playback. In some embodiments, the device playing the first media content makes a similar or the same determination of an association between the current playback position and one or more respective portions of the first media content, other than the first portion. In some embodiments, the criterion optionally is satisfied when the sensitivity data of the user profile indicates a photosensitive health condition and the first sensitivity metadata corresponding to the first portion of the first media content, referred to herein as a "sensitive portion" of the first media content, indicates that the first portion includes content that presents a (low, moderate or high) risk to users with photosensitive health conditions as described later with respect to method 900. For example, the criterion optionally is satisfied when the sensitivity data of the user profile indicates an emotional and/or psychological trauma related condition, and the first sensitivity metadata and/or the sensitive portion of the first media content indicates that the first portion presents a (low, moderate, or high) risk to users with such health conditions. For example, the criterion optionally is satisfied when the sensitivity data of the user profile indicates a condition associated with predisposition to substance abuse, and the first sensitivity metadata and/or the sensitive portion of the first media content indicates that the first portion presents a (low, moderate, or high) risk to users with such health conditions. In some embodiments, the process to forgo display includes displaying one or more selectable options to engage with the sensitive portion of the first media, such as viewing descriptions or skipping the current playback position past the sensitive portion of the first media. In some embodiments, the process includes automatically skipping the sensitive portion of the first media if the current playback position is associated with the sensitive portion (e.g., is within a threshold amount of time of the sensitive portion). In some embodiments, the user profile is configurable by the user to include or indicate one or more health conditions and/or viewing restrictions (or by a master user associated with the user, such as a parent) for the user.

In some embodiments, the user profile association corresponds to a user profile that is currently logged in at the electronic device. For example, the electronic device optionally receives an indication of user credentials corresponding to the user profile such as biometric, authentication (e.g., username and/or password) and/or cryptographic information (e.g., cryptographic keys) identifying the user of the electronic device, and in accordance with a determination that the indication corresponds to the user profile, the electronic device logs in and selects the user profile. In some embodiments, the user profile is previously enrolled at the device and an indication of the user credentials—or the user credentials itself—corresponding to the user profile are stored at the electronic device. In some embodiments, the user profile is not stored at the electronic device, but the electronic device has established a relationship with the user profile. For example, the user profile optionally is associated with a secondary device (e.g., a tablet computing device, a mobile phone, or a wearable device) in communication with the electronic device and thus is known to the electronic device. In some embodiments, the association between the user profile and the electronic device—referred to herein as an "active user" and/or an "active user profile"—includes the electronic device determining that the user corresponding to the user profile is viewing the first media content. For example, the electronic device optionally determines a secondary device corresponding to the user profile (e.g., logged into the user profile) is in proximity (e.g., within view or earshot, and/or within a threshold distance such as 0.1, 0.5, 1, 3, 5, 10 or 20 m) of the electronic device, the display generation component, and/or the first media content. In some embodiments, the electronic device receives an indication that the user's attention (e.g., gaze) is directed to the first media content (e.g., using an eye tracking device) and/or the electronic device determines that the user is present based on facial recognition of the user.

In some embodiments, in accordance with a determination that the first sensitivity metadata does not satisfy the one or more criteria (e.g., the first sensitivity metadata does not correspond to or match health conditions, if any, indicated in the sensitivity data of the user profile and/or the first sensitivity metadata does not correspond to or exceed health condition thresholds, if any, indicated in the sensitivity data of the user profile), the electronic devices continues (702_d_) playback of the first media content to display, via the display generation component, the first portion of the first media content, such as in between FIG. 6A and FIG. 6B. For example, if the first sensitivity metadata does not present a risk or presents a low-risk to the user corresponding to the user profile, the process to forgo display optionally is itself forgone, and media playback optionally continues. Automatically initiating a process to skip content based on health metadata of users of the device (e.g., that the device knows are actively watching content on the device) reduces the need for inputs to skip sensitive content and/or verify if the media content includes sensitive content, thus reducing power consumption and operations required for such inputs.

In some embodiments, the first media content includes a second portion, different from the first portion, that is associated with second sensitivity metadata, different from the first sensitivity metadata, such as a second respective portion of media 690. For example, the electronic device optionally determines that the second portion does not implicate a health condition based on the second sensitivity metadata, or that the second portion presents a low risk to the user corresponding to an active user profile. The second sensitivity metadata optionally has one or more characteristics of the first sensitivity metadata described herein.

In some embodiments, while the electronic device displays, via the display generation component, the first media content, such as media 690, in accordance with a determination the current playback position, such as playhead 691, of the first media content is associated with the second portion, and in accordance with a determination that the second sensitivity metadata does not satisfy the one or more criteria, including the criterion that is satisfied based on the sensitivity data of the user profile associated with the electronic device, the electronic device displays, via the display generation component, the second portion of the first media content without initiating a process to forgo display of the second portion of the first media content, such as the media playback that occurs between FIG. 6A and FIG. 6B. For example, before or while playing the first media content, a device playing the first media content optionally determines a current playback position (e.g., the start of the first media or the currently playing portion of the media) of the first media content is within a threshold amount of time (e.g., 0.5, 1, 2, 5, 10, 15, 20, or 30 seconds) of a portion of the first media linked to and/or associated with the second sensitivity metadata.

For example, the device playing the first media content optionally determines that the second sensitivity metadata does not present a risk to the user, and in response continues playback of the first media content. In some embodiments, the one or more processes described with respect to method 700 optionally to forgo display of a portion (e.g., the second portion) of the first media content are not initiated. For example, the one or more processes to display information to the user concerning the health implications of the second portion of the media are optionally not performed such that the information is never prepared for display or suppressed from being displayed. Not initiating the process to forgo display of the second portion reduces the processing required to perform the process to forgo the display of portions of the media, and avoids extra input needed to resume playback when pausing or skipping playback was not necessary.

Figure 8B:
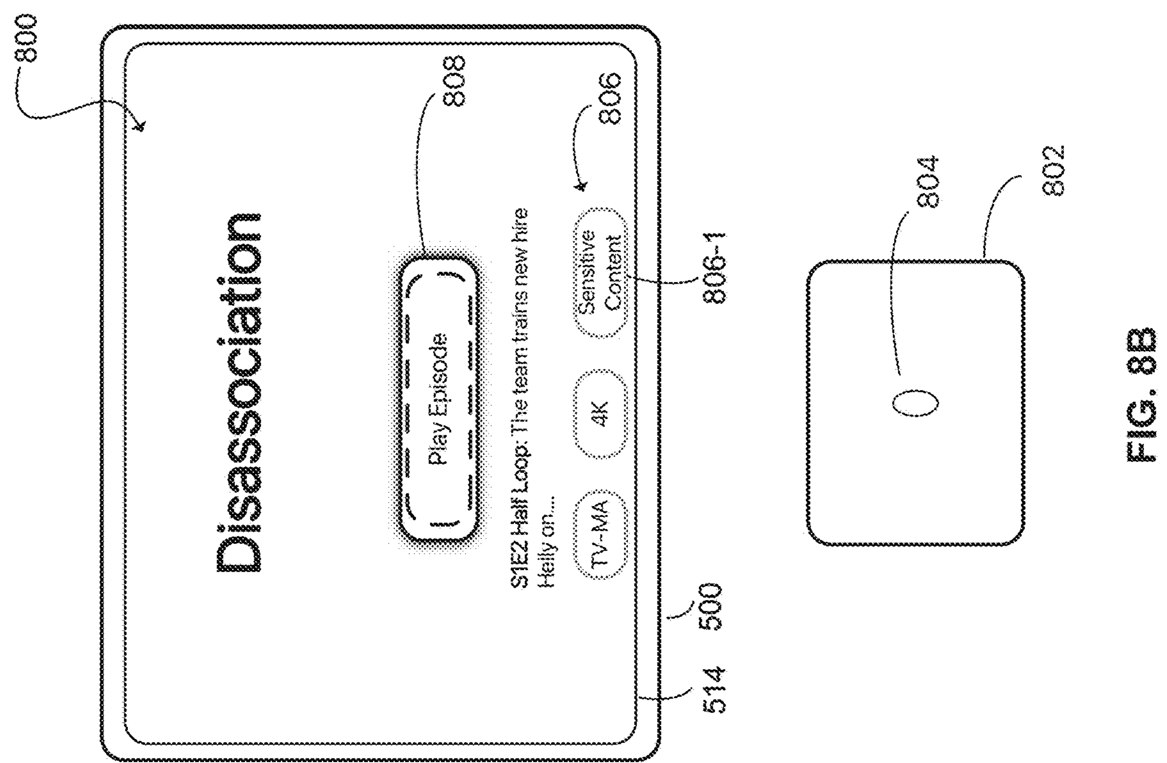
FIGS. 8A-8R illustrate exemplary ways in which an electronic device displays an interactive timeline corresponding to media content associated with health-based metadata in accordance with some embodiments of the disclosure.

In some embodiments, the electronic device receives, via the one or more input devices, a first input, such as gesture 804 shown in FIG. 8B, corresponding to a request to initiate the displaying, via the display generation component, of the first media content. For example, a user of the electronic device optionally provides one or more inputs via a remote control device in communication with the electronic device to select media content for playback from a media content user interface. In some embodiments, in response to receiving, via the one or more input devices, the first input corresponding to the request to initiate the displaying of the first media content, the electronic device displays, via the display generation component, first information, such as content notice 603 including a first selectable option such as the "Yes" button of buttons 606 in FIG. 6A. For example, the first information optionally includes a content notice item including one or more selectable buttons. In some embodiments, the first information includes a warning or descriptor concerning the nature of content included in the media content, such as a disclaimer that the media content presents a risk to users having one or more health conditions known to the electronic device. In some embodiments, the electronic device determines that an active user profile at the electronic device implicates a health condition, and in response, enables the content skipping mode without displaying the first information. In some embodiments, the electronic device determines that a user profile implicating a health-sensitive condition is active using the sensitivity data of the user profile and/or the sensitivity metadata, and enables the content skipping mode in response to the determination (e.g., without receiving the first input).

In some embodiments, while displaying, via the display generation component, the first selectable option, the electronic device receives, via the one or more input devices, a second input, such as gesture 604 in FIG. 6A, corresponding to selection of the first selectable option. In some embodiments, in response to receiving the second input corresponding to selection of the first selectable option, the electronic device enables a content skipping mode associated with the first media content, such as shown in FIG. 6A. For example, the user of the electronic devices optionally selects a button corresponding to an enabling of sensitive content warnings. In some embodiments, a second selectable option is included in the first information (e.g., the content notice), and selection of the selectable option disables the content skipping mode. In some embodiments, the first selectable option or the second selectable options is selected after a threshold amount of time (e.g., 1, 3, 5, 7.5, 10, 15, or 30 seconds) after displaying the first information without receiving a user input selecting one of the selectable options. In some embodiments, the electronic device determines that a user profile implicating a health-sensitive condition is active while the first media content is being consumed using the sensitivity data of the user profile and/or the sensitivity metadata and enables the content skipping mode in response to the determination (e.g., without receiving the second input). Conversely, the electronic device optionally determines that the active user profile(s) do not implicate a health sensitive condition, and as such forgoes display of the first information and/or does not enable (or disables) the content skipping mode. In some embodiments, in accordance with a determination that the first selectable option was previously selected, the electronic devices forgoes display of the first information. For example, the electronic device optionally is aware that the content skipping mode was selected (e.g., during a current or previous session of content consumption), and thus forgoes display of the first information. Enabling a content skipping mode prevents subsequent user inputs required to skip through sensitive portions of media content.

Figure 6E:
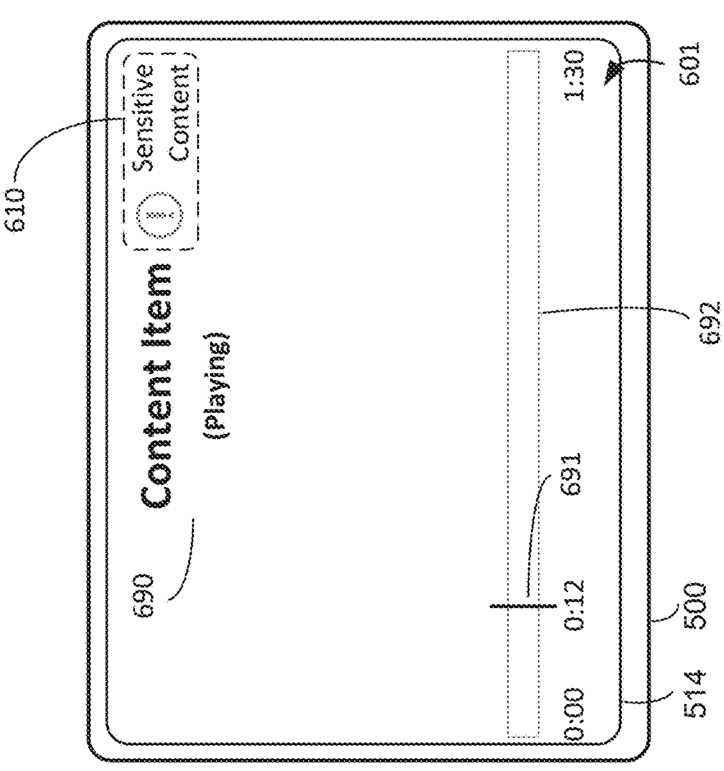
Figure 6H:
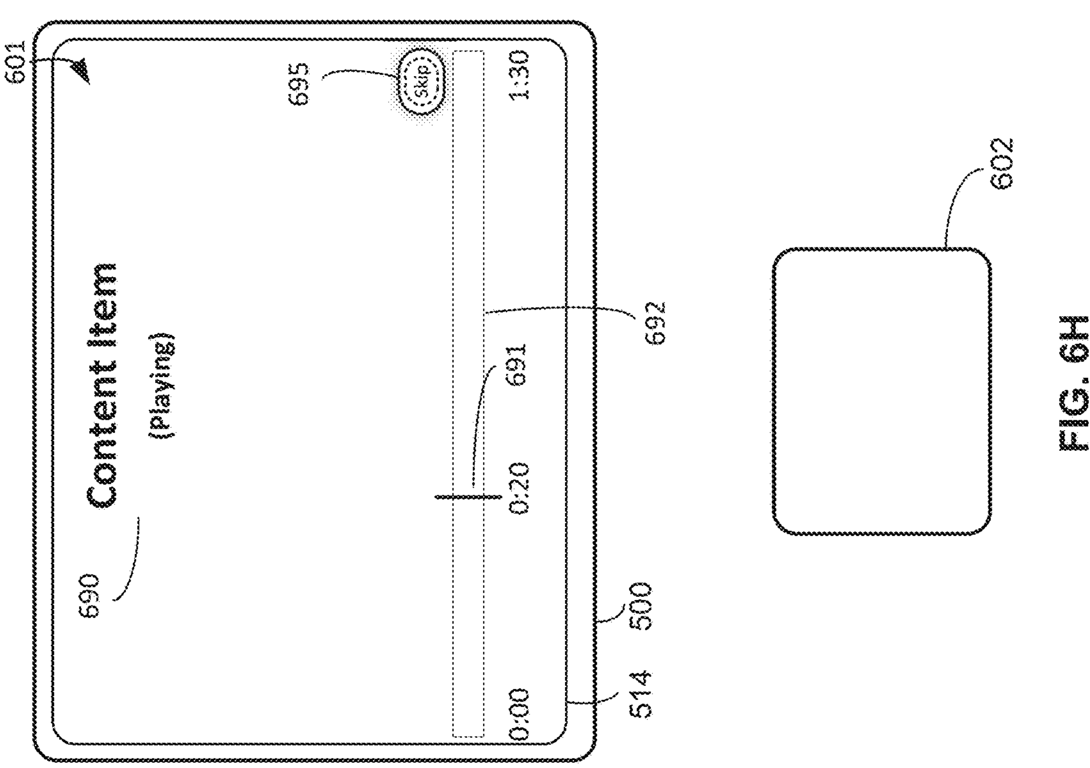

In some embodiments, initiating the process to forgo display of the first portion of the first media content includes, in accordance with a determination that automatic content skipping is enabled for the first media content, such as shown in FIG. 6A, automatically skipping the first portion of the first media content without receiving user input to skip the first portion of the first media content, such as shown in FIGS. 6E-6F and indicated by disclaimer 610 and disclaimer 612. For example, as described with respect to method 700, a content skipping mode optionally is enabled by a user of the electronic device or by the electronic device. As described with respect to method 700, in accordance with a determination that a current playback position corresponds to the first portion of the first media content, the electronic device optionally skips at least a subset of the first portion, and optionally updates the playback position to the end of the subset. In some embodiments, the subset directly corresponds to the entirety of the first portion of the first media content. In some embodiments, the subset corresponds to an updated playback position within (e.g., towards the 0.5, 1, 1.5, 2, 3, or 5 seconds of the end of) the first portion, such that resuming playback at the updated playback position presents a reduced risk to a user of the electronic device. In some embodiments, the first portion of the first media content is skipped without displaying first information as described later with respect to method 700. Automatically skipping past the first portion of the first media content reduces inputs otherwise required to manually skip past the first portion.

In some embodiments, initiating the process to forgo display of the first portion of the first media content includes ceasing playback of the first media content, such as shown in FIG. 6C, and displaying, via the display generation component, a first visual element, such as content notice 603 in FIG. 6C, including first information, such as the text and buttons 606 included in content notice 603, associated with the first sensitivity metadata of the first portion of the first media content. For example, the electronic device optionally pauses the media content and optionally displays the first information (e.g., a pop-up). In some embodiments, the pop-up is overlaid over the paused first media content. In some embodiments, the pop-up includes a prompt and one or more selectable options. The prompt optionally asks about the user's interest in viewing a summary of the first portion of the media content and/or whether the user would like to skip past the scene. In some embodiments, the media provider of the first media content determines the summary of the scene. In some embodiments, an entity associated with the electronic device determines the summary of the scene. Ceasing playback and displaying information associated with the sensitivity metadata of a portion of media content reduces the need for inputs required to view such information.

In some embodiments, the first visual element includes a selectable option that is selectable to skip the first portion of the first media content, such as "Skip" button of buttons 606 in FIG. 6C. In some embodiments, while playback of the first media content is ceased and while displaying the first visual element, the electronic device receives, via the one or more input devices, a first input, such as gesture 604 in FIG. 6C, corresponding to a selection of the selectable option. In some embodiments, in response to receiving, via the one or more input devices, the first input, the electronic device skips the first portion of the first media content, such as shown by played 691 in FIGS. 6C-6D. For example, in response to selecting a button to skip the first portion of the first media content that is included in a content notice, the electronic device optionally skips the first portion of the media content as described with respect to method 700. In some embodiments, in accordance with a determination that a threshold amount of time (e.g., 1, 3, 5, 7.5, 10, 15, or 30 seconds) has elapsed since ceasing the playback of the first media content and/or displaying the first visual item (e.g., the content notice) and without receiving user input, the first portion is automatically skipped without the electronic device detecting input to skip the first portion of content. In some embodiments, the threshold amount of time is measured relative to the last received input, such as a navigational input navigating focus around the content notice. In some embodiments, the electronic device ceases display of the first visual element in response to detecting selection of the selectable option. Presenting a selectable option to skip the first portion of the first media content reduces cognitive load and user inputs required to manually skip the first portion of the media content.

Figure 6G:
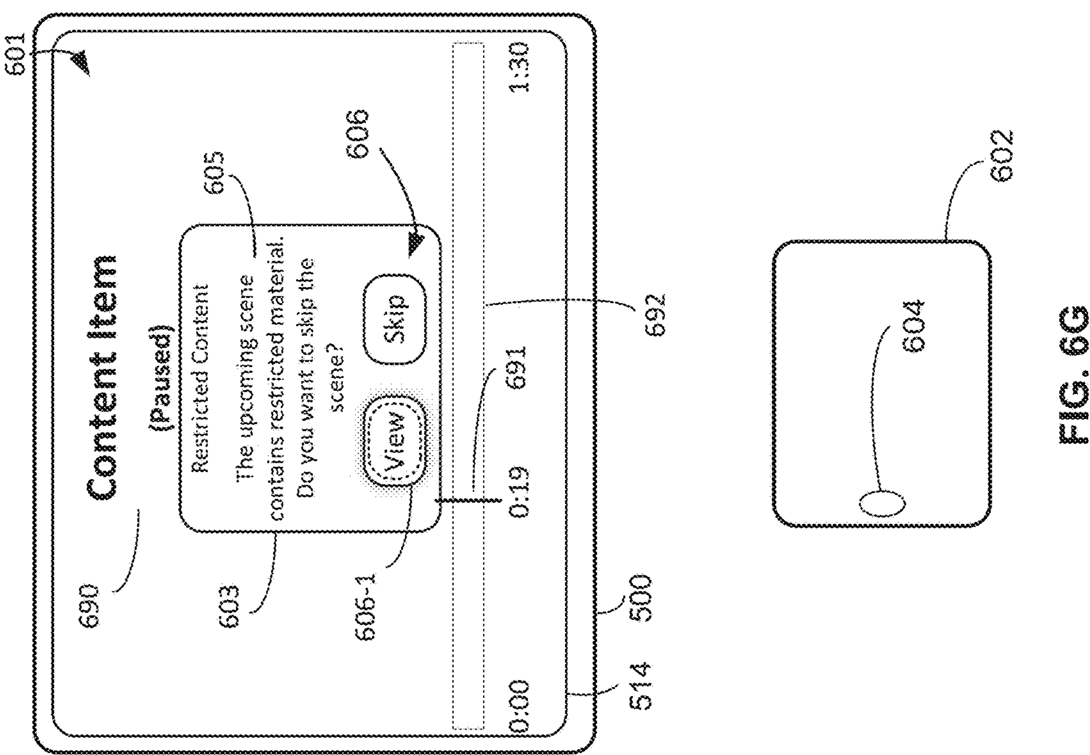

In some embodiments, the first visual element includes a selectable option that is selectable to display the first portion of the first media content, such as "View" button 606-1 in buttons 606 shown in FIG. 6C and FIG. 6G. In some embodiments, while playback of the first media content is ceased and while displaying the first visual element, the electronic device receives, via the one or more input devices, a first input corresponding to selection of the selectable option, such as gesture 604 in FIG. 6G. In some embodiments, in response to receiving, via the one or more input devices, the first input, the electronic device resumes the playback of the first media content and displays, via the display generation component, the first portion of the first media content, such as shown in FIG. 6H. For example, in addition or in the alternative of the embodiments described with respect to method 700, the first visual element (e.g., a content notice visible in front of the media content) optionally includes a selectable option (e.g., a button) to view the first portion of content. Thus, playback of the first media content optionally is resumed in response to detecting one or more inputs selecting the selectable option. Such a content notice provides the user an opportunity to view the sensitive portion of media content notwithstanding the sensitivities (e.g., health risks) associated with their profile and/or modify settings corresponding to a display generation component in communication with the electronic device (e.g., modifying display brightness and/or display refresh rate) before proceeding to view the first portion of the content. As described with respect to method 700, in some embodiments, the playback of the first media content is resumed after a threshold amount of time has elapsed after displaying the first visual element without detecting user input and/or after a last-detected user input. In some embodiments, the electronic device ceases display of the first visual element in response to detecting selection of the selectable option. Displaying a selectable option to resume playback reduces user inputs to dismiss the first visual element and resume the playback.

In some embodiments, the first visual element, such as content notice 603 in FIG. 6K, includes a selectable option, such as "view summary" button 606-2, that is selectable to display information associated with a content of the first portion of the first media content, such as the textual information included in content notice 603 as shown in FIG. 6L. For example, in addition to or alternatively from the embodiments described with respect to method 700, the first information (e.g., a content notice) optionally includes the selectable option (e.g., a button) to view information such as a summary of the first portion of the first media content.

In some embodiments, while playback of the first media content is ceased and while displaying the first visual element, the electronic device receives, via the one or more input devices, a first input corresponding to selection of the selectable option, such as gesture 604 in FIG. 6K. In some embodiments, in response to receiving, via the one or more input devices, the first input, the electronic device displays, via the display generation component, the information associated with the content of the first portion of the first media content, such as the textual information (e.g., a summary of a scene) included in content notice 603 as shown in FIG. 6L. For example, in response to detecting selection of the button to view a summary of a scene in a movie corresponding to the first portion of the media content, the electronic device optionally displays a (e.g., text, video and/or audio) summary of the scene without resuming playback of the media content and/or showing the content of the scene. In some embodiments, while text included in the first visual element is displayed (e.g., a prompt to guide the user to select a button) and in response to detecting the selection of the button to view the summary, the electronic device ceases display of the text and instead displays the summary of the scene. In some embodiments, the button to view the summary is displayed concurrently with or instead of the buttons described with respect to method 700. Presenting a selectable option to view a summary of the scene reduces the need for user inputs required to step through the scene and/or to obtain the summary of the scene (e.g., via a web browsing application).

In some embodiments, the first visual element includes a second selectable option, such as "Resume" button 606-4 in FIG. 6K, that is selectable to display the first portion of the first media content. In some embodiments, while playback of the first media content is ceased, such as shown in FIG. 6K and while displaying, the first visual element, the electronic device receives, via the one or more input devices, a second input corresponding to selection of the second selectable option. For example, as described with respect to method 700, the second selection option optionally is only displayed in response to detecting inputs selecting a different selectable option (e.g., a button selectable to view a summary of the scene).

In some embodiments, in response to receiving, via the one or more input devices, the second input corresponding to selection of the second selectable option, the electronic device resumes the playback of the first media content, such as a selection of "resume" button 606-4 in FIG. 6K (not shown). For example, the electronic device optionally detects one or more inputs selecting a button that is selectable to resume playback of the first media content, optionally resuming playback at the end of the first portion of the first media content. In some embodiments, the second selectable option is presented concurrently with a third selectable option, and selection of the third selectable option optionally resumes playback from the current playback position (e.g., such that the user can view the first portion of the first media content). The electronic device optionally detects selection of the second or the third selectable option, and in response to detecting the selection, optionally updates the current playback position in accordance with the selection input and optionally ceases display of the first visual element. Displaying a selectable option to resume playback reduces user inputs to dismiss the first visual element and resume the playback.

In some embodiments, the first information includes a description, such as text 605 in FIG. 6G, associated with the satisfaction of the one or more criteria. For example, the first information describes an implicated health condition associated with the first sensitivity metadata. The description optionally includes a disclaimer concerning why the first content (e.g., a scene) has been tagged, optionally based on the associated first sensitivity metadata. For example, the description optionally describes that the scene includes content presenting a risk to users of the electronic device with photosensitive conditions and/or indicates that a user determined to be active at the electronic device and/or consuming the content is at potential risk, and optionally identifies the particular user(s) at risk (e.g., by name, by profile and/or by email address). In some embodiments, the description is as granular as the health-base metadata allows. For example, the description optionally is generic (e.g., "The following scene is dangerous based on your health settings") or optionally is more specific to the content of the scene (e.g., "The following scene includes repetitive patterns of flashing lights and is dangerous based on your health settings"). In some embodiments, the description is displayed concurrently with the previously described selectable options. Displaying a selectable option to view a description associated with the satisfaction of the one or more criteria reduces the need for user inputs required to determine why the one or more criteria are satisfied, such as navigating through the scene and/or to obtaining a summary of the scene (e.g., via a web browsing application).

In some embodiments, before displaying the first visual element, the first media content, such as media 690, is displayed with a first visual appearance corresponding to a visual characteristic having a first value, such as preceding the visual appearance of media 690 in FIG. 6M. In some embodiments, as described with respect to methods method 700, an interactive content notice is displayed. It is understood that the visual appearance of the first media is optionally not restricted to concurrently displaying (or not displaying) the content notice and the first media content. For example, a visual characteristic of displaying the media content (e.g., a level of brightness, opacity, sharpness and/or blurriness and/or the application of a visual effect to the first media content) optionally are understood as describing a first visual appearance of the first media content, and is optionally different from (and not describing) that the content notice is overlaying the content.

In some embodiments, while displaying the first visual element, the electronic device displays the first media content with a second visual appearance, such as shown in FIG. 6M, different from the first visual appearance, corresponding to the visual characteristic having a second value, such as the indication media 690 is "blurred" in FIG. 6M, different from the first value. For example, the media content optionally is displayed without an opaque visual overlay or a blurring effect when the electronic device is not forgoing display of the media content, and optionally is displayed with an opaque overlay or a blurring effect the media content while displaying the informational pop-up. The opacity of the visual overlay optionally varies in cover and the amount of opacity (e.g., 0%, 30%, 50%, or 70%, opacity). The opaque overlay, blurring effect, and/or any other suitable visual effect to mitigate sensitivities to the users are referred to herein as "visual obstruction" of the first media content. In some embodiments, the electronic device does not cease the playback of the first media content as described with respect to method 700 and the media is displayed with the visual obstruction while the playback continues. In some embodiments, the visual appearance includes a brightness of the media content. In some embodiments, playback of the media content is paused, and the visual obstruction is applied to the paused media content. Modifying the visual appearance of the first media content reduces the need for a user to navigate user interfaces (e.g., menus) to manually modify the appearance when a current playback position is associated with a sensitive portion of the first media content.

In some embodiments, the sensitivity data is associated with at least one of photosensitivity, post-traumatic stress disorder, epilepsy, or migraines, such as implicated throughout the textual descriptions in content notice 603 as shown in FIG. 6K. For example, a user profile optionally includes a tag, setting, and/or other indication that the user corresponding to the user profile optionally has a photosensitive condition (e.g., photosensitivity, epilepsy, and/or migraines) and/or has a psychological condition (e.g., post-traumatic stress). In some embodiments, the sensitivity data is entered in response to detecting inputs (e.g., from a remote or mobile device) in communication with the electronic device. For example, the user optionally uses a remote control to toggle one or more settings in a newly created or stored user profile at the electronic device. Additionally or alternatively, a device (e.g., a smartwatch, phone, computing device, and/or tablet) in communication with the electronic device (e.g., both configured with and/or logged into the same user account and/or user profile) optionally communicates the sensitivity data to the electronic device, and the electronic device establishes and/or updates a corresponding user profile. For example, a user optionally enters health-data at their mobile device implicating a newly developed photosensitive condition, and in response to receiving an indication of the update, the electronic device optionally receives and/or updates sensitivity data at a user profile corresponding to the user. In some embodiments, the sensitivity data is obtained by the electronic device from an application associated with the user's health (e.g., an application directed to health data of the user including health conditions and/or biometric data) that is stored and/or hosted locally at the electric device and/or at a device in communication with the electronic device (e.g., a mobile device) that is configured with the same user account or user profile as is the electronic device. Initiating process(es) to forgo display a portion of media content based on sensitivity data implicating such conditions reduces the need for user input required to identify and forgo consumption of (e.g., fast-forward and/or rewind past) sensitive portions of the content.

In some embodiments, the one or more criteria includes a criterion that is satisfied when a setting is enabled in a content viewing application in which the first media content is being displayed, such as related to the content notice 603 shown in FIG. 6A. For example, the content viewing application is optionally a media consumption application (e.g., for consuming streamed and/or local content) stored and/or accessible on the electronic device, and a user preference setting optionally is enabled to automatically forgo display of sensitive content, display information associated with sensitive content, and/or modify presentation of the media first media content (e.g., blurring or forgoing display of the first media content) as described herein. As such, in accordance with a determination that the user preference setting is disabled, the operations and functions described with respect to method 700 optionally are not performed by the electronic device. In some embodiments, the electronic device receives an indication of such a user preference rather than having the user preference stored locally. Requiring the setting to be enabled for the criterion to be satisfied prevents needless display of information (e.g., content notices), thus preventing user input to interact with such information.

In some embodiments, while displaying, via the display generation component, the first portion of the first media content that is associated with the first sensitivity metadata and in accordance with the determination the first sensitivity metadata satisfies the one or more criteria, the electronic device displays, via the display generation component, a selectable option that is selectable to skip the first portion of the first media content, such as the "Skip" button 695 as shown in FIG. 6H and FIG. 6I. For example, the selectable option optionally is a skip button that is displayed overlaid or near the first media content. In some embodiments, the selectable option is displayed with an indication of focus or selection (e.g., with shadows and/or other visual emphasis). As described with respect to method 700, if the one or more criteria are satisfied, the selectable option optionally is concurrently displayed with the first media content, optionally during playback of the first portion of the first media content (e.g., for the duration of playback of the first portion of the first media content). The selectable option optionally is displayed based on enabling a content skipping mode as described with respect to method 700, in accordance with a determination that content skipping is enabled as described with respect to method 700, based on user interactions with first information as described with respect to method 700 (e.g., selection to view the first portion of the first media content described with respect to method 700), and/or for all portions of media content presenting a risk to one or more users corresponding to one or more active user profiles as determined by the electronic device. In some embodiments, the electronic device detects one or more inputs selecting the skip button, and in response to detecting the one or more inputs initiates a process to skip the first portion of the media content as described herein. In some embodiments, the current playback position is updated to reflect the end of the first portion of the media content. In some embodiments, the selectable option is displayed while a scrubber or timeline bar (e.g., such as described with reference to method 900) is displayed; in some embodiments, the selectable option is displayed without the scrubber or timeline bar being displayed.

Figure 6J:
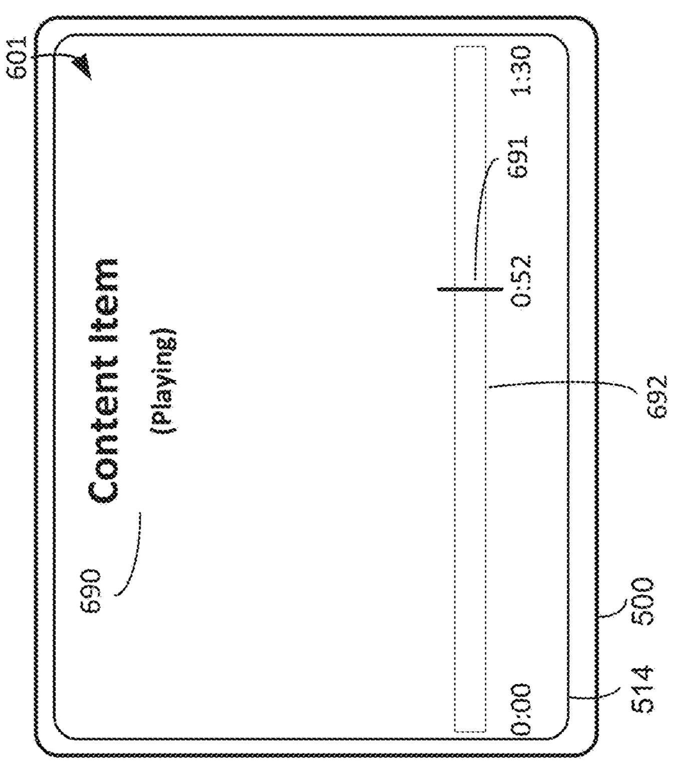
Figure 6I:
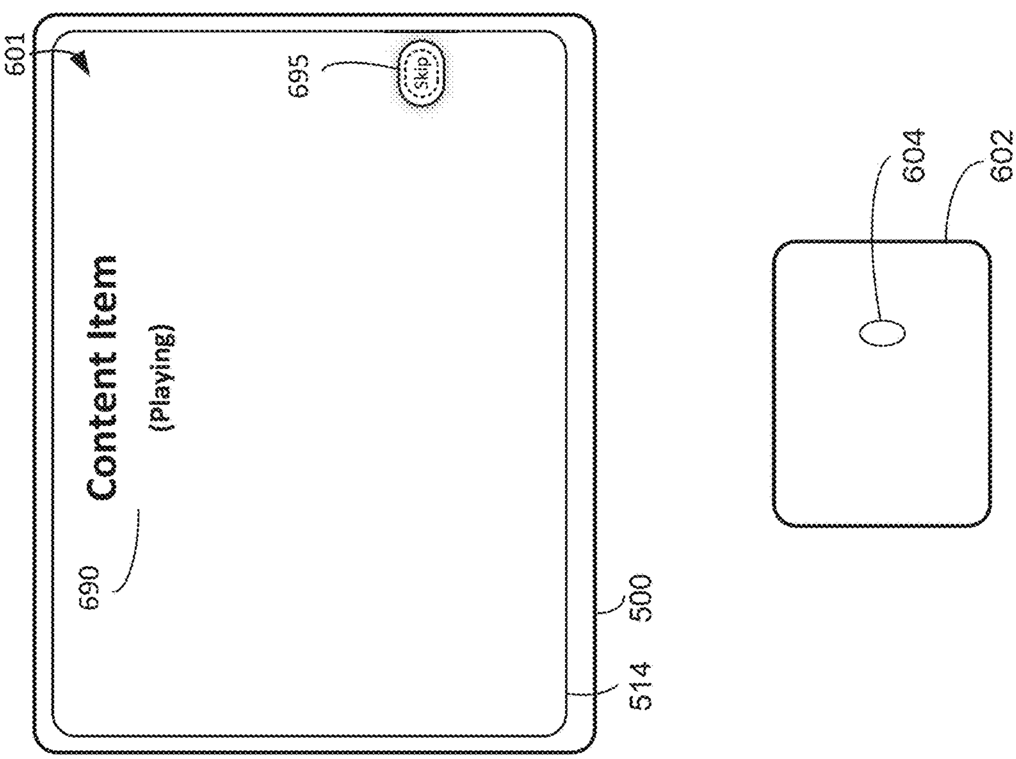
Figure 6L:
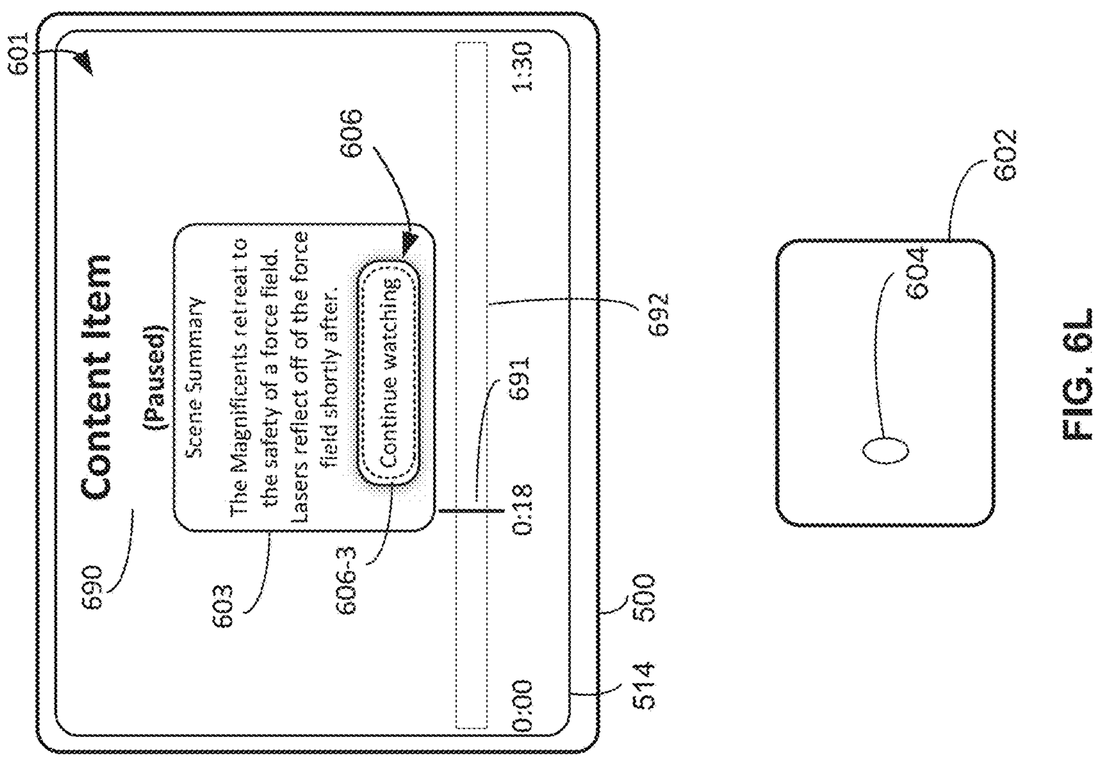
Figure 6K:
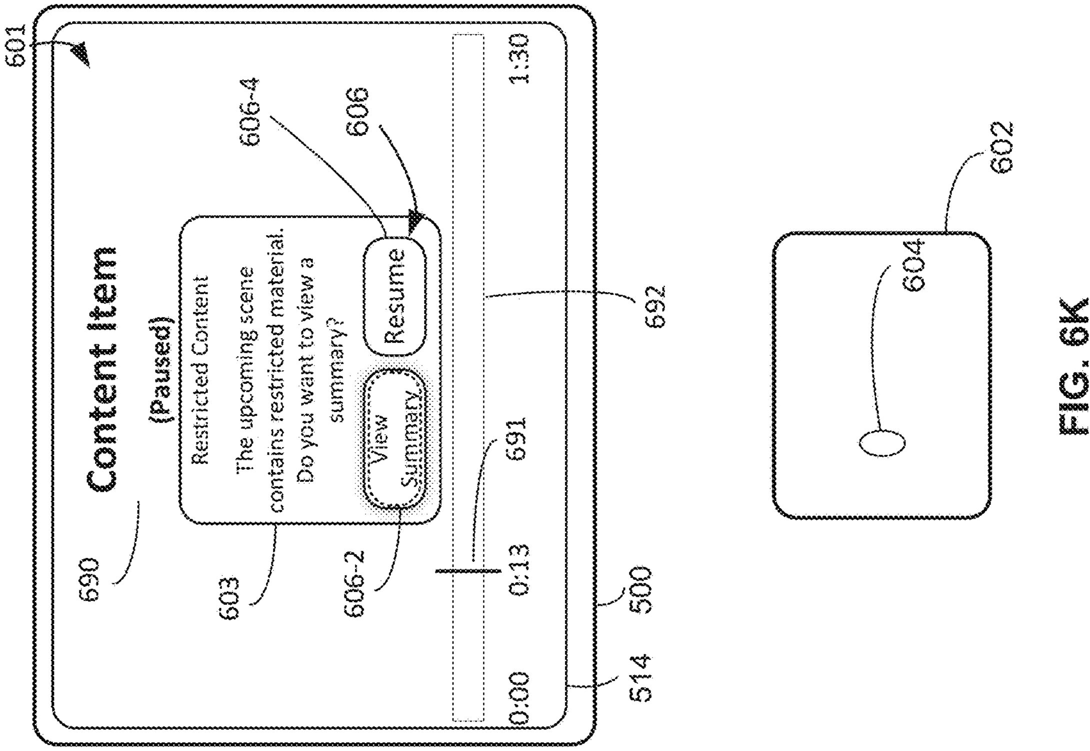
Figure 6M:
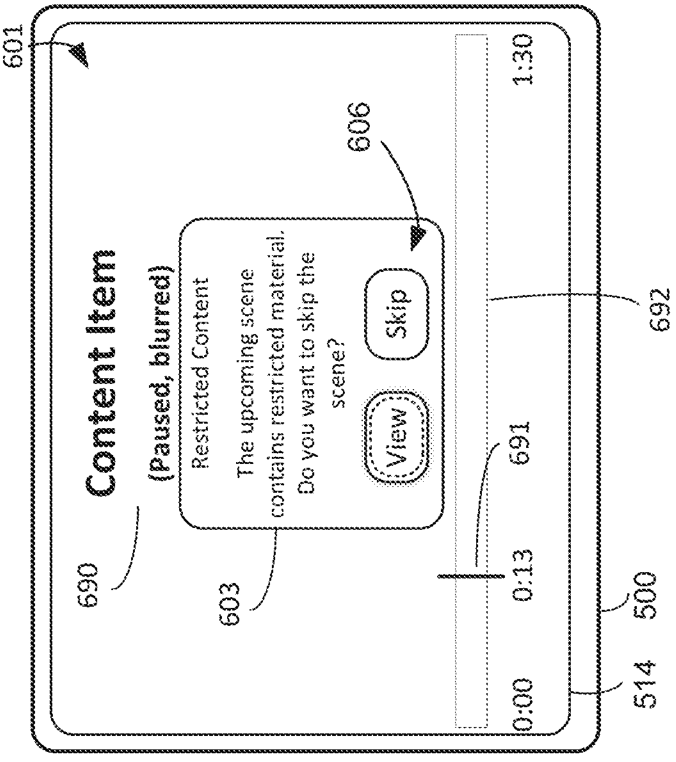

In some embodiments, while displaying, via the display generation component, a second portion of the first media content that is associated with second sensitivity metadata and in accordance with a determination the second sensitivity metadata does not satisfy the one or more criteria, the electronic device forgoes displaying, via the display generation component, a selectable option that is selectable to skip the second portion of the first media content, such as shown in FIG. 6J. For example, if the second portion of the first media is a scene that does not implicate a sensitivity based on the second sensitivity metadata, a button selectable to skip the second portion of the first media is not displayed (e.g., for the duration of playback of the second portion of the first media content). In some embodiments, as described previously, the electronic device determines a risk level based on one or more active user profiles and determines whether or not to display a skip button for a respective portion of the first media based on the respective sensitivity metadata of the respective portion. For example, the electronic device optionally presents a skip button in accordance with a determination an active user consuming the first media having a photosensitive condition implicated in their user profile is present, but does not present the skip button if such a user is not active (e.g., not paying attention to the media content, or not present). In some embodiments, the skip button is displayed regardless of whether or not an interactive timeline as described with respect to method 900 is also displayed. Displaying the selectable option to skip a respective portion of the media content reduces the need for inputs to manually skip through or past the portion of the media content.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIG. 7. For example, skipping portions of media using sensitivity metadata described above with reference to method 700 optionally has one or more of the characteristics of interactive timelines described herein with reference to other methods described herein (e.g., method 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 7 are, optionally, implemented by components depicted in FIGS. 1A-1B. For example, displaying operations 702*a* and 702*d* and forgoing of displaying operation 702*c* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Timeline Indicating Sensitivity Risks

Users interact with electronic devices in many different manners, including browsing and consuming media content. In some embodiments, an electronic device determines one or more users actively consuming the media content and presents information based on sensitivity information (e.g., health data) associated with the one or more users. The embodiments described herein provide ways in which the electronic device responds in light of such sensitivity data and, for example, provides manners of displaying indications of risks and mitigating consumption of media potentially detrimental to the user, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
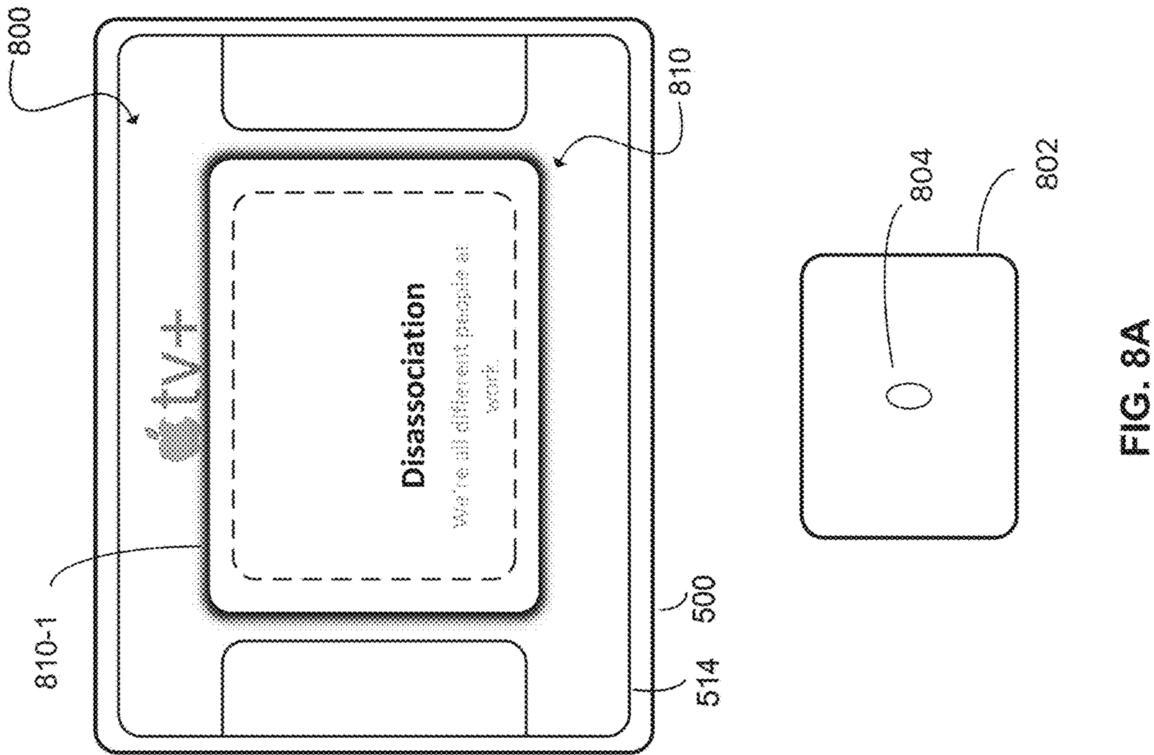
Figure 8D:
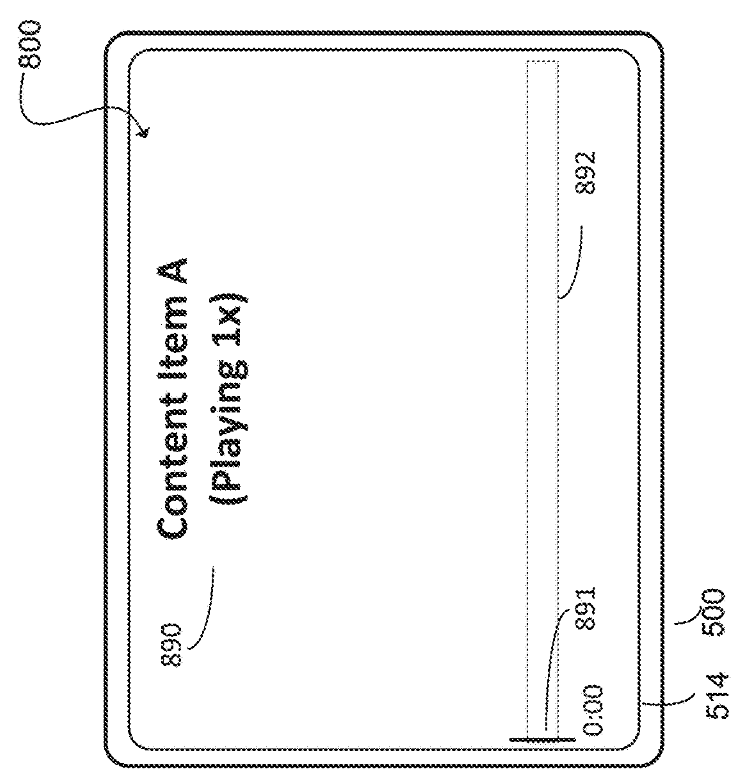
Figure 8C:
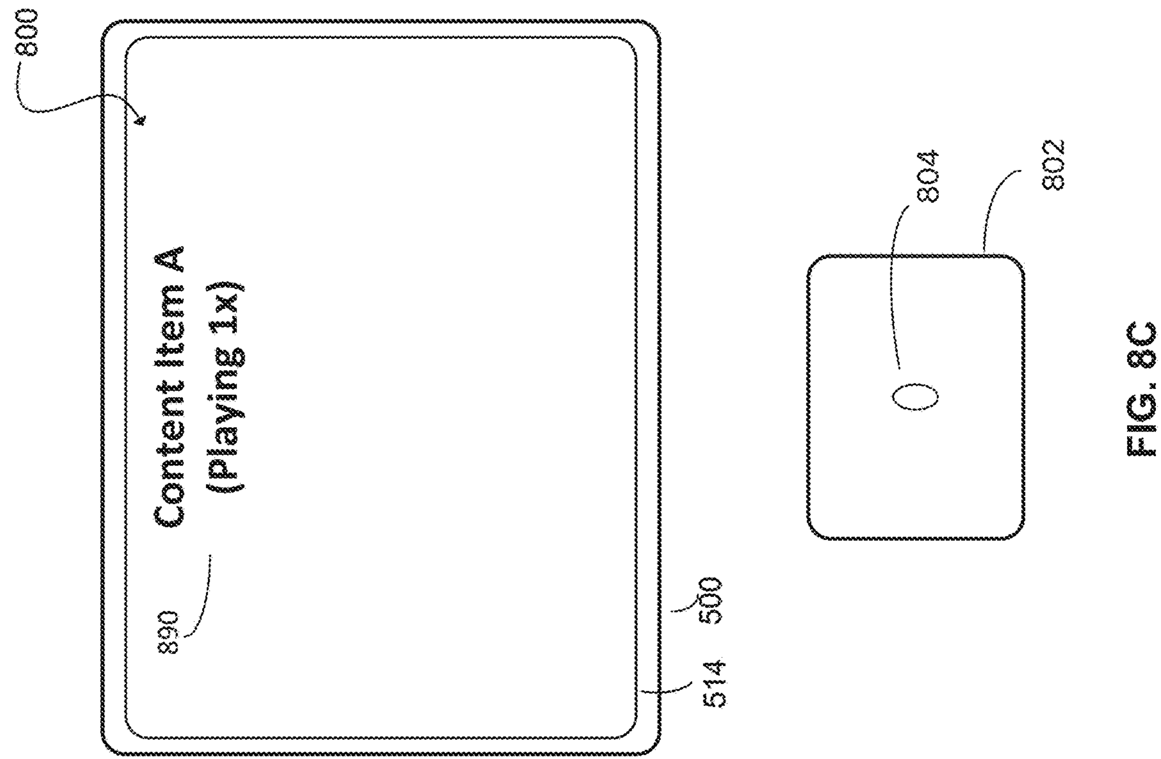
Figure 8F:
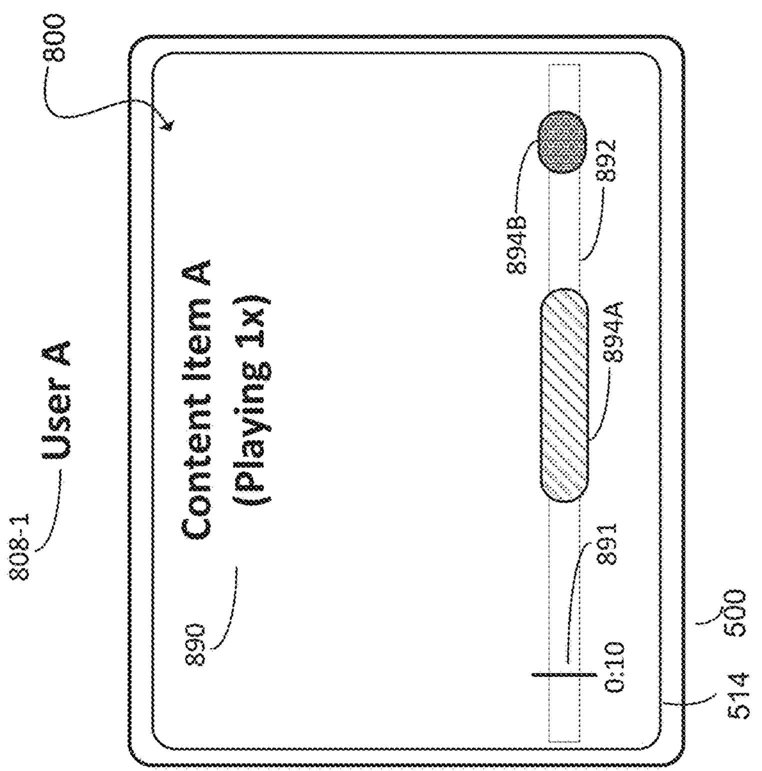
Figure 8E:
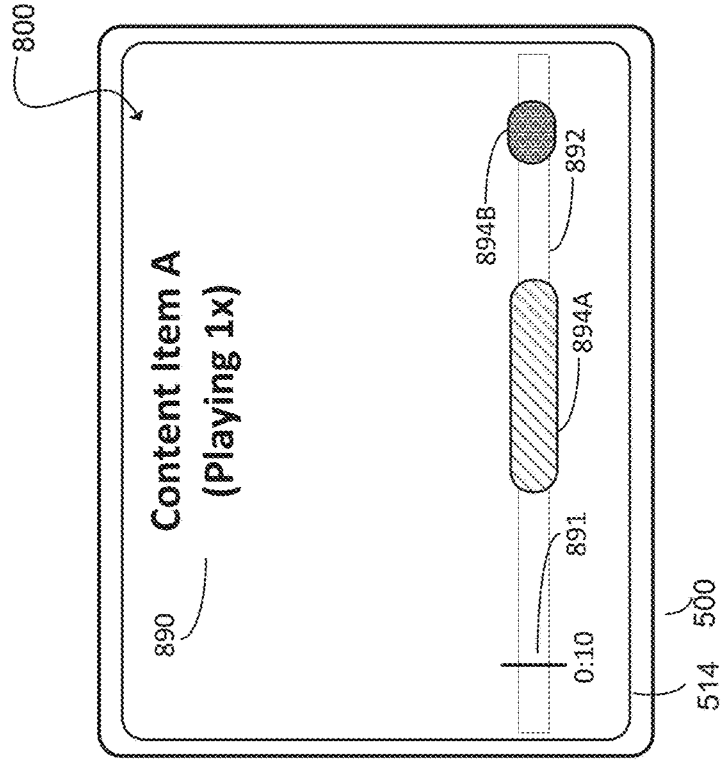
Figure 8H:
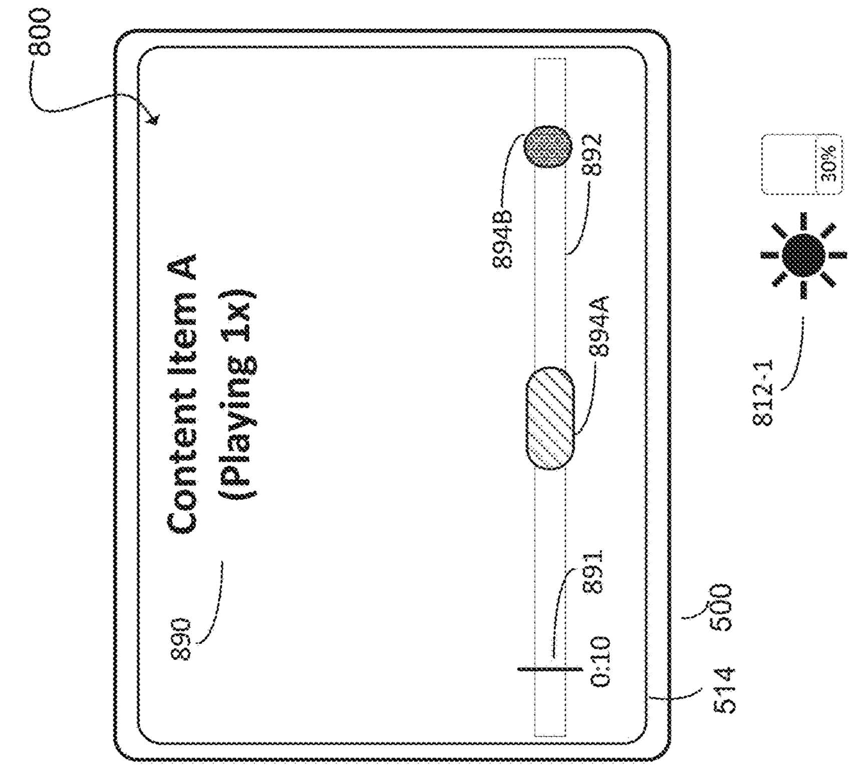
Figure 8G:
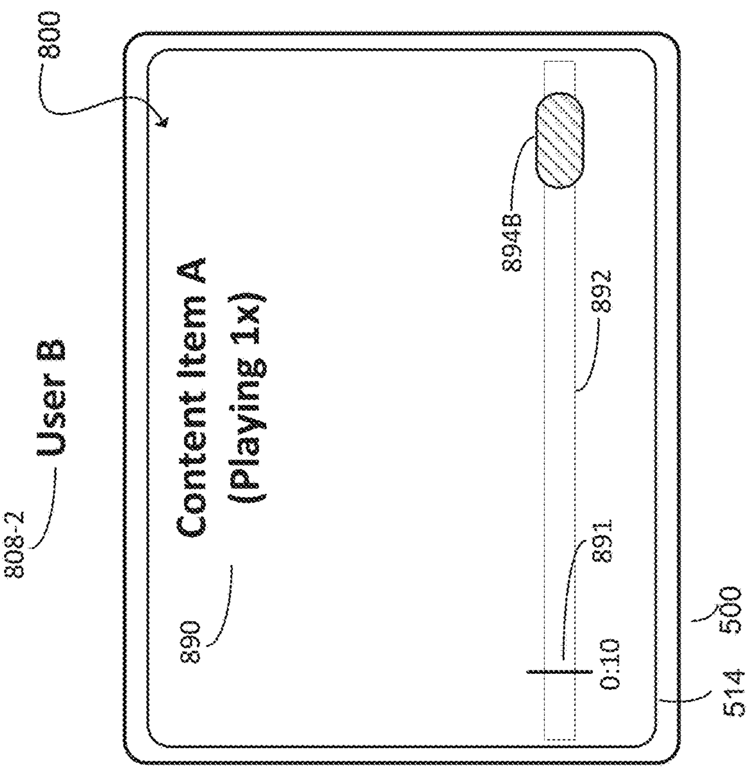
Figure 8J:
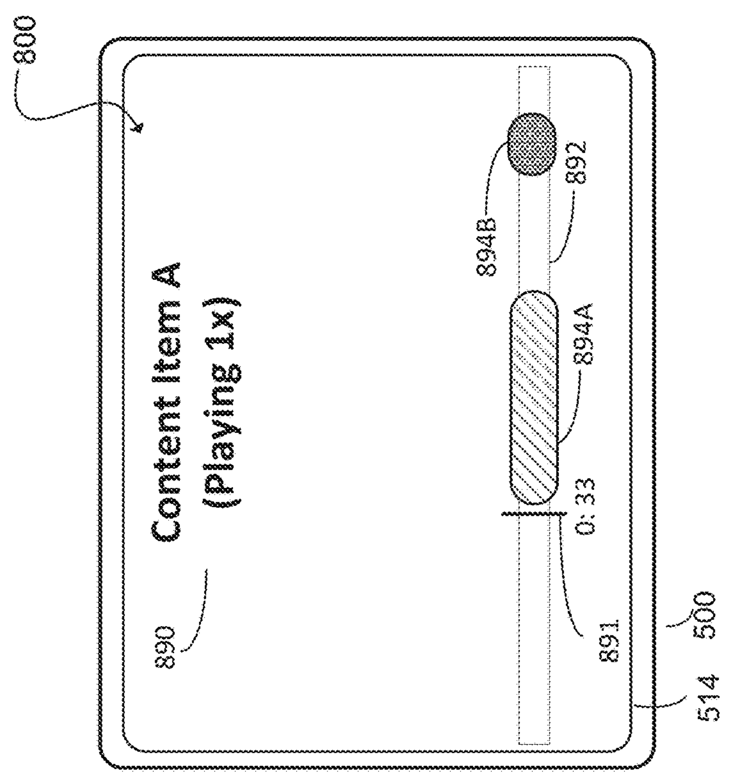
Figure 8I:
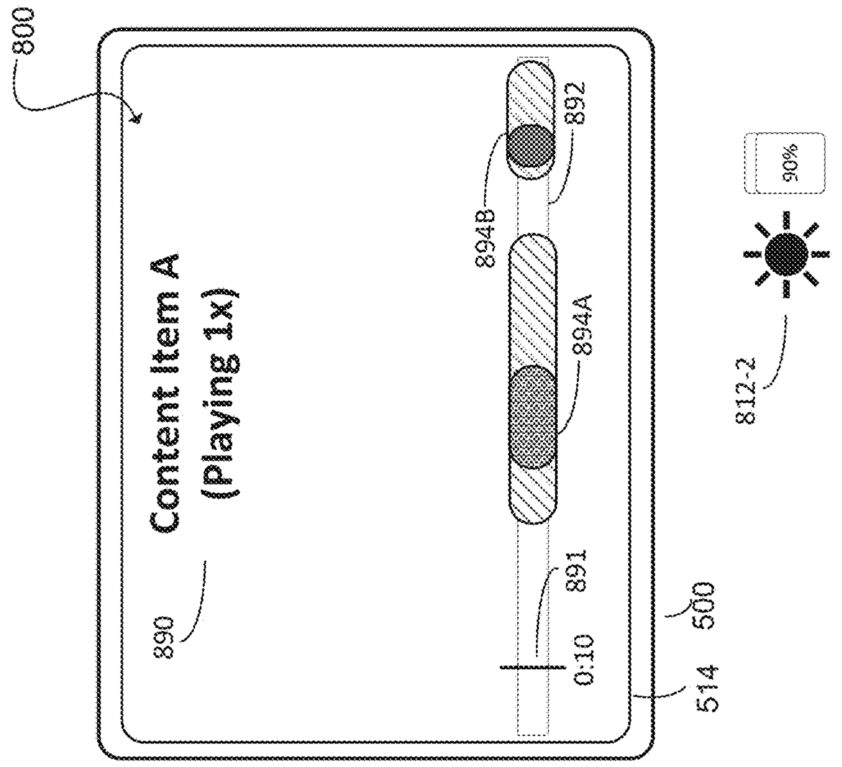
Figure 8L:
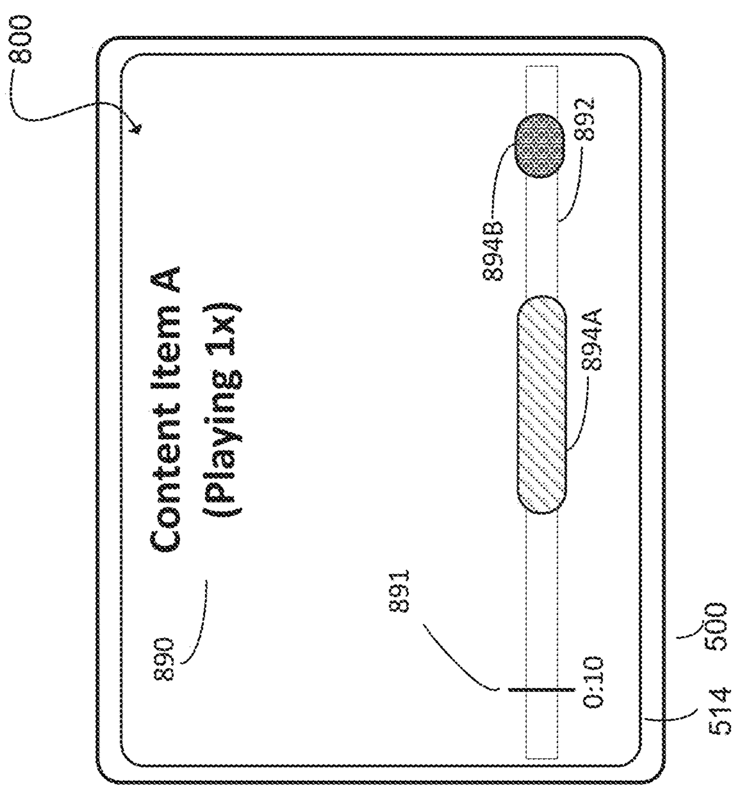
Figure 8K:
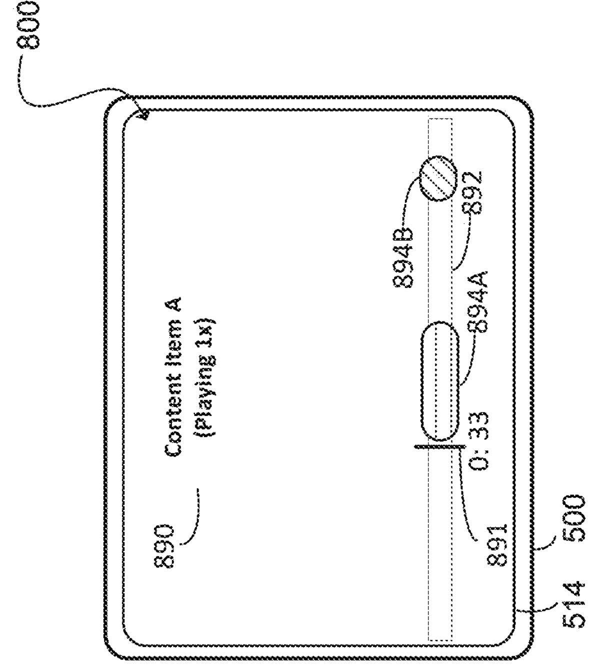
Figure 8N:
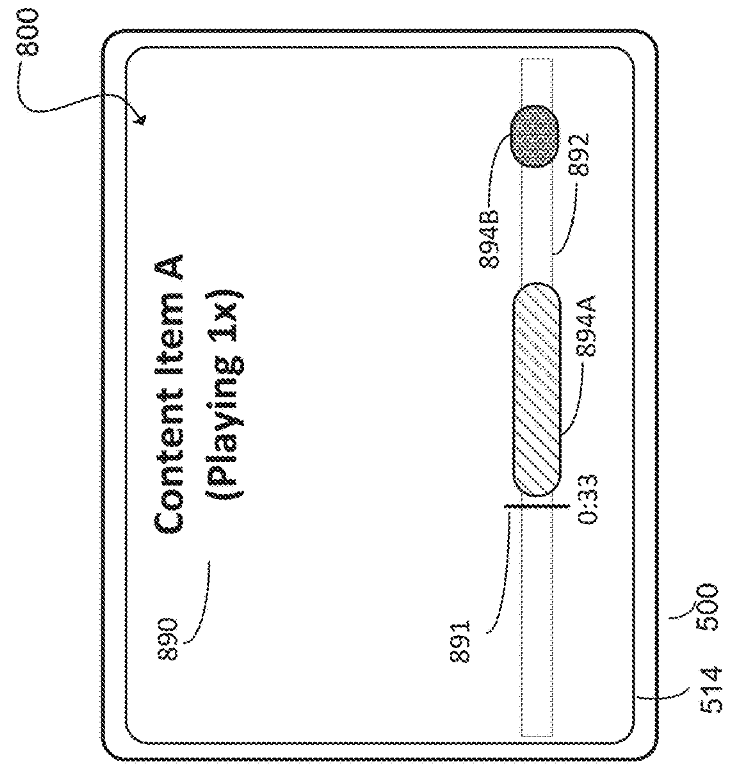
Figure 8M:
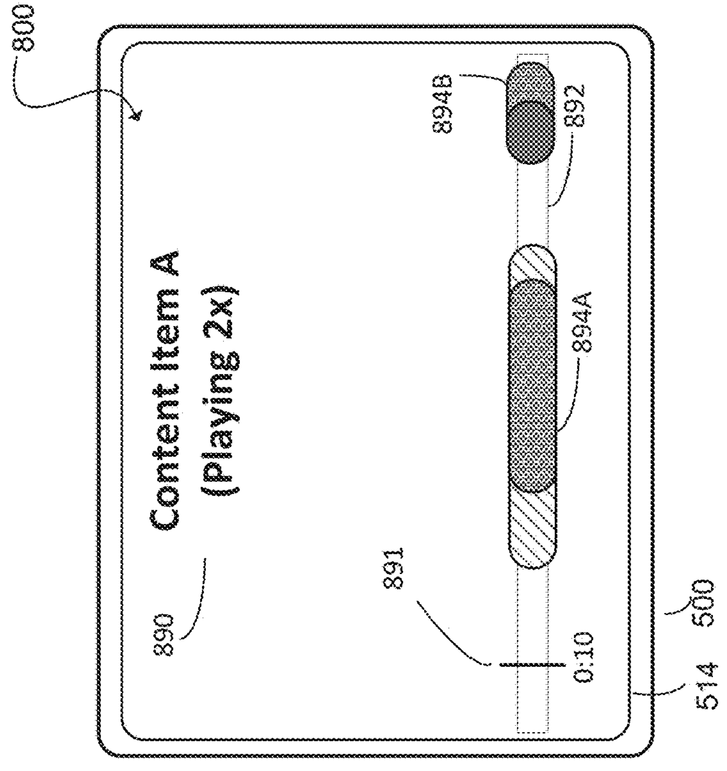
Figure 8P:
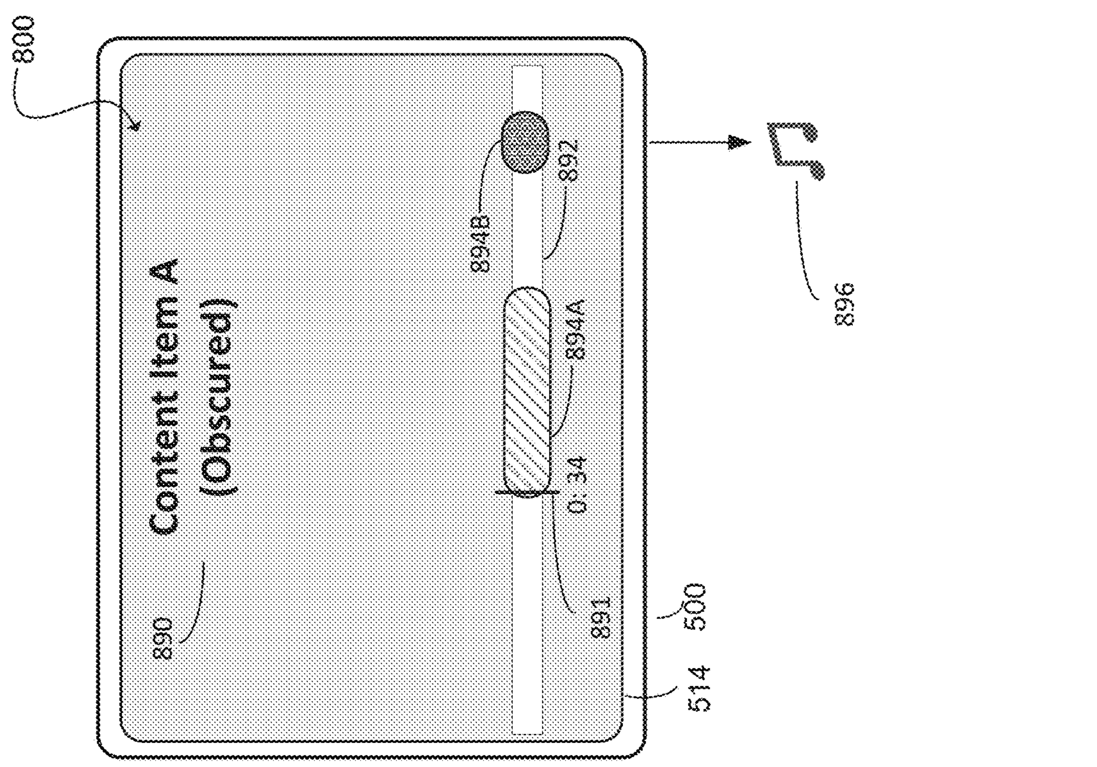
Figure 8O:
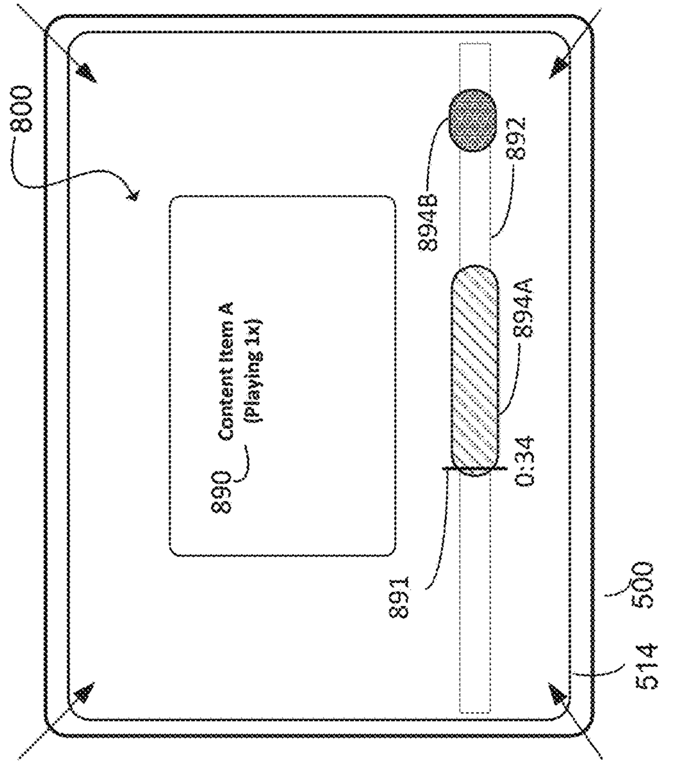
Figure 8R:
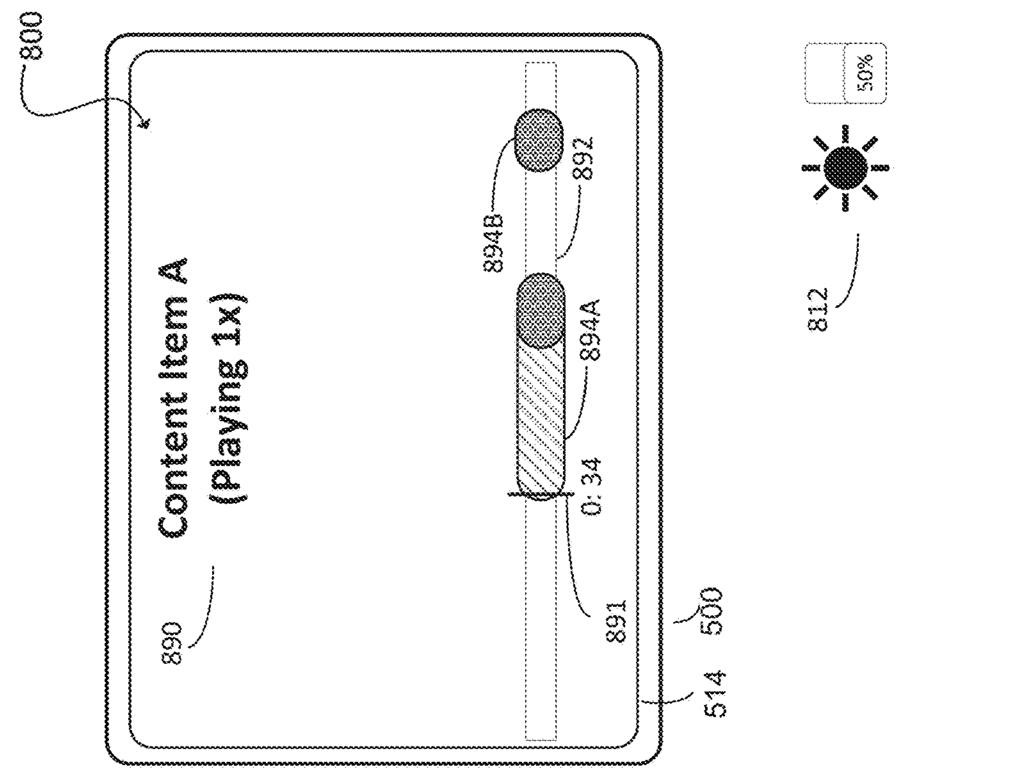

FIGS. 8A-8R illustrate exemplary ways in which an electronic device displays selectable options and/or information in response to determining media implicates a potential sensitivity of a user of the electronic device according to embodiments of the disclosure. The embodiments in these figures are used to illustrate the processes described below, including the processes described with reference to FIG. 9. Although FIGS. 8A-8R illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8R.

FIGS. 8A-8R illustrate exemplary ways in which an electronic device displays an interactive timeline indicating sensitive content and modifies media playback in response to determining that media implicates a potential sensitivity of a user of the electronic device. The embodiments in these figures are used to illustrate the processes described below, including the processes described with reference to FIG. 9.

FIG. 8A illustrates a device (e.g., device 500) displaying user interface 800 (e.g., via a display device and/or via a display generation component). In some embodiments, user interface 800 is displayed via a display generation component 514. In some embodiments, the display generation component is a hardware component (e.g., including electrical components) capable of receiving display data and displaying a user interface. In some embodiments, examples of a display generation component include a touch screen display (such as a touch screen), a monitor, a television, a projector, an integrated, discrete, or external display device, or any other suitable display device that is in communication with the device. In some examples, a surface (e.g., a touch-sensitive surface) is in communication with the device. For example, in FIG. 8A, the device is in communication with trackpad 802, which is configured to provide touch inputs and indications of such inputs to the device. Trackpad 802 optionally corresponds to touch-sensitive surface 451. In some embodiments, trackpad 802 is representative of a touch-sensitive component of a touch screen (e.g., display 514 is a touch screen). In some embodiments, trackpad 802 is an entirely separate device configured to receive touch input from a user of the device.

In some embodiments, user interface 800 is a user interface of an application or a user interface in which media browsing, playback, and interaction are able to be performed (e.g., to obtain, browse, and/or consume media such as video and/or audio). In some embodiments, the application is an application installed on the device. For example, user interface 800 corresponds to a media browsing user interface including a plurality of representations of content 810, wherein a respective representation of content 810-1 has a current indication of focus and/or selection. In some embodiments, the representation of the media includes text, image(s), video, and/or audio associated with the corresponding media content. In some embodiments, the visual appearance of the representation is changed and/or playback of media is initiated by the device in response to focusing on the respective representation. Navigational inputs (e.g., received via trackpad 802) can scroll or otherwise traverse the representations of media content, and the device optionally initiates display of corresponding media content in response to selection of a respective representation of content, as shown by gesture 804 selecting the respective representation of content 810-1 in FIG. 8A.

In response to the selection of a representation of content in FIG. 8A, a landing page corresponding to the respective representation of content is optionally displayed, such as in FIG. 8B. In FIG. 8B, a TV series landing page is displayed in user interface 800. Such a landing page optionally includes text, image(s), video, and/or audio that occupies one or more portions of the user interface and correspond to the underlying media content (e.g., a TV series, movie, podcast, album, and/or other form of media). In some embodiments, a selectable option to initiate playback of a content item is presented via the display, such as button 808. Button 808 has an indication of current focus and/or selection, for example, but a plurality of buttons corresponding to different media content items optionally are presented in user interface 800, respectively selectable to initiate media playback. In some embodiments, the landing page includes one or more representations of associated content (e.g., other related movies, episodes, and/or series). For example, user interface 800 includes a description of a season, episode, and a summary of the media content corresponding to button 808. In some embodiments, as described further with respect to method 700 and method 900, an "active" user profile corresponding to a user of the device actively consuming, or on the verge of consuming the media content is determined by the device. As such, relevant sensitivity data (e.g., health data) associated with the user profile is known to the device. Moreover, in some embodiments, as described with respect to method 900, the device determines and/or obtains sensitivity metadata corresponding to the media content. In some embodiments, the device determines that the metadata of the content item in FIG. 8B implicates a sensitivity to an active user and/or to user(s) in the abstract. As such, one or more badges 806 are displayed in user interface 800. Badges 806 optionally describe aspects of the media (e.g., content ratings, media stream properties, and/or media properties), including a badge 806-1 indicating that the currently selected content as indicated by the visual emphasis applied to button 808 implicates a potential sensitivity (e.g., "Sensitive Content"). In some embodiments, in response to receiving an indication of selection of button 808 such as gesture 804 received at trackpad 802, media playback is initiated.

In FIG. 8C, in response to the selection of media playback, the device ceases display of the landing page previously described and initiates playback of media 890 in user interface 800. In some embodiments, media 890 implicates a risk to one or more active user profiles (e.g., actively consuming media 890). Such media optionally is video and/or audio that optionally implicates a risk to the one or more active users. In order to indicate to the one or more active users that portions of media 890 may present a sensitivity risk (e.g., a user may have a health condition that is exacerbated by flashing content that is included in the media 890), one or more inputs can be detected by the device to display an interactive timeline that indicates the current playback position of media 890, and further indicates the relative locations one or more portions of media 890 that may present a risk. For example, gesture 804 is received at trackpad 802, and the device initiates a process to display such an interactive timeline.

In FIG. 8D, in response to such a gesture in FIG. 8C, an interactive timeline (e.g., scrubber bar 892) is displayed by the device. Scrubber bar 892 is displayed in user interface 800 by the device, indicating a current playback position communicated by playhead 891. For convenience, "scrubber bar" and "interactive timeline" will be referred to throughout the disclosure presented herein and are understood to be analogous and will be used interchangeably. Moreover, it is understood that the term "playhead" is a colloquialism used to describe a current playback position, optionally indicated along a scrubber bar—references to "playhead" will be used as such. As shown in FIG. 8D, media 890 does not include one or more portions implicating a risk to one or more active users; thus, scrubber bar 892 lacks any corresponding portions having a visual indication of such a risk (e.g., a health risk).

In FIG. 8E, an interactive timeline implicating a plurality of sensitivity risks is illustrated. For example, scrubber bar 892 is displayed while playback of media 890 is ongoing. As described with respect to method 900, the device optionally determines one or more portions of media 890 implicating a risk to one or more active users, optionally using metadata determined by the device and/or received by the device. For example, segment 894A optionally present a medium-risk to an active user consuming media 890, and is accordingly visually distinguished with a fill pattern, color, different scale, and/or other suitable visual emphasis to clearly indicate that while playhead 891 corresponds to segment 894A, the user may be subject to content that is determined to be sensitive and/or detrimental to the active user. Similarly, segment 894B optionally presents a high-risk to the active user, and is accordingly visually distinguished with a different fill pattern, color, scale, and/or other suitable visual emphasis from segment 894A and the remaining portions of scrubber bar 892 to indicate the relatively higher risk posed by the corresponding portion of media 890. It is understood that the interactive timeline (e.g., scrubber bar 892) optionally is displayed concurrently while the media is played back and/or paused.

In some embodiments, the electronic device (e.g., the device) determines different levels of risk based on satisfaction of one or more criteria associated with the health-based data, health-based metadata, user preferences, and/or characteristics of the electronic device. FIGS. 8F-8M illustrate such embodiments. In some embodiments, the risk levels indicated on an interactive timeline are modified in accordance with one or more active user(s) consuming media content (e.g., segments of the timeline indicating a level of risk are expanded, contracted, and/or modified in the level of risk that is indicated). For example, in some embodiments, the device determines risk levels based on the presence and/or absence of an active user having an active user profile. In FIG. 8F, an interactive timeline based on an active user profile is illustrated. User A 808-1 is determined as an active user that is consuming media 890, and as such, scrubber bar 892 presents segment 894A indicating a moderate amount of risk, and segment 894B indicating a high amount of risk to User A. Such determination of the risk level and satisfaction of criteria associated with sensitivity and/or health are described with respect to method 900. In FIG. 8G, the interactive timeline based on a different active user profile is illustrated. User B 808-2 is determined as an active user that is consuming media 890 (and User A as described with respect to FIG. 8F is not an active user) by the device. Based on the sensitivity data associated with User B, the device optionally determines that consuming media 890, which is the same media content as consumed by User A, optionally presents a lower amount of risk to User B. As such, segment 894A is not displayed on scrubber 892 as shown in FIG. 8G (e.g., because segment 894A is determined to not pose a risk to User B), and segment 894B is displayed with a visual distinction to indicate a medium level of risk to User B. In FIG. 8G, the device determines that User B is more risk prone to portions of media 890 near segment 894B, and as such, segment 894B is wider in FIG. 8G than illustrated in FIG. 8F. If, for example, User A and User B are simultaneously consuming media 890, the device optionally makes a determination based on the two active users' health data. In some embodiments, such a determination errs on the side of caution, ensuring that the highest levels of risk are reflected on the scrubber bar based on the entire group of active user(s). Thus, if User A and User B are consuming the media, the device optionally presents the scrubber bar illustrated in FIG. 8F, due to User A's higher relative sensitivity. In some embodiments, the profile of User A implicates a first sensitivity condition (e.g., a trauma related psychological condition) and the profile of User B implicates a second, different sensitivity condition (e.g., photosensitive epilepsy); The device therefore optionally presents scrubber bar 892 based on a superset of the two conditions. In some embodiments, respective segments of scrubber bar 892 are displayed with a visual appearance and one or more visual characteristics based on the corresponding condition. For example, a first respective one or more segments implicating a risk to photosensitive epileptic users optionally are displayed including a first color (e.g., different saturations of red based on photosensitive epileptic risk level), and second respective one or more segments implicating a risk to users afflicted with psychological trauma optionally are displayed with a second color, different from the first (e.g., different saturations of blue based on psychological trauma risk level).

In some embodiments, the device determines risk levels based on characteristics of a display generation component that is displaying the media. For example, FIG. 8H and FIG. 8I illustrate exemplary interactive timelines indicating risk based on characteristics of display 514. In FIG. 8H, display 514 is set to a first brightness 812-1, such as a 30% of peak brightness. The device optionally evaluates the risk to an active user (e.g., to an active user profile having a photosensitive epilepsy and/or migraines), and accordingly displays segment 894A and segment 894B, each implicating a risk to the active user. In FIG. 8I, display 514 is set to a second brightness 812-1, such as 90% peak brightness. In some embodiments, a higher brightness level implicates a higher risk; thus, segment 894A and segment 894B are expanded to occupy a greater portion of the interactive timeline, indicating that longer portions of media 890 present risk to the user as shown in FIG. 8I when compared to the risks indicated by similar segments as shown in FIG. 8H. Moreover, as described previously, a sub-portion of media 890 included in segment 894A is determined to be a higher level of risk and is modified in appearance accordingly. Similarly, a sub-portion of media 890 included in segment 894B is modified in appearance (e.g., as compared to FIG. 8H).

In some embodiments, the device uses characteristics such as size of a display generation component to determine risk levels. For example, FIG. 8J and FIG. 8K illustrate exemplary interactive timelines indicating risk based on characteristics of display 514. In FIG. 8J, the device is displayed media 890 within user interface 800, displayed via display 514 that has a first, relatively larger size. In FIG. 8K, the same media 890 is displayed within user interface 800, albeit via a relatively smaller display 514. The device therefore determines that the relative risk is lower in FIG. 8K due to the relatively smaller amount of light produced by the smaller display 514 (as shown in FIG. 8K), as compared to the relatively bigger display 514 as shown in FIG. 8J. As shown in FIG. 8K, segment 894A and segment 894B indicate a relatively lower level of risk, as compared to FIG. 8J due to the relatively lower light intensity, thus decreasing the likelihood media 890 adversely affects one or more active users of the device.

In some embodiments, the device uses characteristics of media playback to determine health risk levels. For example, FIG. 8L and FIG. 8M illustrate exemplary interactive timelines indicating risk based on characteristics of media playback. For example, a relative speed of media playback optionally is used to determine the risk posed by portions of media 890. For example, in FIG. 8L, media 890 is being played at a baseline playback speed (e.g., 1.0 times the original playback speed of media 890), and segment 894A and segment 894B are displayed based on the determined risk of such portions of media 890. In FIG. 8M, the same media 890 is displayed on the same the device, however, playback speed is double the baseline playback speed. Accordingly, as described with respect to FIG. 8H, one or more sub-portions of segment 894A and 894B are modified to indicate the increased risk level and segment 894A and 894B are expanded to reflect that a frequency and/or intensity of light emitted by display 514 implicate a higher risk to an active user of the device. However, it is understood that the foregoing embodiments are merely exemplary, and the risk level indicated on the scrubber bar optionally decrease (e.g., contract and/or are displayed with a visual distinction to indicate a lower risk).

In some embodiments, the electronic device modifies playback as described with respect to method 900 to mitigate risks to one or more active users of the electronic device. FIGS. 8N-8R illustrate exemplary operations performed by the electronic device to perform such risk mitigation. In some embodiments, the operations described are initiated while a current playback position of the media content corresponds to portion of media content including sensitive content, or is associated with the portion.

In FIG. 8N-8R, the electronic device modifies playback of media content to mitigate risk. For example, in FIG. 8N, playhead 891 approaches a first portion of media content implicating risk corresponding to segment 894A. In response to determining that the playhead 891 approaches segment 894A, the device optionally shrinks the displayed media in the user interface (as described in greater detail with respect to method 900). For example, elements in user interface 800 other than media 890 (e.g., timeline 892) optionally are unchanged in scale, and media 890 is modified in scale and/or dimension(s), such as shown in FIG. 8O. Shrinking the media optionally decreases the amount of light emitted by display 514, thus reducing potential risks to users with sensitivity to light. Moreover, shrinking the media optionally renders potentially sensitive content too small to easily view, thus censoring such sensitive content. In some embodiments, all elements displayed within user interface 800 are reduced in size, including the media and timeline 892.

In FIG. 8P, the electronic device obscures the media content to mitigate risk. Additionally or alternatively to the embodiment illustrated in FIG. 8O, the device optionally obscures a portion or the entirety of media 890. For example, as described with respect to method 900, the device optionally applies an overlay and/or blurring effect to some or all of media 890, such that playback through a sensitive portion of content indicated by segment 894A continues and audio 896 continues to play back, however, the user is shielded from viewing sensitive image(s), such as violent and/or traumatic content. In some embodiments, playback of video included in media 890 is ceased (e.g., blacked or blanked out) while audio 896 continues to play back.

Figure 8Q:
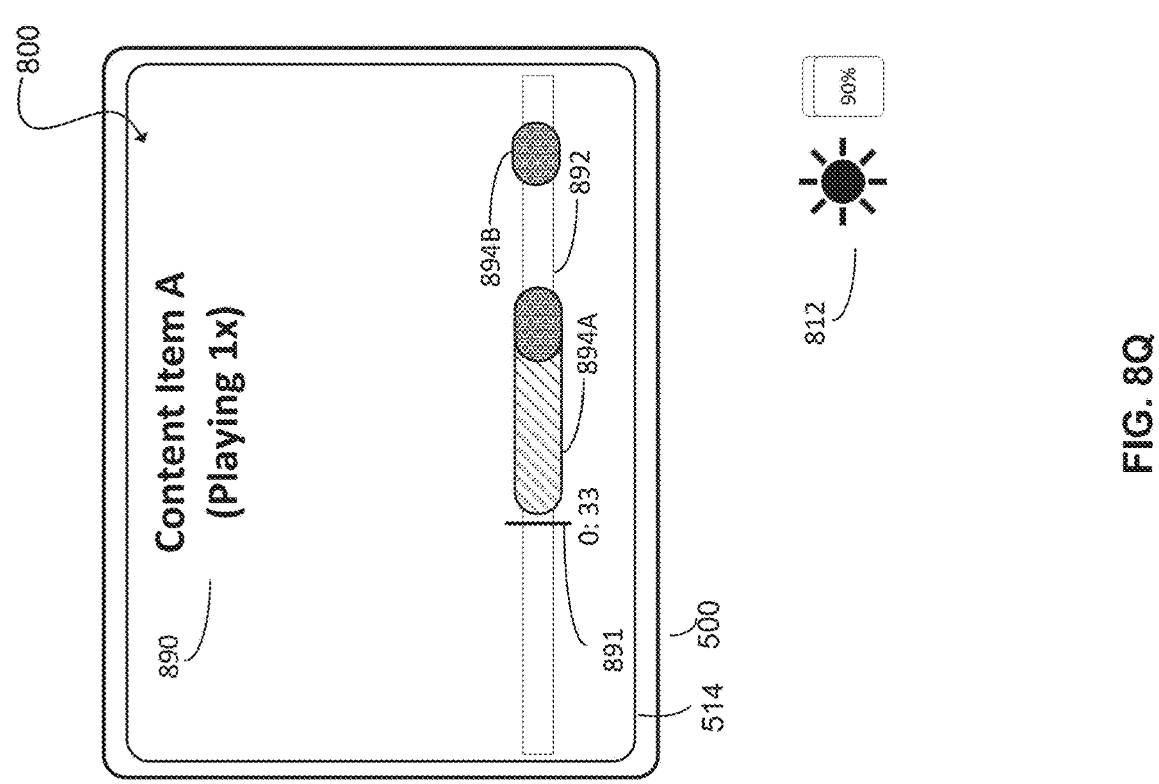

In FIG. 8Q and FIG. 8R, the electronic device modifies a brightness of media content (e.g., of display 514 and/or of the content itself) to mitigate sensitivity risks. For example, in FIG. 8Q, playhead 891 does not yet correspond to segment 894A, which indicates a portion of media 890 implicating sensitive content. The device has brightness 812 corresponding to the current brightness of display 514 set to a first level of brightness (e.g., 90%). In FIG. 8R, playhead 891 advances to correspond to segment 894A, and in response to determining that playback of sensitive content is beginning and/or ongoing, the device modifies the current brightness 812 of display 514 to a second, lower level of brightness (e.g., 50%). In some embodiments, the device continuously modifies brightness to different levels in accordance with a current level of risk presented by the image(s) of media 890 currently displayed via display 514.

In some embodiments, display of the scrubber bar 892 is maintained and/or not modified while the device is performing the risk mitigations described with respect to FIGS. 8N-8R. In some embodiments, the visual elements included in the scrubber bar (e.g., indicating sensitive content) are maintained and/or not modified in visual appearance. In some embodiments, the scrubber bar and visual elements included in the scrubber bar are modified in accordance with the risk mitigations described previously (e.g., in accordance with the new risk levels resulting from the risk mitigations). For example, while consuming a sensitive portion of content, the device optionally dims a display generation component, thus decreasing levels of risk presented to active users with photosensitive health conditions. In response to the dimming, the device optionally modifies the scrubber bar (e.g., shrinking, eliminating, and/or modifying an indicated risk level) in accordance with the level of dimming. Thus, the device optionally dynamically updates the scrubber bar to reflect a realistic and/or current level of risk (e.g., a higher, lower, or generally equal amount of risk) in light of the risk mitigation operations described herein.

FIG. 9 is a flow diagram illustrating a method of displaying an interactive timeline that has representations corresponding to media content implicating health risks in accordance with some embodiments of the disclosure. The method 900 is optionally performed at electronic devices such as device 100, device 300, or device 500 as described above with reference to FIGS. 1A-1B, 2-3, 4A-4B and 5A-5C. In some embodiments, method 900 is performed at or by an automobile (e.g., at an infotainment system of an automobile having or in communication with one or more display generation components and/or input devices). Some operations in method 900 are, optionally combined and/or order of some operations is, optionally, changed.

As described below, the method 900 provides ways in which an electronic device facilitates navigating media consumption and health risk mitigation. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device, such as device 500 shown in FIGS. 8A-8R, in communication with a display generation component, such as display 514, and one or more input devices, such as trackpad 802 shown in FIG. 8A. In some embodiments, the electronic device has one or more of the characteristics of the electronic device described with reference to method 700. In some embodiments, the display generation component has one or more of the characteristics of the display generation component described with reference to method 700. In some embodiments, the one or more input devices have one or more of the characteristics of the one or more input devices described with reference to method 700.

In some embodiments, while the electronic device concurrently displays (902*a*), via a display generation component, media content, such as media 890 shown in FIGS. 8C-8D, that includes a first portion that is associated with first sensitivity (e.g., health-based) metadata, and an interactive timeline, such as scrubber bar 892, associated with (e.g., navigating or scrubbing through) the media content, in accordance with a determination that the first sensitivity (e.g., health-based) metadata satisfies one or more criteria, including a criterion that is satisfied when the first portion of the media content is associated with a first sensitivity (e.g., health) risk level, wherein the first sensitivity level is based on the first health-based metadata, the electronic device displays (902*b*) a first respective portion, such as segment 894A, of the interactive timeline corresponding to the first portion of the media content with a respective visual characteristic having a first value. It is understood that description of "health metadata," "health data", "health risk," and "health risk level" should not be construed as implicating [that] that the metadata, data, risk, and risk level is restricted to "health" specifically, but broadly refers to user sensitivity, including health-related data and risks (e.g., sensitivity metadata, sensitivity data, sensitivity risk, and sensitivity risk level, respectively). Moreover, description of health risks of portions of media does not implicate that the media inherently presents a risk to the user. For example, the interactive timeline optionally is a scrubber bar representing a duration of the media content and indicates a current playback position in the media content. In some embodiments, the interactive timeline is displayed in response to detecting a request to display the interactive timeline (e.g., from the one or more input devices). In some embodiments, after displaying the interactive timeline, a timeout period is initiated, and in accordance with a determination that the electronic device does not detect interaction with the interactive timeline (e.g., indications of navigational inputs, scrubbing inputs, and/or selection inputs detected by the electronic device from the one or more input devices), display of the interactive timeline is ceased by the electronic device. In some embodiments, the first portion of the media content is a portion of the media content having a duration (e.g., 1, 3, 5, 10, 30, or 60 minutes). In some embodiments, the sensitivity metadata associated with the first portion has one or more characteristics of the sensitivity metadata described with reference to method 700.

In some embodiments, the criterion is satisfied when the first health-based metadata (as described with respect to method 700) indicates that the first portion of the media content includes sensitive content (e.g., such as described with reference to method 700). As referred to herein, sensitive content includes auditory and/or visual content that to some audiences is offensive, poses a sensitivity, or is otherwise detrimental for consumption by a user of the electronic device 500. For example, the first sensitivity metadata optionally describes a characteristic of the visual media (e.g., a rate of change of light intensity over the time period spanning the first portion of media content). In some embodiments, the first sensitivity metadata is associated with an included or determined risk level. For example, the electronic device optionally determines the rate of change of light intensity optionally is a low, medium, or high risk to users of the electronic device based on the content of the first portion of the media content.

Description of "the criterion" as follows is not limiting, and the one or more criteria optionally include one or more of "the criterion" described below. In some embodiments, the criterion is satisfied when the first portion of the media that is associated with the first sensitivity metadata, referred to herein as the "sensitive portion" of the media content, corresponds to a risk level based on one or more parameters associated with the display generation component (referred to herein as "device parameters") and/or one or more parameters associated with playback of the media content (referred to herein as "playback parameters"). For example, determining that the criterion is satisfied optionally includes detecting an indication of a peak intensity of light, rate of change of intensity of light, size of a viewable display (e.g., a projected display or display device), display brightness, and/or playback speed of content (e.g., video), and determining that such one or more quantities correspond to (or exceed) the first sensitivity risk level.

In some embodiments, electronic device 500 determines risk level prior to or during media content playback based on sensitivity metadata received during or prior to the media content playback. For example, the sensitivity metadata optionally implicates a health condition (e.g., photosensitive epilepsy), a visual characteristic corresponding to the portion of the media (e.g., a rate of change of light intensity), and/or a risk level associated with the health condition or visual characteristic. In some embodiments, the first sensitivity risk level is determined based on the sensitivity metadata (e.g., health-based metadata) and/or the content corresponding to the sensitive portion of the media content. For example, electronic device 500 optionally determines a portion of the media content is associated with sensitivity metadata implicating a health risk corresponding to a health condition (e.g., photosensitivity), and in accordance with the determination, determines a corresponding risk level associated with the portion (e.g., a low, medium, or high risk level based on visual content of the portion). In some embodiments, the sensitivity metadata includes the risk level, or an indication of the risk level. Accordingly, the criterion is satisfied in accordance with a determination that the portion of the media content is associated with the risk level (e.g., the first risk level).

In response to determining the one or more criteria including the criterion are satisfied, electronic device 500 optionally visually distinguishes a portion of an interactive timeline (e.g., a scrubber bar) corresponding to the portion of media content. The visual distinction includes a respective visual characteristic optionally including a first value different from a second value (e.g., a color, scale, shading, opacity, brightness, saturation, shadows, and/or lighting effect). In some embodiments, the second value corresponds to a default value of the interactive timeline. For example, a first respective portion of the interactive timeline determined to be low risk is displayed with a gray shading, and a second respective portion of the interactive timeline determined to exceed the first risk level is displayed with red shading (e.g., the visual characteristic is a color and the second value is the red color of the shading). In some embodiments, a respective value of the visual characteristic is along a range or a continuum of values, and the first value is representative of risk level corresponding to a respective portion of the interactive timeline along such a range or continuum. For example, the visual characteristic optionally is a color along a gradient of colors (e.g., green represents low risk content, yellow represents medium risk content, and red represents high risk content).

In some embodiments, while the electronic device displays the media content and the interactive timeline, in accordance with a determination that the first sensitivity metadata does not satisfy the one or more criteria, including the criterion that is satisfied when the first portion of the media content is associated with the first risk level, the electronic device displays (902*c*) the first respective portion of the interactive timeline corresponding to the first portion of the media content with the respective visual characteristic having a second value, different from the first value, such as portions of scrubber bar 892 shown in FIG. 8E that are not segment 894A nor segment 894B. In some embodiments, the first risk level—optionally corresponding to a threshold risk level—is determined in accordance with a user profile associated with a health condition or state (e.g., photosensitive epilepsy, history of migraines, and/or sensitivity to violent or offensive content) as described with respect to method 700. For example, the first level of risk of a first user profile associated with epilepsy optionally has a higher level of risk than a second user profile not associated with epilepsy or another photosensitive health condition. As such, during playback while the first user profile optionally is currently selected, a portion (e.g., the first respective portion) of the media content optionally exceeds a first risk level based on the user profile, and the criterion that is satisfied if the portion exceeds a threshold risk level is satisfied. Conversely, while the second user profile optionally is selected, playback of the portion of the media content optionally does not exceed the first risk level. In some embodiments, the risk level is independent of a currently selected user profile, and the risk level is determined in accordance with characteristics of the content (e.g., intensity of light and/or changes to intensity of light over time), playback parameters, and/or device parameters. In some embodiments, the risk level is modified based on known device and playback parameters as described previously. In some embodiments, the first risk level—corresponding to the threshold risk level—is determined in accordance with a user profile associated with a health condition or state (e.g., photosensitive epilepsy, history of migraines, and/or sensitivity to violent or offensive content). For example, a second user profile not associated with a light-sensitive health condition (e.g., not corresponding to a user having photosensitive epilepsy) optionally has a zero, or near zero risk. Accordingly, while the second user profile is currently selected, a respective portion of media content optionally does not exceed a first risk level because the second user profile is minimally or completely insensitive to a sensitive portion of the media content (e.g., the first portion of the media content), thus failing to satisfy the criterion requiring the first media content is associated with the first risk level. In some embodiments, while the second user profile is currently selected and the electronic device determines that a user corresponding to the first user profile that implicates a health-sensitive condition is simultaneously consuming the media content (e.g., in one or more of the ways described with reference to method 700), the first respective portion of the interactive timeline is displayed with the first value, despite the current selection of the second user profile. For example, while a first user—corresponding to the first user profile—and a second user—corresponding to the second user profile—are concurrently consuming the media content via the electronic device (e.g., a set top media device, mobile device, or tablet device), the electronic device determines and/or receives an indication of the presence and/or attention of the first user, and in response visually distinguishes a sensitive portion of the interactive timeline in accordance with a health-sensitive condition associated with the first user and the first user profile, in some embodiments independent of which user profile is currently selected. In some embodiments, in accordance with a determination that at least one respective user corresponding to a respective user profile implicating a health-sensitive condition is consuming the media content (even if another user corresponding to a respective user profile that does not implicate the health-sensitive condition is consuming the media content), the electronic device displays the first respective portion of the interactive timeline with the first value, and in accordance with a determination that no respective user(s) corresponding to respective user profile(s) implicate a health sensitive-condition, the electronic device displays the first respective portion with the second value, different from the first value. In some embodiments, the first risk value is determined independently of the currently selected user profile, as described previously. The corresponding portion of the interactive timeline (e.g., the scrubber bar) is therefore displayed with a second value of a visual characteristic. For example, the second value optionally corresponds to the default color of the interactive timeline. In some embodiments, the second value corresponds to color, scale, shading, opacity, brightness, saturation, shadows, and/or lighting effect. In some embodiments, the second value corresponds to a default value of the interactive timeline; thus, respective portions of the interactive timeline that do not satisfy the criterion satisfied when the first portion of the media content is associated with the first risk level optionally are displayed with a default value of the visual characteristic. Thus, in some embodiments, the electronic device displays a portion of the timeline corresponding to a portion of content with the visual characteristic having a different value based on the risk level of that portion of the content for a given user; in some embodiments, whether or not that risk level is personalized to the user. Displaying portions of the interactive timeline in accordance with an associated risk level reduces the need for inputs to identify and navigate through and/or past such portions.

In some embodiments, before displaying, via the display generation component, the media content the electronic device receives a media stream corresponding to the media content (e.g., as part of downloading and/or streaming the media content to the electronic device), such as in response to gesture 804 shown in FIG. 8B.

In some embodiments, after receiving the media stream, the electronic device determines one or more respective risk levels of one or more portions of the media content including the first portion of the media content, such as reflected by representations included in scrubber bar 892 in FIG. 8E (e.g., the electronic device itself analyzes the media stream/media content to determine the risk levels of the media content, rather than the media stream already including such risk levels encoded in it).

In some embodiments, in response to (and/or after) determining the one or more respective risk levels of the one or more portions of the media content, the electronic device initiates the display of the first media content, such as shown in FIG. 8C. For example, the electronic device optionally receives a media stream from a content provider via a device in communication with the electronic device. In some embodiments, while viewing a media browsing and consumption user interface, a representation of the media content such as a picture and/or video associated with the media content is displayed in the media browsing and consumption user interface. In some embodiments, in accordance with a determination that the media content presents a risk based on one or more active user profiles, or that the media content presents a risk to users afflicted with one or more health-conditions described herein, the electronic device displays a representation such as a badge indicating that the media content presents a risk to a user of the electronic device.

From the media browsing and consumption user interface, the electronic device optionally communicates a request to initiate the media stream in response to detecting a selection of the representation of the media content or a selectable option selectable to initiate receipt and/or playback of the media stream. In some embodiments, in response to receiving the media stream (e.g., at the point in time when the media stream to the electronic device is initialized), the electronic device and/or one or more devices in communication with the electronic device determine contents of the media stream. For example, a stream of video content optionally is analyzed by a content delivery network (optionally including the electronic device) for one or more images that can present risk to a user as described with respect to method 900. In response to determining one or more respective portions of the video content presenting such a risk and/or receiving one or more indications implicating high-risk portions of the video content, the electronic device optionally begins to display the first media content. In some embodiments, the video corresponding to the video stream is analyzed as a whole (e.g., after the entirety of a video file corresponding to the video stream is fully received from a content delivery network). In some embodiments, the electronic device detects a selection of the media content and in response to the detection determines the one or more risk levels of portions of the media content; in response to the determination of the one or more risk levels, the media content is optionally displayed. Determining the one or more risk levels at the electronic device prior to initiating playback of the media content reduces computational complexity to concurrently make such determinations of risk and improves risk determination accuracy due to the information available to the electronic device of aspects of the media playback pathway (e.g., characteristics of the display generation component).

In some embodiments, the first sensitivity metadata is received by the electronic device from a provider of the media content, such as shown by badges 806 in FIG. 8B. For example, the provider of the media content optionally is a media streaming provider. In some embodiments, the media provider determines the sensitivity metadata and/or risk levels and communicates the sensitivity metadata and/or risk levels to the electronic device via a same or separate communication pathway that the media provider uses to communicate the media content. In some embodiments, as described with respect to method 900, the sensitivity metadata is a qualitative and/or quantitative measure of risk level corresponding to respective one or more portions of the media content, and the electronic device optionally determines further sensitivity metadata and/or risk levels in response to receiving the sensitivity metadata. In some embodiments, the electronic device uses the received sensitivity metadata, without further determination of additional sensitivity metadata and/or risk levels. Receiving sensitivity metadata from a content provider of media content reduces the need for user input to identify risks and/or determine all of the sensitivity metadata.

In some embodiments, the first risk level based on the first sensitivity metadata is further based on sensitivity data of an active user profile associated with the electronic device, such as user 808-1 in FIG. 8F and/or user 808-2 in FIG. 8G. For example, as described with respect to method 700 and method 900, the electronic device determines the first health-risk level based on one or more active user profiles corresponding to users consuming the media content. For example, in accordance with a determination that a portion of media content is tagged with sensitivity metadata implicating a risk to users with photosensitive conditions (e.g., photosensitive epilepsy and/or migraines) and that an active user viewing the media content has a photosensitive condition, the electronic device optionally determines that the first risk level is a first value—optionally indicative of high risk—using the first sensitivity metadata. In contrast, in accordance with a determination that the active user viewing the media content does not have a photosensitive condition, the electronic device optionally determines the first risk level is a second value—optionally indicative of low risk—using the first sensitivity metadata. In some embodiments, the risk level is not determined based on the sensitivity metadata, but instead is dependent on the health data corresponding to one or more active user profiles. Determining the risk level based on active user profiles ensures that operations with respect to high and/or low risk content, such as display of information or requiring inputs to interact with displayed user interface(s), are not needlessly performed.

In some embodiments, a value of the respective visual characteristic of the first respective portion, such as segment 894A and 894B shown in FIG. 8E, of the interactive timeline, such as scrubber bar 892, corresponds to a color corresponding to the first risk level. In some embodiments, the color encodes risk level corresponding to the first risk level. For example, the electronic device optionally displays the first respective portion with a bright green color to indicate a relatively low (or zero) risk portion of the media content or displays the first respective portion with a dark red color to indicate a high-risk portion of the media content. In some embodiments, hue, saturation, and/or luminosity are varied alone or in combination to indicate the first risk level. In some embodiments, the available colors of the first respective portion are selected based on relatively small number of options (e.g., green, yellow, and red). In some embodiments, the available colors are based on a continuum, or nearly a continuum of colors as described later with respect to method 900. Displaying the first respective portion of the interactive timeline with a color corresponding to the first risk level reduces erroneous inputs modifying playback of the media in an effort to avoid and/or consume potentially health-sensitive media content.

In some embodiments, displaying the first respective portion, such as segment 894A shown in FIG. 8E, of the interactive timeline with the respective characteristic having the first value includes displaying the first respective portion of the interactive timeline with a respective color having a first saturation. In some embodiments, while concurrently displaying, via the display generation component, the media content and the interactive timeline associated with (e.g., navigating or scrubbing through) the media content in accordance with a determination that the first sensitivity metadata satisfies one or more second criteria, including a criterion that is satisfied when the first portion of the media content is associated with a second risk level, different from the first risk level, wherein the second risk level is based on the first sensitivity metadata, the electronic device displays the first respective portion of the interactive timeline corresponding to the first portion of the media content with the respective color having a second saturation, different from the first saturation, such as the saturation of segment 894B shown in FIG. 8E. For example, as described with respect to method 900, a respective portion of the interactive timeline optionally is displayed with a color (e.g., a saturation of that color) indicating the risk level of the respective portion of the media content. In some embodiments, the interactive timeline includes multiple concurrently displayed portions of the media content implicating health-risks to the user. For example, a first respective portion of the interactive timeline is optionally displayed with a light green color to indicate a non-zero, low-risk portion of the media and a dark red color to indicate a high-risk portion of the media. The first and second respective portions optionally do not overlap, and optionally are distinguished with one or more visual effects from portions of the timeline not associated with a risk level. For example, the scale, border, an applied shadow, and/or lighting effect of the respective portions of the interactive timeline implicating risks optionally are modified, but such visual effects different (e.g., not applied) for portions of the timeline. In some embodiments, the relative degree of saturation additionally or alternatively indicates risk level of the first portion of the media content. For example, a first respective portion of the interactive timeline implicating a relatively low risk is optionally displayed with a color having relatively low saturation (e.g., lightly saturated) and a second respective portion of the interactive timeline implicating a relatively higher risk is optionally displayed with the color having a relatively higher saturation. Thus, the distinct levels of relative color saturation of the respective portions of the interactive timeline optionally indicate the severity of a level of risk. Displaying the first respective portion of the interactive timeline with a respective color saturation based on a respective health level reduces erroneous inputs wherein the user elects to consume—or not consume—the corresponding portion of the media content.

In some embodiments, the first risk level is based on one or more characteristics of the display generation component, such as shown in FIGS. 8I-8K. For example, the first risk level optionally is based on characteristics of a touch-sensitive display of a mobile device such as the display size. In some embodiments, a larger display size corresponds to a relatively higher first risk level for the same content. For example, the mobile device having a first display size optionally determines that the first portion of the media content presents a first, relatively low-risk level to the user, while a set-top box in communication with a television (larger than the display of the mobile device) optionally determines that the first portion of the media content presents a second, relatively high-risk level to the user due to the relatively larger size of the television display. Further, the one or more characteristics optionally are associated with flickering of the media content. For example, a refresh rate of the electronic display or an amount of flicker determined by the electronic device optionally are used to determine the first health-risk level. Determining the first risk level based on the characteristics of the display generation component ensures the determined risk level is commensurate with the risk actually presented to a user, thus preventing erroneous inputs required to avoid low-risk portions of the media content.

In some embodiments, the one or more characteristics include a current brightness setting associated with the display generation component, such as brightness 812-1 in FIG. 8H and brightness 812-2 in FIG. 8I. For example, the current brightness of a physical and/or projected display is optionally used to determine the first risk level. Additionally or alternatively, a contrast of the physical and/or projected display optionally is used to determine the first risk level. A relatively higher current brightness and/or contrast optionally presents relatively higher risk to active users (e.g., to users corresponding to user profiles implicating a photosensitive health condition), and a relatively lower current brightness and/or contrast optionally presents a relatively lower risks to active users; thus, the first health-risk level optionally is dependent on brightness and/or contrast settings of the display generation component. In some embodiments, the electronic device optionally determines the first health-risk level dynamically. For example, in response to detecting one or more inputs to initiate/resume playback of the media content, in response to detecting a modification of the current brightness of the display, in response to detecting an input to display the interactive timeline, the electronic device optionally determines the first risk-level based on the current brightness (e.g., rather than based on the prior brightness). Varying the first risk level based on a current brightness and/or contrast setting indicates a current level of risk to the user, thus preventing erroneous input skipping past low and/or no-risk portions of media content.

In some embodiments, the one or more characteristics include a display size of the displayed media content associated with the display generation component, such as display 514 as shown in FIG. 8J and FIG. 8K. For example, as described with respect to method 900, the size and/or dimensions of one or more displayed images (e.g., via a projected and/or physical display) optionally are used to determine the first sensitivity risk level. In some embodiments, in accordance with a determination that the one or more displayed images present a risk (e.g., present a pattern) based on the current size and/or dimensions of the projected or physical display, the electronic device modifies the first risk level. For example, some static and/or some slow-moving patterns of light present a risk to users having photosensitive epilepsy. Accordingly, the electronic device optionally determines that the displayed media content including such patterns is displayed at a size sufficient to trigger a health condition (e.g., a seizure or migraine). Varying the first risk level based on the displayed size and/or dimensions of the displayed media content indicates a realistic level of risk to the user consuming the media content, thus preventing erroneous inputs skipping past low and/or no-risk portions of the media content.

In some embodiments, the first risk level is based on one or more characteristics of playback of the media content, such as media 890 in FIG. 8L and media 890 in FIG. 8M. For example, the one or more characteristics optionally relate to audio and/or video (e.g., images) associated with the media content. The one or more characteristics, for example, optionally include a peak and/or average level of audio (e.g., volume) based on the media content and/or characteristics of the electronic device. In some embodiments, playback of video (e.g., playback speed) is used by the electronic device to determine the first risk level. Modifying the risk level based on characteristics of media playback improves the determined accuracy of risk to a user, thus protecting their health and reducing erroneous inputs to navigate the media content (e.g., to avoid sensitive portions of the media content and/or view low-risk portions of the media content).

In some embodiments, the one or more characteristics of playback of the media content include a speed of the playback, such as shown in FIG. 8L and FIG. 8M. For example, a higher playback speed of the media content (e.g., 1.5, 2, 3, or 5 times faster than the baseline playback speed) optionally implicates a higher risk to one or active user profiles, thus the electronic device optionally increases the first risk level in accordance with the relatively higher playback speed. On the other hand, a slower playback speed of the media content (e.g., 0.1, 0.25, 0.5, or 0.75 times the baseline playback speed) optionally implicates a lower risk to the one or more active user profiles, and the electronic device optionally decreases the first health-risk level accordingly. Modifying the risk level based on playback speed improves the determined accuracy of risk to a user (e.g., having a photosensitive health condition), thus protecting their health and reducing erroneous inputs to navigate the media content (e.g., to avoid sensitive portions of the media content and/or view low-risk portions of the media content).

In some embodiments, while displaying, via the display generation component, the media content, in accordance with a determination that a current playback position of the media content corresponds to the first portion of the media content, such as shown in FIGS. 8N-8R, and that the first sensitivity metadata associated with the first portion of the media content satisfies the one or more criteria, the electronic device initiates a process to modify playback of the media content. For example, as described with respect to method 900, if the electronic device determines the current playback position corresponds to the onset of sensitive portion of the media content, the electronic optionally modifies the playback of the media content to mitigate and/or reduce risk to users actively consuming the media content in response to such a determination. In some embodiments, the modification is applied during a portion or the entirety of playback of the first portion of the media content. The manner of modification is not limited to any single embodiment, and optionally includes one or more modifications to the one or more images and/or audio optionally included in the media content. In some embodiments, the media content remains entirely visible during some or all of the playback of the media content. In some embodiments, portions of the media content are not displayed and/or not visible (e.g., obscured partially or entirely) during the playback. In some embodiments, one or more respective images included in the media content are modified (e.g., partially or entirely censored, subjected to a visual effect, and/or modified with respect to one or more respective visual characteristics). In some embodiments, audio included in the media content is modified. For example, the audio optionally is censored, distorted, and/or modified in frequency content. The electronic device optionally determines that in light of the modified aspect of playback, one or more portions of the interactive timeline corresponding to sensitive content present a modified risk level (e.g., the sensitive content no longer presents a risk, presents a lower risk, or presents a higher risk), and optionally modifies—or does not modify—display of one or more respective portions of the interactive timeline in accordance with the modified risk level. In some embodiments, the media content is included in a user interface that is not strictly directed to media consumption. For example, while browsing a system user interface associated with the electronic device, the electronic device optionally displays a picture-in-picture window that is subject to the playback modifications described herein, while other aspects of the system user interface are concurrently displayed (e.g., while displaying an application browsing user interface or a settings application included in the electronic device). Although the foregoing operations and/or functions optionally are initiated in accordance with a determination that the current playback position corresponds to the first portion of the media content, it is understood that the operations and/or functions optionally are optionally initiated in response to the electronic device making such a determination. Initiating modification of playback of the media content in accordance with a determination that the current playback position corresponds to the first portion of the media prevents the need for inputs to modify the playback, thereby protecting the user's health and improving efficiency of user interaction.

In some embodiments, initiating the process to modify the playback includes modifying a color space of the media content, such as applied to the embodiments depicted in FIGS. 8C-8R. For example, the electronic device optionally displays the media content with a current first color space (e.g., a range of possible colors) corresponding to the range of possible visible colors, or predominantly including the range of visible colors, such that the appearance of the media content generally corresponds to the one or more images communicated by a provider of the media content. In some embodiments, first color space is a default color space that is defined by the media, the electronic device, and/or a provider of the media content. If the electronic device determines that the current playback position is associated with (e.g., corresponds to) the first portion of the media content, the electronic device optionally modifies the current, displayed color space to correspond to a second color space, different from the first color space. In some embodiments, the second color space is configured to mitigate risks. For example, the second color space optionally is configured to reduce the prevalence of red during playback of the first portion of the content, which optionally presents a risk to photosensitive users. Further, the second color space is optionally configured to mitigate perceived flashing and/or static patterns that optionally presents risks to photosensitive users. Such modifications to color space optionally are applied during playback of the first portion of the media content (partially or entirely). In some embodiments, in response to determining the playback position does not correspond to the first portion of the media content (e.g., playback of the first portion has concluded), the electronic device modifies the current color space to correspond to the first color space. For example, the first color space optionally corresponds to the Rec. 2020 standard, and the second color space optionally corresponds to the Rec. 709 standard. Modifying the color space of the media content prevents user input required to manually modify the color space and/or otherwise modify the display of the media content to mitigate risks to active user(s) consuming the media content.

In some embodiments, initiating the process to modify the playback includes ceasing display of one or more images included in the media content, optionally similar to shown in FIG. 8P, wherein media 690 optionally is not displayed. In some embodiments, initiating the process to modify the playback includes maintaining playback of audio associated with the media content, such as shown in FIG. 8P. For example, the media content optionally includes video that is not displayed and audio that continues to be played when the current playback position corresponds to the first content. Instead of displaying the one or more images, the electronic device optionally displays a placeholder image (e.g., a monochrome image) or does not display the one or images at all. Ceasing display of the one or more images while maintaining playback of the audio of the media content reduces the need for inputs to manually modify such aspects of playback, such as lowering the brightness setting associated with the media content.

In some embodiments, initiating the process to modify the playback includes scaling the media content, such as shown in FIG. 8O. In some embodiments, the scaling includes scaling down one or more dimensions of the media content on the display (e.g., reducing the display area consumed by the images on the display device). For example, the electronic device optionally is a media device in communication with a display (e.g., a television) that is displaying the media content in a user interface. In response to determining that playback has reached sensitive content, the electronic device optionally maintains playback of the media content, but optionally shrinks the size of a media player included in the user interface while optionally maintaining the original size or dimensions of other (e.g., playback controls and/or informational) aspects of the user interface. For example, a representation of the interactive timeline optionally is maintained in size and/or scale while the media content is scaled downwards to ensure the user can still view the playback position and/or risky content indicated by the interactive timeline while they are shielded from sensitive content. Scaling the media content when the current playback position is associated with the first portion of the media content reduces the need for other inputs to mitigate risks while consuming the media content.

In some embodiments, initiating the process to modify the playback includes combining one or more frames of the media content, such as applied to the embodiments depicted in FIGS. 8C-8R. For example, the electronic device optionally, merges a plurality of successive frames (e.g., 1, 2, 5, 10, 25, 50, 75, 100, or 250 frames, optionally based on the frame rate) of video within the media content. The merging performed by the electronic device optionally includes performing an operation (e.g., averaging) one or more successive frames of video, and displaying the merged and/or averaged frames, rather than the original frames themselves. The merging operations optionally mitigate risks (e.g., to photosensitive users) by reducing the peak luminosity of the media, reducing the incidence of flashing light, and/or modifying a frequency of flashing light. Merging frames of the media content when the current playback position is associated with the first portion of the media content reduces the need for other inputs to mitigate risks while consuming the media content.

In some embodiments, initiating the process to modify the playback includes modifying a displayed brightness of the media content, such as shown in FIGS. 8Q and 8R by brightness 812. For example, the portion or the entire user interface including the displayed media content is optionally darkened by the electronic device in response to the current playback positing corresponding to the first portion of the media content. After the current playback position no longer corresponds to the first portion of the media content (e.g., after display of the first portion of the media content is concluded), the electronic device optionally reverts to an original display brightness. In some embodiments, the electronic device modifies a brightness of the display itself. For example, the electronic device optionally modifies the brightness setting of a display panel and/or modifies the brightness of the displayed media content while maintaining brightness of the display panel. In some embodiments, the brightness of a portion of the display occupied by the media content is modified by a relatively larger or smaller amount than portion(s) of the display not occupied by the media content. The electronic device, for example, optionally darkens the displayed media content by a first amount and simultaneously darkens the display area not including the media content by a second, relatively smaller amount (or does not darken such display area at all). Modifying displayed brightness of the media content when the current playback position is associated with the first portion of the media content reduces the need for other inputs to mitigate risks (e.g., lowering a display brightness) while consuming the media content.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIG. 9. For example, the interactive timelines described above with reference to method 900 optionally have one or more of the charactertistics of skipping portions of media using sensitivity metadata described herein with reference to other methods described herein (e.g., method 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 9 are, optionally, implemented by components depicted in FIGS. 1A-1B. For example, displaying operation 902*a*, displaying operation 902*b* and displaying operation 902*c* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology includes facilitating navigation of content consumed by a user using an electronic device. The present disclosure contemplates that in some instances, the data utilized may include personal information data that uniquely identifies or can be used to contact or locate a specific person. Such personal information data can include demographic data, content consumption activity, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, content consumption activity can be used to suggest content to a user. Accordingly, use of such personal information data enables users to use electronic devices in coordinated manners. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of network services, the present technology can be configured to allow users to select to "opt in" or "opt out" of participation in the collection of personal information data during registration for services or anytime thereafter. In another example, users can select not to enable content consumption activity tracking. In addition to providing "opt in" and "opt out" options, the present disclosure contemplates providing notifications relating to the access or use of personal information. For instance, a user may be notified upon initiating content playback that their personal information data will be accessed and then reminded again just before personal information data is accessed by the device(s).

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content and other user interfaces can be navigated in accordance with the embodiments of the disclosure without tracking the content consumption activity of the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device in communication with a display generation component and one or more input devices;

while displaying, via the display generation component, first media content, wherein the first media content includes a first portion, corresponding to a current playback position of the first media content, that is associated with first health-based metadata, and wherein the first media content includes a second portion, different than the first portion:

in accordance with a determination that the first health-based metadata satisfies one or more criteria, including a criterion that is satisfied based on health-based data of a user profile associated with the electronic device, initiating a process to forgo display of the first portion of the first media content, including:

displaying, via the display generation component, a first visual element which includes:

a selectable option that is selectable to display information, corresponding to the first health-based metadata, about the first portion of the first media content; and a selectable option that is selectable to skip the first portion of the first media content;

while displaying the first visual element, receiving, via the one or more input devices, one or more inputs corresponding to selection of one or more selectable options; and in response to receiving, via the one or more input devices, an input corresponding to selection of the selectable option that is selectable to display the information about the first portion of the first media content, displaying, via the display generation component, the information about the first portion of the first media content; and in accordance with a determination that the first health-based metadata does not satisfy the one or more criteria, continuing playback of the first media content to display, via the display generation component, the first portion of the first media content.

2. The method of claim 1, wherein the second portion is associated with second health-based metadata, different from the first health-based metadata, the method further comprising:

while displaying, via the display generation component, the first media content, in accordance with a determination the current playback position of the first media content corresponds to the second portion:

in accordance with a determination that the second health-based metadata does not satisfy the one or more criteria, including the criterion that is satisfied based on the first health-based metadata of the user profile associated with the electronic device, displaying, via the display generation component, the second portion of the first media content without initiating a process to forgo display of the second portion of the first media content.

3. The method of claim 1, further comprising:

receiving, via the one or more input devices, an input corresponding to a request to initiate the displaying, via the display generation component, of the first media content; and in response to receiving, via the one or more input devices, the input corresponding to the request to initiate the displaying of the first media content, displaying, via the display generation component, first information including a selectable option that is selectable to enable a content skipping mode associated with the first media content;

while displaying, via the display generation component, the selectable option that is selectable to enable the content skipping mode associated with the first media content, receiving, via the one or more input devices, a second input corresponding to selection of the selectable option that is selectable to enable the content skipping mode associated with the first media content; and in response to receiving the second input corresponding to selection of the selectable option that is selectable to enable the content skipping mode associated with the first media content, enabling the content skipping mode associated with the first media content.

4. The method of claim 1, wherein initiating the process to forgo display of the first portion of the first media content includes, in accordance with a determination that automatic content skipping is enabled for the first media content, automatically skipping the first portion of the first media content without receiving user input to skip the first portion of the first media content.

5. The method of claim 1, wherein initiating the process to forgo display of the first portion of the first media content includes:

ceasing playback of the first media content; and wherein the first visual element includes first information associated with the first health-based metadata of the first portion of the first media content.

6. The method of claim 5, wherein the first information includes a description associated with the satisfaction of the one or more criteria.

7. The method of claim 5, wherein before displaying the first visual element, the first media content is displayed with a first visual appearance corresponding to a visual characteristic having a first value, the method further comprising:

while displaying the first visual element, displaying the first media content with a second visual appearance, different from the first visual appearance, corresponding to the visual characteristic having a second value, different from the first value.

8. The method of claim 1, further comprising:

while playback of the first media content is ceased and while displaying the first visual element, receiving, via the one or more input devices, an input corresponding to a selection of the selectable option that is selectable to enable a content skipping mode associated with the first media content; and in response to receiving, via the one or more input devices, the input corresponding to the selection of the selectable option that is selectable to enable a content skipping mode associated with the first media content, skipping the first portion of the first media content.

9. The method of claim 1, wherein the first visual element includes a selectable option that is selectable to display the first portion of the first media content, the method further comprising:

while playback of the first media content is ceased and while displaying the first visual element, receiving, via the one or more input devices, an input corresponding to a selection of the selectable option that is selectable to display the first portion of the first media content; and in response to receiving, via the one or more input devices, the input corresponding to the selection of the selectable option that is selectable to display the first portion of the first media content, resuming the playback of the first media content and displaying, via the display generation component, the first portion of the first media content.

10. The method of claim 1, wherein the first visual element includes a selectable option that is selectable to display the first portion of the first media content, the method further comprising:

while playback of the first media content is ceased and while displaying, the first visual element, receiving, via the one or more input devices, an input corresponding to selection of the selectable option that is selectable to display the first portion of the first media content; and in response to receiving, via the one or more input devices, the input corresponding to selection of the selectable option that is selectable to display the first portion of the first media content, resuming the playback of the first media content.

11. The method of claim 1, wherein the first health-based metadata is associated with at least one of photosensitivity, post-traumatic stress disorder, epilepsy, or migraines.

12. The method of claim 1, wherein the one or more criteria includes a criterion that is satisfied when a setting is enabled in a content viewing application in which the first media content is being displayed.

13. The method of claim 1, further comprising:

while displaying, via the display generation component, the second portion of the first media content that is associated with second health-based metadata, in accordance with a determination the second health-based metadata does not satisfy the one or more criteria, forgoing displaying, via the display generation component, the selectable option that is selectable to skip the second portion of the first media content.

14. An electronic device, comprising:

one or more processors;

memory; and one or more programs, wherein the one or more programs are stored in the memory and configured to be executed by the one or more processors, the one or more programs including instructions for:

while displaying, via a display generation component, first media content, wherein the first media content includes a first portion, corresponding to a current playback position of the first media content, that is associated with first health-based metadata, and wherein the first media content includes a second portion, different than the first portion:

in accordance with a determination that the first health-based metadata satisfies one or more criteria, including a criterion that is satisfied based on health-based data of a user profile associated with the electronic device, initiating a process to forgo display of the first portion of the first media content, including:

displaying, via the display generation component, a first visual element which includes:

a selectable option that is selectable to display information, corresponding to the first health-based metadata, about the first portion of the first media content; and a selectable option that is selectable to skip the first portion of the first media content;

while displaying the first visual element, receiving, via one or more input devices, one or more inputs corresponding to selection of one or more selectable options; and in response to receiving, via the one or more input devices, an input corresponding to selection of the selectable option that is selectable to display the information about the first portion of the first media content, displaying, via the display generation component, the information about the first portion of the first media content; and in accordance with a determination that the first health-based metadata does not satisfy the one or more criteria, continuing playback of the first media content to display, via the display generation component, the first portion of the first media content.

15. The electronic device of claim 14, wherein the second portion is associated with second health-based metadata, different from the first health-based metadata, and wherein the one or more programs further include instructions for:

while displaying, via the display generation component, the first media content, in accordance with a determination the current playback position of the first media content corresponds to the second portion:

in accordance with a determination that the second health-based metadata does not satisfy the one or more criteria, including the criterion that is satisfied based on the first health-based metadata of the user profile associated with the electronic device, displaying, via the display generation component, the second portion of the first media content without initiating a process to forgo display of the second portion of the first media content.

16. The electronic device of claim 14, the one or more programs further including instructions for:

receiving, via the one or more input devices, an input corresponding to a request to initiate the displaying, via the display generation component, of the first media content; and in response to receiving, via the one or more input devices, the input corresponding to the request to initiate the displaying of the first media content, displaying, via the display generation component, first information including a selectable option that is selectable to enable a content skipping mode associated with the first media content;

while displaying, via the display generation component, the selectable option that is selectable to enable the content skipping mode associated with the first media content, receiving, via the one or more input devices, a second input corresponding to selection of the selectable option that is selectable to enable the content skipping mode associated with the first media content; and in response to receiving the second input corresponding to selection of the selectable option that is selectable to enable the content skipping mode associated with the first media content, enabling the content skipping mode associated with the first media content.

17. The electronic device of claim 14, wherein initiating the process to forgo display of the first portion of the first media content includes, in accordance with a determination that automatic content skipping is enabled for the first media content, automatically skipping the first portion of the first media content without receiving user input to skip the first portion of the first media content.

18. The electronic device of claim 14, wherein initiating the process to forgo display of the first portion of the first media content includes:

ceasing playback of the first media content; and wherein the first visual element includes first information associated with the first health-based metadata of the first portion of the first media content.

19. The electronic device of claim 18, wherein the first information includes a description associated with the satisfaction of the one or more criteria.

20. The electronic device of claim 18, wherein before displaying the first visual element, the first media content is displayed with a first visual appearance corresponding to a visual characteristic having a first value, and wherein the one or more programs further include instructions for:

while displaying the first visual element, displaying the first media content with a second visual appearance, different from the first visual appearance, corresponding to the visual characteristic having a second value, different from the first value.

21. The electronic device of claim 14, the one or more programs further including instructions for:

while playback of the first media content is ceased and while displaying the first visual element, receiving, via the one or more input devices, an input corresponding to a selection of the selectable option that is selectable to enable a content skipping mode associated with the first media content; and in response to receiving, via the one or more input devices, the input corresponding to the selection of the selectable option that is selectable to enable a content skipping mode associated with the first media content, skipping the first portion of the first media content.

22. The electronic device of claim 14, wherein the first visual element includes a selectable option that is selectable to display the first portion of the first media content, and wherein the one or more programs further include instructions for:

while playback of the first media content is ceased and while displaying the first visual element, receiving, via the one or more input devices, an input corresponding to a selection of the selectable option that is selectable to display the first portion of the first media content; and in response to receiving, via the one or more input devices, the input corresponding to the selection of the selectable option that is selectable to display the first portion of the first media content, resuming the playback of the first media content and displaying, via the display generation component, the first portion of the first media content.

23. The electronic device of claim 14, wherein the first visual element includes a selectable option that is selectable to display the first portion of the first media content, and wherein the one or more programs further include instructions for:

while playback of the first media content is ceased and while displaying, the first visual element, receiving, via the one or more input devices, an input corresponding to selection of the selectable option that is selectable to display the first portion of the first media content; and in response to receiving, via the one or more input devices, the input corresponding to selection of the selectable option that is selectable to display the first portion of the first media content, resuming the playback of the first media content.

24. The electronic device of claim 14, wherein the first health-based metadata is associated with at least one of photosensitivity, post-traumatic stress disorder, epilepsy, or migraines.

25. The electronic device of claim 14, wherein the one or more criteria includes a criterion that is satisfied when a setting is enabled in a content viewing application in which the first media content is being displayed.

26. The electronic device of claim 14, the one or more programs further including instructions for:

while displaying, via the display generation component, the second portion of the first media content that is associated with second health-based metadata, in accordance with a determination the second health-based metadata does not satisfy the one or more criteria, forgoing displaying, via the display generation component, the selectable option that is selectable to skip the second portion of the first media content.

27. A non-transitory computer readable storage medium storing one or more programs, the one or more programs comprising instructions, which when executed by one or more processors of an electronic device, cause the electronic device to perform a method comprising:

while displaying, via a display generation component, first media content, wherein the first media content includes a first portion, corresponding to a current playback position of the first media content, that is associated with first health-based metadata, and wherein the first media content includes a second portion, different than the first portion:

in accordance with a determination that the first health-based metadata satisfies one or more criteria, including a criterion that is satisfied based on health-based data of a user profile associated with the electronic device, initiating a process to forgo display of the first portion of the first media content, including:

displaying, via the display generation component, a first visual element which includes:

a selectable option that is selectable to display information, corresponding to the first health-based metadata, about the first portion of the first media content; and a selectable option that is selectable to skip the first portion of the first media content;

while displaying the first visual element, receiving, via one or more input devices, one or more inputs corresponding to selection of one or more selectable options; and in response to receiving, via the one or more input devices, an input corresponding to selection of the selectable option that is selectable to display the information about the first portion of the first media content, displaying, via the display generation component, the information about the first portion of the first media content; and in accordance with a determination that the first health-based metadata does not satisfy the one or more criteria, continuing playback of the first media content to display, via the display generation component, the first portion of the first media content.

28. The non-transitory computer readable storage medium of claim 27, wherein the second portion is associated with second health-based metadata, different from the first health-based metadata, and wherein the method further comprises:

while displaying, via the display generation component, the first media content, in accordance with a determination the current playback position of the first media content corresponds to the second portion:

in accordance with a determination that the second health-based metadata does not satisfy the one or more criteria, including the criterion that is satisfied based on the first health-based metadata of the user profile associated with the electronic device, displaying, via the display generation component, the second portion of the first media content without initiating a process to forgo display of the second portion of the first media content.

29. The non-transitory computer readable storage medium of claim 27, the method further comprising:

receiving, via the one or more input devices, an input corresponding to a request to initiate the displaying, via the display generation component, of the first media content; and in response to receiving, via the one or more input devices, the input corresponding to the request to initiate the displaying of the first media content, displaying, via the display generation component, first information including a selectable option that is selectable to enable a content skipping mode associated with the first media content;

while displaying, via the display generation component, the selectable option that is selectable to enable the content skipping mode associated with the first media content, receiving, via the one or more input devices, a second input corresponding to selection of the selectable option that is selectable to enable the content skipping mode associated with the first media content; and in response to receiving the second input corresponding to selection of the selectable option that is selectable to enable the content skipping mode associated with the first media content, enabling the content skipping mode associated with the first media content.

30. The non-transitory computer readable storage medium of claim 27, wherein initiating the process to forgo display of the first portion of the first media content includes, in accordance with a determination that automatic content skipping is enabled for the first media content, automatically skipping the first portion of the first media content without receiving user input to skip the first portion of the first media content.

31. The non-transitory computer readable storage medium of claim 27, wherein initiating the process to forgo display of the first portion of the first media content includes:

ceasing playback of the first media content; and wherein the first visual element includes first information associated with the first health-based metadata of the first portion of the first media content.

32. The non-transitory computer readable storage medium of claim 31, wherein the first information includes a description associated with the satisfaction of the one or more criteria.

33. The non-transitory computer readable storage medium of claim 31, wherein before displaying the first visual element, the first media content is displayed with a first visual appearance corresponding to a visual characteristic having a first value, and wherein the method further comprises:

while displaying the first visual element, displaying the first media content with a second visual appearance, different from the first visual appearance, corresponding to the visual characteristic having a second value, different from the first value.

34. The non-transitory computer readable storage medium of claim 27, the method further comprising:

while playback of the first media content is ceased and while displaying the first visual element, receiving, via the one or more input devices, an input corresponding to a selection of the selectable option that is selectable to enable a content skipping mode associated with the first media content; and in response to receiving, via the one or more input devices, the input corresponding to the selection of the selectable option that is selectable to enable a content skipping mode associated with the first media content, skipping the first portion of the first media content.

35. The non-transitory computer readable storage medium of claim 27, wherein the first visual element includes a selectable option that is selectable to display the first portion of the first media content, and wherein the method further comprises:

while playback of the first media content is ceased and while displaying the first visual element, receiving, via the one or more input devices, an input corresponding to a selection of the selectable option that is selectable to display the first portion of the first media content; and in response to receiving, via the one or more input devices, the input corresponding to the selection of the selectable option that is selectable to display the first portion of the first media content, resuming the playback of the first media content and displaying, via the display generation component, the first portion of the first media content.

36. The non-transitory computer readable storage medium of claim 27, wherein the first visual element includes a selectable option that is selectable to display the first portion of the first media content, and wherein the method further comprises:

while playback of the first media content is ceased and while displaying, the first visual element, receiving, via the one or more input devices, an input corresponding to selection of the selectable option that is selectable to display the first portion of the first media content; and in response to receiving, via the one or more input devices, the input corresponding to selection of the selectable option that is selectable to display the first portion of the first media content, resuming the playback of the first media content.

37. The non-transitory computer readable storage medium of claim 27, wherein the first health-based metadata is associated with at least one of photosensitivity, post-traumatic stress disorder, epilepsy, or migraines.

38. The non-transitory computer readable storage medium of claim 27, wherein the one or more criteria includes a criterion that is satisfied when a setting is enabled in a content viewing application in which the first media content is being displayed.

39. The non-transitory computer readable storage medium of claim 27, the method further comprising:

while displaying, via the display generation component, the second portion of the first media content that is associated with second health-based metadata, in accordance with a determination the second health-based metadata does not satisfy the one or more criteria, forgoing displaying, via the display generation component, the selectable option that is selectable to skip the second portion of the first media content.

* * * * *